(12) United States Patent
Schleif et al.

(10) Patent No.: US 12,384,464 B2
(45) Date of Patent: Aug. 12, 2025

(54) OFF-ROAD VEHICLE

(71) Applicant: Polaris Industries Inc., Medina, MN (US)

(72) Inventors: Andrew C. Schleif, Stacy, MN (US);
Paul W. Barton, Warwickshire (GB);
Ralph W. Lauzze, III, Hugo, MN (US)

(73) Assignee: POLARIS INDUSTRIES INC., Medina, MN (US)

( * ) Notice: Subject to any disclaimer, the term of this patent is extended or adjusted under 35 U.S.C. 154(b) by 44 days.

(21) Appl. No.: 18/209,294

(22) Filed: Jun. 13, 2023

(65) Prior Publication Data

US 2023/0322305 A1 Oct. 12, 2023

Related U.S. Application Data

(63) Continuation of application No. 16/875,494, filed on May 15, 2020, now Pat. No. 11,691,674.

(51) Int. Cl.
*B62D 21/18* (2006.01)
*B60K 5/00* (2006.01)
*F02B 5/00* (2006.01)

(52) U.S. Cl.
CPC ............. *B62D 21/183* (2013.01); *B60K 5/00* (2013.01); *F02B 5/00* (2013.01)

(58) Field of Classification Search
CPC .. B62D 21/183; B60K 5/00; B60K 2005/003; F02B 5/00; F01M 1/02; F01M 11/0004; F01M 11/08; F01M 2011/007; F16N 7/40
See application file for complete search history.

(56) References Cited

U.S. PATENT DOCUMENTS

| 1,521,976 A | 1/1925 | Swain |
| 1,989,585 A | 1/1935 | Bigelow |

(Continued)

FOREIGN PATENT DOCUMENTS

| CA | 1163510 A | 3/1984 |
| CA | 1232167 A * | 2/1988 | ............... F01M 3/00 |

(Continued)

OTHER PUBLICATIONS

JP—3769675-B2 English Translation (Year: 2006).*

(Continued)

*Primary Examiner* — James A Shriver, II
*Assistant Examiner* — Michael T. Walsh
(74) *Attorney, Agent, or Firm* — SCHWEGMAN LUNDBERG & WOESSNER, P.A.

(57) ABSTRACT

A utility vehicle comprising a frame, a body supported by the frame, a seating area supported by the frame, front and rear ground engaging members supporting the frame and the body, and a powertrain drivingly coupled to the front and rear ground engaging members, the powertrain including an engine having a cylinder block having a plurality of cylinders, a cylinder head removably coupled to the cylinder block, a crankcase having a first portion and a second portion, the first portion of the crankcase being removably coupled to the cylinder block, and at least one gasket positioned between the cylinder block and the first portion of the crankcase, the at least one gasket configured to individually seal each of the plurality of cylinders relative to the first portion of the crankcase.

15 Claims, 23 Drawing Sheets

(56) References Cited

U.S. PATENT DOCUMENTS

| | | |
|---|---|---|
| D119,377 S | 3/1940 | Cadwallader |
| 2,481,623 A * | 9/1949 | Rued ............... F04B 47/04 |
| | | 60/372 |
| 2,525,131 A | 10/1950 | Hallett |
| 2,553,795 A | 5/1951 | Staude |
| 2,623,612 A | 12/1952 | Scheiterlein |
| 2,624,592 A | 1/1953 | MacPherson |
| 2,660,449 A | 11/1953 | MacPherson |
| 2,672,103 A | 3/1954 | Hohmes |
| 2,839,038 A | 6/1958 | Middlebrooks, Jr. |
| 2,986,130 A | 5/1961 | McMillan |
| 3,048,233 A | 8/1962 | Crain et al. |
| 3,400,607 A | 9/1968 | Smith |
| 3,422,918 A | 1/1969 | Musser et al. |
| 3,426,799 A * | 2/1969 | Kintner ............... F16K 3/243 |
| | | 137/625.48 |
| 3,508,764 A | 4/1970 | Dobson et al. |
| 3,523,592 A | 8/1970 | Fenton |
| 3,560,022 A | 2/1971 | Gold |
| 3,694,661 A | 9/1972 | Minowa |
| 3,734,219 A | 5/1973 | Christensen et al. |
| 3,858,902 A | 1/1975 | Howells et al. |
| 3,861,229 A | 1/1975 | Domaas |
| 4,010,725 A | 3/1977 | White |
| 4,010,975 A | 3/1977 | Horton |
| 4,022,272 A | 5/1977 | Miller |
| 4,027,892 A | 6/1977 | Parks |
| 4,046,403 A | 9/1977 | Yoshida |
| 4,061,187 A | 12/1977 | Rajasekaran et al. |
| 4,098,414 A | 7/1978 | Abiera |
| 4,150,655 A | 4/1979 | Forlai et al. |
| 4,159,835 A | 7/1979 | Leja et al. |
| 4,217,970 A | 8/1980 | Chika |
| 4,236,492 A | 12/1980 | Tholen |
| 4,284,158 A | 8/1981 | Schield |
| 4,294,073 A | 10/1981 | Neff |
| 4,337,406 A | 6/1982 | Binder |
| 4,344,718 A | 8/1982 | Taylor |
| 4,366,878 A | 1/1983 | Warf |
| 4,404,936 A | 9/1983 | Tatebe et al. |
| 4,427,087 A | 1/1984 | Inoue et al. |
| 4,434,755 A | 3/1984 | Kazuta et al. |
| 4,434,934 A | 3/1984 | Moser et al. |
| 4,458,491 A | 7/1984 | Deutschmann |
| 4,470,389 A | 9/1984 | Mitadera et al. |
| 4,474,162 A | 10/1984 | Mason |
| 4,515,221 A | 5/1985 | Van Der Lely |
| 4,529,244 A | 7/1985 | Zaydel |
| 4,561,323 A | 12/1985 | Stromberg |
| 4,577,716 A | 3/1986 | Norton |
| 4,598,687 A | 7/1986 | Hayashi |
| D286,760 S | 11/1986 | Ooba et al. |
| 4,630,446 A | 12/1986 | Iwai et al. |
| 4,638,172 A | 1/1987 | Williams |
| 4,650,210 A | 3/1987 | Hirose et al. |
| 4,671,521 A | 6/1987 | Talbot et al. |
| 4,685,430 A | 8/1987 | Ap |
| 4,686,433 A | 8/1987 | Shimizu |
| 4,688,529 A | 8/1987 | Mitadera et al. |
| 4,699,234 A | 10/1987 | Shinozaki et al. |
| 4,708,105 A | 11/1987 | Leydorf et al. |
| 4,712,629 A | 12/1987 | Takahashi et al. |
| 4,714,126 A | 12/1987 | Shinozaki et al. |
| 4,722,548 A | 2/1988 | Hamilton et al. |
| 4,732,244 A | 3/1988 | Verkuylen |
| 4,733,639 A | 3/1988 | Kohyama et al. |
| 4,779,895 A | 10/1988 | Rubel |
| 4,779,905 A | 10/1988 | Ito et al. |
| 4,798,399 A | 1/1989 | Cameron |
| 4,817,985 A | 4/1989 | Enokimoto et al. |
| 4,821,825 A | 4/1989 | Somerton-Rayner |
| 4,826,205 A | 5/1989 | Kouda et al. |
| 4,827,416 A | 5/1989 | Kawagoe et al. |
| 4,828,017 A | 5/1989 | Watanabe et al. |
| 4,848,294 A | 7/1989 | Yamamoto |
| 4,867,474 A | 9/1989 | Smith |
| 4,890,586 A | 1/1990 | Fujii et al. |
| 4,898,261 A | 2/1990 | Winberg et al. |
| 4,907,552 A | 3/1990 | Martin |
| 4,924,959 A | 5/1990 | Handa et al. |
| 4,927,170 A | 5/1990 | Wada |
| 4,934,737 A | 6/1990 | Nakatsuka |
| 4,941,784 A | 7/1990 | Flament |
| D312,441 S | 11/1990 | Guelfi et al. |
| D312,989 S | 12/1990 | Murata et al. |
| 5,010,970 A | 4/1991 | Yamamoto |
| 5,015,009 A | 5/1991 | Ohyama et al. |
| 5,016,903 A | 5/1991 | Kijima et al. |
| 5,018,490 A | 5/1991 | Kroener |
| 5,020,616 A | 6/1991 | Yagi et al. |
| 5,021,721 A | 6/1991 | Oshita et al. |
| 5,024,460 A | 6/1991 | Hanson et al. |
| 5,027,915 A | 7/1991 | Suzuki et al. |
| 5,036,939 A | 8/1991 | Johnson et al. |
| 5,038,582 A | 8/1991 | Takamatsu |
| 5,044,614 A | 9/1991 | Rau |
| 5,062,654 A | 11/1991 | Kakimoto et al. |
| 5,062,657 A | 11/1991 | Majeed |
| 5,063,811 A | 11/1991 | Smith et al. |
| 5,076,383 A | 12/1991 | Inoue et al. |
| 5,078,223 A | 1/1992 | Ishiwatari et al. |
| 5,078,225 A | 1/1992 | Ohmura et al. |
| 5,080,392 A | 1/1992 | Bazergui |
| 5,086,858 A | 2/1992 | Mizuta et al. |
| D327,237 S | 6/1992 | Miyamoto et al. |
| 5,129,700 A | 7/1992 | Trevisan et al. |
| 5,163,538 A | 11/1992 | Derr et al. |
| 5,181,696 A | 1/1993 | Abe |
| 5,189,615 A | 2/1993 | Rubel et al. |
| 5,195,607 A | 3/1993 | Shimada et al. |
| 5,205,371 A | 4/1993 | Karnopp |
| 5,212,431 A | 5/1993 | Origuchi et al. |
| 5,251,588 A | 10/1993 | Tsujii et al. |
| 5,251,713 A | 10/1993 | Enokimoto |
| 5,253,730 A | 10/1993 | Hayashi et al. |
| 5,255,733 A | 10/1993 | King |
| 5,264,764 A | 11/1993 | Kuang |
| 5,327,989 A | 7/1994 | Furuhashi et al. |
| 5,342,023 A | 8/1994 | Kuriki et al. |
| 5,359,247 A | 10/1994 | Baldwin et al. |
| D354,264 S | 1/1995 | McCoy |
| 5,382,833 A | 1/1995 | Wirges |
| 5,390,121 A | 2/1995 | Wolfe |
| 5,401,056 A | 3/1995 | Eastman |
| 5,407,130 A | 4/1995 | Uyeki et al. |
| 5,408,965 A | 4/1995 | Fulton et al. |
| 5,473,990 A | 12/1995 | Anderson et al. |
| 5,475,596 A | 12/1995 | Henry et al. |
| 5,483,448 A | 1/1996 | Liubakka et al. |
| 5,528,148 A | 6/1996 | Rogers |
| D373,099 S | 8/1996 | Molzon et al. |
| 5,546,901 A | 8/1996 | Acker et al. |
| 5,549,153 A | 8/1996 | Baruschke et al. |
| 5,549,428 A | 8/1996 | Yeatts |
| 5,550,445 A | 8/1996 | Nii |
| 5,550,739 A | 8/1996 | Hoffmann et al. |
| 5,558,057 A | 9/1996 | Everts |
| 5,614,809 A | 3/1997 | Kiuchi et al. |
| 5,618,335 A * | 4/1997 | Pink ............... B04B 5/12 |
| | | 96/216 |
| 5,621,304 A | 4/1997 | Kiuchi et al. |
| 5,647,534 A | 7/1997 | Kelz et al. |
| 5,653,304 A | 8/1997 | Renfroe |
| 5,676,292 A | 10/1997 | Miller |
| 5,678,847 A | 10/1997 | Izawa et al. |
| D391,911 S | 3/1998 | Lagaay et al. |
| 5,738,062 A | 4/1998 | Everts et al. |
| 5,738,471 A | 4/1998 | Zentner et al. |
| 5,752,791 A | 5/1998 | Ehrlich |
| 5,776,568 A | 7/1998 | Andress et al. |
| 5,788,597 A | 8/1998 | Boll et al. |
| 5,816,650 A | 10/1998 | Lucas, Jr. |
| 5,820,114 A | 10/1998 | Tsai |
| 5,820,150 A | 10/1998 | Archer et al. |

(56) References Cited

U.S. PATENT DOCUMENTS

| | | |
|---|---|---|
| 5,855,386 A | 1/1999 | Atkins |
| 5,860,403 A | 1/1999 | Hirano et al. |
| 5,863,277 A | 1/1999 | Melbourne |
| 5,867,009 A | 2/1999 | Kiuchi et al. |
| 5,883,496 A | 3/1999 | Esaki et al. |
| 5,887,671 A | 3/1999 | Yuki et al. |
| 5,895,063 A | 4/1999 | Hasshi et al. |
| 5,921,343 A | 7/1999 | Yamakaji |
| 5,947,075 A | 9/1999 | Ryu et al. |
| 5,950,590 A | 9/1999 | Everts et al. |
| 5,950,750 A | 9/1999 | Dong et al. |
| 5,957,252 A | 9/1999 | Berthold |
| D414,735 S | 10/1999 | Gerisch et al. |
| 5,960,764 A | 10/1999 | Araki |
| 5,961,106 A | 10/1999 | Shaffer |
| 5,971,290 A | 10/1999 | Echigoya et al. |
| 5,975,573 A | 11/1999 | Belleau |
| 5,976,044 A | 11/1999 | Kuyama |
| 6,000,702 A | 12/1999 | Streiter |
| D421,934 S | 3/2000 | Hunter et al. |
| 6,032,752 A | 3/2000 | Karpik et al. |
| 6,041,744 A | 3/2000 | Oota et al. |
| 6,047,678 A | 4/2000 | Kurihara et al. |
| 6,062,024 A | 5/2000 | Zander et al. |
| 6,067,078 A | 5/2000 | Hartman |
| 6,070,681 A | 6/2000 | Catanzarite et al. |
| 6,078,252 A | 6/2000 | Kulczycki et al. |
| 6,092,877 A | 7/2000 | Rasidescu et al. |
| 6,095,275 A | 8/2000 | Shaw |
| 6,098,739 A | 8/2000 | Anderson et al. |
| 6,112,866 A | 9/2000 | Boichot et al. |
| 6,113,328 A | 9/2000 | Claucherty |
| 6,114,784 A | 9/2000 | Nakano |
| 6,119,636 A | 9/2000 | Fan |
| 6,120,399 A | 9/2000 | Okeson et al. |
| 6,149,540 A | 11/2000 | Johnson et al. |
| 6,152,098 A | 11/2000 | Becker et al. |
| 6,176,796 B1 | 1/2001 | Lislegard |
| 6,184,603 B1 | 2/2001 | Hamai et al. |
| 6,186,547 B1 | 2/2001 | Skabrond et al. |
| 6,196,168 B1 | 3/2001 | Eckerskorn et al. |
| 6,196,634 B1 | 3/2001 | Jurinek |
| 6,198,183 B1 | 3/2001 | Baeumel et al. |
| 6,199,894 B1 | 3/2001 | Anderson |
| 6,202,993 B1 | 3/2001 | Wilms et al. |
| 6,203,043 B1 | 3/2001 | Lehman |
| 6,213,079 B1 | 4/2001 | Watanabe |
| 6,213,081 B1 | 4/2001 | Ryu et al. |
| 6,216,660 B1 | 4/2001 | Ryu et al. |
| 6,217,758 B1 | 4/2001 | Lee |
| 6,227,160 B1 | 5/2001 | Kurihara et al. |
| 6,249,728 B1 | 6/2001 | Streiter |
| 6,260,609 B1 | 7/2001 | Takahashi |
| 6,293,617 B1 | 9/2001 | Sukegawa |
| 6,301,993 B1 | 10/2001 | Orr et al. |
| 6,311,676 B1 | 11/2001 | Berg et al. |
| 6,328,004 B1 | 12/2001 | Rynhart |
| 6,333,620 B1 | 12/2001 | Schmitz et al. |
| 6,334,269 B1 | 1/2002 | Dilks |
| 6,338,688 B1 | 1/2002 | Minami et al. |
| 6,352,142 B1 | 3/2002 | Kim |
| 6,353,786 B1 | 3/2002 | Yamada et al. |
| 6,359,344 B1 | 3/2002 | Klein et al. |
| 6,362,602 B1 | 3/2002 | Kozarekar |
| 6,370,458 B1 | 4/2002 | Shal et al. |
| 6,394,061 B2 | 5/2002 | Ryu et al. |
| 6,397,795 B2 | 6/2002 | Hare |
| D461,151 S | 8/2002 | Morris |
| 6,467,787 B1 | 10/2002 | Marsh |
| D467,200 S | 12/2002 | Luo et al. |
| 6,504,259 B1 | 1/2003 | Kuroda et al. |
| 6,507,778 B2 | 1/2003 | Koh |
| 6,510,829 B2 | 1/2003 | Ito et al. |
| 6,510,891 B2 | 1/2003 | Anderson et al. |
| 6,520,133 B1 | 2/2003 | Wenger et al. |
| 6,523,634 B1 | 2/2003 | Gagnon et al. |
| D472,193 S | 3/2003 | Sinkwitz |
| 6,528,918 B2 | 3/2003 | Paulus-Neues et al. |
| 6,530,730 B2 | 3/2003 | Swensen |
| 6,543,523 B2 | 4/2003 | Hasumi |
| 6,547,224 B2 | 4/2003 | Jensen et al. |
| 6,553,761 B2 | 4/2003 | Beck |
| 6,557,515 B2 | 5/2003 | Furuya et al. |
| 6,561,315 B2 | 5/2003 | Furuya et al. |
| 6,582,002 B2 | 6/2003 | Hogan et al. |
| 6,582,004 B1 | 6/2003 | Hamm |
| D476,935 S | 7/2003 | Boyer |
| 6,591,896 B1 | 7/2003 | Hansen |
| 6,604,034 B1 | 8/2003 | Speck et al. |
| 6,622,804 B2 | 9/2003 | Schmitz et al. |
| 6,622,968 B1 | 9/2003 | St. Clair et al. |
| 6,626,260 B2 | 9/2003 | Gagnon et al. |
| 6,640,766 B2 | 11/2003 | Furuya et al. |
| 6,648,569 B2 | 11/2003 | Douglass et al. |
| 6,661,108 B1 | 12/2003 | Yamada et al. |
| 6,675,562 B2 | 1/2004 | Lawrence |
| 6,685,174 B2 | 2/2004 | Behmenburg et al. |
| 6,691,767 B2 | 2/2004 | Southwick et al. |
| 6,695,566 B2 | 2/2004 | Rodriguez Navio |
| 6,702,052 B1 | 3/2004 | Wakashiro et al. |
| 6,725,905 B2 | 4/2004 | Hirano et al. |
| 6,725,962 B1 | 4/2004 | Fukuda |
| D490,018 S | 5/2004 | Berg et al. |
| 6,732,830 B2 | 5/2004 | Gagnon et al. |
| 6,752,235 B1 | 6/2004 | Bell et al. |
| 6,752,401 B2 | 6/2004 | Burdock |
| 6,761,748 B2 | 7/2004 | Schenk et al. |
| 6,767,022 B1 | 7/2004 | Chevalier |
| D493,749 S | 8/2004 | Duncan |
| 6,769,391 B1 | 8/2004 | Lee et al. |
| 6,772,824 B1 | 8/2004 | Tsuruta |
| 6,777,846 B2 | 8/2004 | Feldner et al. |
| 6,786,187 B2 | 9/2004 | Nagai et al. |
| 6,786,526 B1 | 9/2004 | Blalock |
| D497,324 S | 10/2004 | Chestnut et al. |
| D497,327 S | 10/2004 | Lai |
| 6,799,779 B2 | 10/2004 | Shibayama |
| 6,799,781 B2 | 10/2004 | Rasidescu et al. |
| 6,809,429 B1 | 10/2004 | Frank |
| D498,435 S | 11/2004 | Saito et al. |
| 6,810,667 B2 | 11/2004 | Jung et al. |
| 6,810,977 B2 | 11/2004 | Suzuki |
| 6,820,583 B2 | 11/2004 | Maier |
| 6,820,708 B2 | 11/2004 | Nakamura |
| 6,822,353 B2 | 11/2004 | Koga et al. |
| 6,825,573 B2 | 11/2004 | Suzuki et al. |
| 6,827,184 B1 | 12/2004 | Lin |
| 6,834,736 B2 | 12/2004 | Kramer et al. |
| D500,707 S | 1/2005 | Lu |
| D501,570 S | 2/2005 | Tandrup et al. |
| 6,851,679 B2 | 2/2005 | Downey et al. |
| 6,857,498 B2 | 2/2005 | Vitale et al. |
| 6,860,826 B1 | 3/2005 | Johnson |
| D503,657 S | 4/2005 | Katoh |
| D503,658 S | 4/2005 | Lu |
| D503,905 S | 4/2005 | Saito et al. |
| D504,638 S | 5/2005 | Tanaka et al. |
| 6,892,842 B2 | 5/2005 | Bouffard et al. |
| 6,895,318 B1 | 5/2005 | Barton et al. |
| 6,901,992 B2 | 6/2005 | Kent et al. |
| 6,907,916 B2 | 6/2005 | Koyama |
| 6,908,108 B1 | 6/2005 | Scarla |
| 6,909,200 B2 | 6/2005 | Bouchon |
| D507,766 S | 7/2005 | McMahan et al. |
| 6,915,770 B2 | 7/2005 | Lu |
| 6,916,142 B2 | 7/2005 | Hansen et al. |
| D508,224 S | 8/2005 | Mays et al. |
| 6,923,507 B1 | 8/2005 | Billberg et al. |
| 6,935,297 B2 | 8/2005 | Honda et al. |
| 6,938,508 B1 | 9/2005 | Saagge |
| 6,942,050 B1 | 9/2005 | Honkala et al. |
| 6,945,541 B2 | 9/2005 | Brown |
| 6,951,240 B2 | 10/2005 | Kolb |
| RE38,895 E | 11/2005 | McLemore |

(56) References Cited

U.S. PATENT DOCUMENTS

| | | |
|---|---|---|
| D511,317 S | 11/2005 | Tanaka et al. |
| 6,966,395 B2 | 11/2005 | Schuehmacher et al. |
| 6,966,399 B2 | 11/2005 | Tanigaki et al. |
| 6,976,720 B1 | 12/2005 | Bequette |
| 6,978,857 B2 | 12/2005 | Korenjak |
| 6,988,759 B2 | 1/2006 | Fin et al. |
| 6,997,239 B2 | 2/2006 | Kato |
| 7,000,931 B1 | 2/2006 | Chevalier |
| 7,004,134 B2 | 2/2006 | Higuchi |
| 7,004,137 B2 | 2/2006 | Kunugi et al. |
| 7,011,174 B1 | 3/2006 | James |
| 7,014,241 B2 | 3/2006 | Toyota et al. |
| 7,017,542 B2 | 3/2006 | Wilton et al. |
| D519,439 S | 4/2006 | Dahl et al. |
| 7,032,895 B2 | 4/2006 | Folchert |
| 7,035,836 B2 | 4/2006 | Caponetto et al. |
| D521,413 S | 5/2006 | Katoh |
| 7,040,260 B2 | 5/2006 | Yoshimatsu et al. |
| 7,040,437 B1 | 5/2006 | Fredrickson et al. |
| 7,044,203 B2 | 5/2006 | Yagi et al. |
| 7,051,824 B1 | 5/2006 | Jones et al. |
| 7,055,454 B1 | 6/2006 | Whiting et al. |
| 7,073,482 B2 | 7/2006 | Kirchberger |
| 7,076,351 B2 | 7/2006 | Hamilton et al. |
| 7,077,233 B2 | 7/2006 | Hasegawa |
| 7,089,737 B2 | 8/2006 | Claus |
| 7,096,988 B2 | 8/2006 | Moriyama |
| 7,097,166 B2 | 8/2006 | Folchert |
| 7,100,562 B2 | 9/2006 | Terada et al. |
| 7,104,242 B2 | 9/2006 | Nishi et al. |
| 7,114,585 B2 | 10/2006 | Man et al. |
| 7,117,927 B2 | 10/2006 | Kent et al. |
| 7,124,853 B1 | 10/2006 | Kole, Jr. |
| 7,125,134 B1 | 10/2006 | Hedlund et al. |
| 7,136,729 B2 | 11/2006 | Salman et al. |
| 7,137,764 B2 | 11/2006 | Johnson |
| 7,140,619 B2 | 11/2006 | Hrovat et al. |
| 7,147,075 B2 | 12/2006 | Tanaka et al. |
| 7,152,706 B2 | 12/2006 | Pichler et al. |
| 7,159,557 B2 | 1/2007 | Yasuda et al. |
| 7,165,522 B2 | 1/2007 | Malek et al. |
| 7,168,709 B2 | 1/2007 | Niwa et al. |
| 7,182,169 B2 | 2/2007 | Suzuki |
| 7,185,732 B2 | 3/2007 | Saito et al. |
| 7,204,219 B2 | 4/2007 | Sakurai |
| 7,208,847 B2 | 4/2007 | Taniguchi |
| 7,213,669 B2 | 5/2007 | Fecteau et al. |
| 7,216,733 B2 | 5/2007 | Iwami et al. |
| 7,224,132 B2 | 5/2007 | Cho et al. |
| 7,234,707 B2 | 6/2007 | Green et al. |
| 7,237,789 B1 | 7/2007 | Herman |
| 7,239,032 B1 | 7/2007 | Wilson et al. |
| 7,243,564 B2 | 7/2007 | Chonan et al. |
| 7,243,632 B2 | 7/2007 | Hu |
| D548,662 S | 8/2007 | Markefka |
| D549,133 S | 8/2007 | LePage |
| 7,270,335 B2 | 9/2007 | Hio et al. |
| 7,281,753 B2 | 10/2007 | Curtis et al. |
| 7,286,919 B2 | 10/2007 | Nordgren et al. |
| 7,287,508 B2 | 10/2007 | Kurihara |
| 7,287,619 B2 | 10/2007 | Tanaka et al. |
| D555,036 S | 11/2007 | Eck |
| 7,325,526 B2 | 2/2008 | Kawamoto |
| 7,347,296 B2 | 3/2008 | Nakamura et al. |
| 7,359,787 B2 | 4/2008 | Ono et al. |
| 7,363,961 B2 | 4/2008 | Mori et al. |
| 7,367,247 B2 | 5/2008 | Horiuchi et al. |
| 7,367,417 B2 | 5/2008 | Inui et al. |
| 7,370,724 B2 | 5/2008 | Saito et al. |
| 7,374,012 B2 | 5/2008 | Inui et al. |
| 7,377,351 B2 | 5/2008 | Smith et al. |
| 7,380,622 B2 | 6/2008 | Shimizu |
| 7,386,378 B2 | 6/2008 | Lauwerys et al. |
| 7,387,180 B2 | 6/2008 | Konno et al. |
| 7,395,804 B2 | 7/2008 | Takemoto et al. |
| 7,401,794 B2 | 7/2008 | Laurent et al. |
| 7,407,190 B2 | 8/2008 | Berg et al. |
| 7,412,310 B2 | 8/2008 | Brigham et al. |
| 7,416,234 B2 | 8/2008 | Bequette |
| 7,421,954 B2 | 9/2008 | Bose |
| 7,427,072 B2 | 9/2008 | Brown |
| 7,427,248 B2 | 9/2008 | Chonan |
| D578,433 S | 10/2008 | Kawaguchi et al. |
| D578,934 S | 10/2008 | Tanaka et al. |
| 7,431,024 B2 | 10/2008 | Buchwitz et al. |
| 7,438,147 B2 | 10/2008 | Kato et al. |
| 7,438,153 B2 | 10/2008 | Kalsnes et al. |
| 7,441,789 B2 | 10/2008 | Geiger et al. |
| 7,449,793 B2 | 11/2008 | Cho et al. |
| 7,451,808 B2 | 11/2008 | Busse et al. |
| 7,455,134 B2 | 11/2008 | Severinsky et al. |
| 7,458,593 B2 | 12/2008 | Saito et al. |
| 7,481,287 B2 | 1/2009 | Madson et al. |
| 7,481,293 B2 | 1/2009 | Ogawa et al. |
| 7,483,775 B2 | 1/2009 | Karaba et al. |
| D586,694 S | 2/2009 | Huang et al. |
| 7,490,694 B1 | 2/2009 | Berg et al. |
| 7,497,299 B2 | 3/2009 | Kobayashi |
| 7,497,471 B2 | 3/2009 | Kobayashi |
| 7,497,472 B2 | 3/2009 | Cymbal et al. |
| 7,506,712 B2 | 3/2009 | Kato et al. |
| 7,506,714 B2 | 3/2009 | Davis et al. |
| 7,510,060 B2 | 3/2009 | Izawa et al. |
| 7,510,199 B2 | 3/2009 | Nash et al. |
| D592,998 S | 5/2009 | Woodard et al. |
| 7,530,420 B2 | 5/2009 | Davis et al. |
| 7,537,070 B2 | 5/2009 | Maslov et al. |
| 7,540,511 B2 | 6/2009 | Saito et al. |
| 7,546,892 B2 | 6/2009 | Lan et al. |
| D595,613 S | 7/2009 | Lai et al. |
| 7,559,308 B2 | 7/2009 | Matsuda et al. |
| 7,565,944 B2 | 7/2009 | Sakamoto et al. |
| 7,565,945 B2 | 7/2009 | Okada et al. |
| 7,571,039 B2 | 8/2009 | Chen et al. |
| 7,575,211 B2 | 8/2009 | Andritter |
| 7,597,385 B2 | 10/2009 | Shibata et al. |
| 7,600,603 B2 | 10/2009 | Okada et al. |
| 7,600,762 B2 | 10/2009 | Yasui et al. |
| 7,604,084 B2 | 10/2009 | Okada et al. |
| 7,607,368 B2 | 10/2009 | Takahashi et al. |
| 7,610,132 B2 | 10/2009 | Yanai et al. |
| D604,201 S | 11/2009 | Kawaguchi et al. |
| 7,611,154 B2 | 11/2009 | Delaney |
| 7,621,262 B2 | 11/2009 | Zubeck |
| 7,623,327 B2 | 11/2009 | Ogawa |
| D605,555 S | 12/2009 | Tanaka et al. |
| D606,900 S | 12/2009 | Flores |
| 7,630,807 B2 | 12/2009 | Yoshimura et al. |
| D607,377 S | 1/2010 | Shimomura et al. |
| 7,641,208 B1 | 1/2010 | Barron et al. |
| 7,644,934 B2 | 1/2010 | Mizuta |
| 7,650,959 B2 | 1/2010 | Kato et al. |
| D610,514 S | 2/2010 | Eck |
| 7,658,258 B2 | 2/2010 | Denney |
| 7,677,646 B2 | 3/2010 | Nakamura |
| 7,682,115 B1 | 3/2010 | Jay et al. |
| 7,684,911 B2 | 3/2010 | Seifert et al. |
| 7,703,566 B2 | 4/2010 | Wilson et al. |
| 7,703,730 B2 | 4/2010 | Best et al. |
| 7,703,826 B1 | 4/2010 | German |
| 7,712,562 B2 | 5/2010 | Nozaki |
| 7,717,495 B2 | 5/2010 | Leonard et al. |
| 7,740,092 B2 | 6/2010 | Bender |
| 7,740,103 B2 | 6/2010 | Sasajima |
| 7,740,256 B2 | 6/2010 | Davis |
| 7,742,851 B2 | 6/2010 | Hisada et al. |
| 7,751,959 B2 | 7/2010 | Boon et al. |
| 7,753,427 B2 | 7/2010 | Yamamura et al. |
| D621,423 S | 8/2010 | Nakanishi et al. |
| D622,631 S | 8/2010 | Lai et al. |
| 7,769,505 B2 | 8/2010 | Rask et al. |
| 7,778,741 B2 | 8/2010 | Rao et al. |
| 7,786,886 B2 | 8/2010 | Maruyama et al. |
| 7,795,602 B2 | 9/2010 | Leonard et al. |

(56) References Cited

U.S. PATENT DOCUMENTS

| | | |
|---|---|---|
| 7,802,816 B2 | 9/2010 | McGuire |
| D625,662 S | 10/2010 | Li |
| 7,810,818 B2 | 10/2010 | Bushko |
| 7,819,220 B2 | 10/2010 | Sunsdahl et al. |
| 7,828,098 B2 | 11/2010 | Yamamoto et al. |
| 7,845,452 B2 | 12/2010 | Bennett et al. |
| 7,857,334 B2 | 12/2010 | Seki |
| D631,395 S | 1/2011 | Tandrup et al. |
| 7,862,061 B2 | 1/2011 | Jung |
| 7,874,391 B2 | 1/2011 | Dahl et al. |
| D631,792 S | 2/2011 | Sanschagrin |
| D633,006 S | 2/2011 | Sanschagrin et al. |
| 7,884,574 B2 | 2/2011 | Fukumura et al. |
| 7,885,750 B2 | 2/2011 | Lu |
| 7,899,594 B2 | 3/2011 | Messih et al. |
| 7,912,610 B2 | 3/2011 | Saito et al. |
| 7,913,505 B2 | 3/2011 | Nakamura |
| 7,913,782 B1 | 3/2011 | Foss et al. |
| D636,295 S | 4/2011 | Eck et al. |
| D636,704 S | 4/2011 | Yoo et al. |
| D636,787 S | 4/2011 | Luxon et al. |
| D636,788 S | 4/2011 | Luxon et al. |
| 7,926,822 B2 | 4/2011 | Ohletz et al. |
| 7,931,106 B1 | 4/2011 | Suzuki et al. |
| D637,623 S | 5/2011 | Luxon et al. |
| D638,446 S | 5/2011 | Luxon et al. |
| 7,942,427 B2 | 5/2011 | Lloyd |
| 7,942,447 B2 | 5/2011 | Davis et al. |
| 7,950,486 B2 | 5/2011 | Van et al. |
| D640,598 S | 6/2011 | Zhang |
| 7,954,853 B2 | 6/2011 | Davis et al. |
| 7,959,163 B2 | 6/2011 | Beno et al. |
| 7,962,261 B2 | 6/2011 | Bushko et al. |
| 7,963,529 B2 | 6/2011 | Oteman et al. |
| 7,967,100 B2 | 6/2011 | Cover et al. |
| 7,970,512 B2 | 6/2011 | Lu et al. |
| D641,288 S | 7/2011 | Sun |
| 7,984,780 B2 | 7/2011 | Hirukawa |
| 7,984,915 B2 | 7/2011 | Post et al. |
| D642,493 S | 8/2011 | Goebert et al. |
| 8,002,061 B2 | 8/2011 | Yamamura et al. |
| 8,005,596 B2 | 8/2011 | Lu et al. |
| 8,011,342 B2 | 9/2011 | Bluhm |
| 8,011,420 B2 | 9/2011 | Mazzocco et al. |
| 8,027,775 B2 | 9/2011 | Takenaka et al. |
| 8,029,021 B2 | 10/2011 | Leonard et al. |
| 8,032,281 B2 | 10/2011 | Bujak et al. |
| 8,037,959 B2 | 10/2011 | Yamamura et al. |
| D648,745 S | 11/2011 | Luxon et al. |
| D649,162 S | 11/2011 | Luxon et al. |
| 8,047,324 B2 | 11/2011 | Yao et al. |
| 8,047,451 B2 | 11/2011 | McNaughton |
| 8,050,818 B2 | 11/2011 | Mizuta |
| 8,050,851 B2 | 11/2011 | Aoki et al. |
| 8,050,857 B2 | 11/2011 | Lu et al. |
| 8,051,842 B2 | 11/2011 | Hagelstein et al. |
| 8,052,202 B2 | 11/2011 | Nakamura |
| 8,056,392 B2 | 11/2011 | Ryan et al. |
| 8,056,912 B2 | 11/2011 | Kawabe et al. |
| 8,065,054 B2 | 11/2011 | Tarasinski et al. |
| D650,311 S | 12/2011 | Bracy |
| 8,074,753 B2 | 12/2011 | Tahara et al. |
| 8,075,002 B1 | 12/2011 | Pionke et al. |
| 8,086,371 B2 | 12/2011 | Furuichi et al. |
| 8,087,676 B2 | 1/2012 | McIntyre |
| 8,095,268 B2 | 1/2012 | Parison et al. |
| 8,104,524 B2 | 1/2012 | Manesh et al. |
| 8,108,104 B2 | 1/2012 | Hrovat et al. |
| 8,116,938 B2 | 2/2012 | Itagaki et al. |
| 8,121,757 B2 | 2/2012 | Song et al. |
| 8,122,988 B2 | 2/2012 | Obayashi et al. |
| 8,152,880 B2 | 4/2012 | Matschl et al. |
| 8,157,039 B2 | 4/2012 | Melvin et al. |
| 8,162,086 B2 | 4/2012 | Robinson |
| D660,746 S | 5/2012 | Bracy |
| 8,170,749 B2 | 5/2012 | Mizuta |
| 8,176,957 B2 | 5/2012 | Manesh et al. |
| 8,186,333 B2 | 5/2012 | Sakuyama |
| 8,191,930 B2 | 6/2012 | Davis et al. |
| 8,205,910 B2 | 6/2012 | Leonard et al. |
| 8,209,087 B2 | 6/2012 | Haegglund et al. |
| 8,214,106 B2 | 7/2012 | Ghoneim et al. |
| 8,215,427 B2 | 7/2012 | Rouaud et al. |
| 8,219,262 B2 | 7/2012 | Stiller |
| 8,229,642 B2 | 7/2012 | Post et al. |
| 8,235,155 B2 | 8/2012 | Seegert et al. |
| 8,260,496 B2 | 9/2012 | Gagliano |
| 8,271,175 B2 | 9/2012 | Takenaka et al. |
| 8,272,685 B2 | 9/2012 | Lucas et al. |
| 8,281,891 B2 | 10/2012 | Sugiura |
| 8,296,010 B2 | 10/2012 | Hirao et al. |
| D670,198 S | 11/2012 | Li et al. |
| 8,308,170 B2 | 11/2012 | Van et al. |
| 8,315,764 B2 | 11/2012 | Chen et al. |
| 8,321,088 B2 | 11/2012 | Brown et al. |
| 8,322,497 B2 | 12/2012 | Marjoram et al. |
| 8,328,235 B2 | 12/2012 | Schneider et al. |
| 8,352,143 B2 | 1/2013 | Lu et al. |
| 8,353,265 B2 | 1/2013 | Pursifull |
| 8,355,840 B2 | 1/2013 | Ammon et al. |
| 8,356,472 B2 | 1/2013 | Hiranuma et al. |
| 8,374,748 B2 | 2/2013 | Jolly |
| 8,376,373 B2 | 2/2013 | Conradie |
| 8,376,441 B2 | 2/2013 | Nakamura et al. |
| 8,381,855 B2 | 2/2013 | Suzuki et al. |
| 8,382,125 B2 | 2/2013 | Sunsdahl et al. |
| 8,386,109 B2 | 2/2013 | Nicholls |
| 8,396,627 B2 | 3/2013 | Jung et al. |
| D679,627 S | 4/2013 | Li et al. |
| 8,417,417 B2 | 4/2013 | Chen et al. |
| 8,424,832 B2 | 4/2013 | Robbins et al. |
| D682,737 S | 5/2013 | Li et al. |
| D682,739 S | 5/2013 | Patterson et al. |
| 8,434,774 B2 | 5/2013 | Leclerc et al. |
| 8,439,019 B1 | 5/2013 | Carlson et al. |
| 8,442,720 B2 | 5/2013 | Lu et al. |
| 8,444,161 B2 | 5/2013 | Leclerc et al. |
| 8,447,489 B2 | 5/2013 | Murata et al. |
| 8,457,841 B2 | 6/2013 | Knoll et al. |
| 8,473,157 B2 | 6/2013 | Savaresi et al. |
| 8,479,854 B1 | 7/2013 | Gagnon |
| 8,485,303 B2 | 7/2013 | Yamamoto et al. |
| 8,496,079 B2 | 7/2013 | Wenger et al. |
| 8,517,395 B2 | 8/2013 | Knox et al. |
| D689,396 S | 9/2013 | Wang |
| 8,538,628 B2 | 9/2013 | Backman |
| D691,924 S | 10/2013 | Smith |
| 8,548,678 B2 | 10/2013 | Ummethala et al. |
| 8,550,221 B2 | 10/2013 | Paulides et al. |
| 8,561,403 B2 | 10/2013 | Vandyne et al. |
| 8,567,847 B1 | 10/2013 | King et al. |
| D693,370 S | 11/2013 | Randhawa |
| 8,573,348 B2 | 11/2013 | Cantemir et al. |
| 8,573,605 B2 | 11/2013 | Di Maria |
| 8,579,060 B2 | 11/2013 | George et al. |
| 8,590,651 B2 | 11/2013 | Shigematsu et al. |
| D694,668 S | 12/2013 | Li et al. |
| 8,596,405 B2 | 12/2013 | Sunsdahl et al. |
| 8,613,335 B2 | 12/2013 | Deckard et al. |
| 8,613,337 B2 | 12/2013 | Kinsman et al. |
| 8,626,388 B2 | 1/2014 | Oikawa |
| 8,626,389 B2 | 1/2014 | Sidlosky |
| D699,627 S | 2/2014 | Tang |
| 8,640,814 B2 | 2/2014 | Deckard et al. |
| 8,641,052 B2 | 2/2014 | Kondo et al. |
| 8,645,024 B2 | 2/2014 | Daniels |
| 8,646,555 B2 | 2/2014 | Reed |
| 8,651,557 B2 | 2/2014 | Suzuki |
| 8,657,050 B2 | 2/2014 | Yamaguchi |
| D700,869 S | 3/2014 | Sato et al. |
| D701,469 S | 3/2014 | Lai et al. |
| 8,671,919 B2 | 3/2014 | Nakasugi et al. |
| 8,672,106 B2 | 3/2014 | Laird et al. |
| 8,672,337 B2 | 3/2014 | Van et al. |

(56) References Cited

U.S. PATENT DOCUMENTS

| | | |
|---|---|---|
| D703,102 S | 4/2014 | Eck et al. |
| 8,700,260 B2 | 4/2014 | Jolly et al. |
| 8,708,359 B2 | 4/2014 | Murray |
| 8,712,599 B1 | 4/2014 | Westpfahl |
| 8,712,639 B2 | 4/2014 | Lu et al. |
| D705,127 S | 5/2014 | Patterson et al. |
| 8,718,872 B2 | 5/2014 | Hirao et al. |
| 8,725,351 B1 | 5/2014 | Selden et al. |
| 8,731,774 B2 | 5/2014 | Yang |
| 8,746,719 B2 | 6/2014 | Safranski et al. |
| 8,763,739 B2 | 7/2014 | Belzile et al. |
| 8,783,396 B2 | 7/2014 | Bowman |
| 8,783,400 B2 | 7/2014 | Hirukawa |
| D711,778 S | 8/2014 | Chun et al. |
| D712,311 S | 9/2014 | Morgan et al. |
| 8,827,019 B2 | 9/2014 | Deckard et al. |
| 8,834,307 B2 | 9/2014 | Itoo et al. |
| 8,840,076 B2 | 9/2014 | Zuber et al. |
| 8,869,525 B2 | 10/2014 | Lingenauber et al. |
| D717,695 S | 11/2014 | Matsumura |
| D719,061 S | 12/2014 | Tandrup et al. |
| D722,538 S | 2/2015 | Song et al. |
| 8,960,348 B2 | 2/2015 | Shomura et al. |
| 8,973,693 B2 | 3/2015 | Kinsman et al. |
| D727,794 S | 4/2015 | Tandrup et al. |
| 8,997,908 B2 | 4/2015 | Kinsman et al. |
| 9,016,760 B2 | 4/2015 | Kuroda et al. |
| 9,027,937 B2 | 5/2015 | Ryan et al. |
| D735,077 S | 7/2015 | Sato et al. |
| 9,091,468 B2 | 7/2015 | Colpan et al. |
| D737,724 S | 9/2015 | Schroeder et al. |
| D739,304 S | 9/2015 | Brown |
| 9,133,730 B2 | 9/2015 | Joergl et al. |
| 9,146,061 B2 | 9/2015 | Farlow et al. |
| 9,162,561 B2 | 10/2015 | Marois et al. |
| 9,186,952 B2 | 11/2015 | Yleva |
| 9,194,278 B2 | 11/2015 | Fronk et al. |
| 9,194,282 B2 | 11/2015 | Serres et al. |
| 9,221,508 B1 | 12/2015 | De Haan |
| 9,266,417 B2 | 2/2016 | Nadeau et al. |
| D756,845 S | 5/2016 | Flores |
| 9,327,587 B2 | 5/2016 | Spindler et al. |
| 9,328,652 B2 | 5/2016 | Bruss et al. |
| 9,381,803 B2 | 7/2016 | Galsworthy et al. |
| 9,382,832 B2 | 7/2016 | Bowers |
| D762,522 S | 8/2016 | Kinoshita |
| 9,421,860 B2 | 8/2016 | Schuhmacher et al. |
| 9,428,031 B2 | 8/2016 | Kuwabara et al. |
| 9,440,671 B2 | 9/2016 | Schlangen et al. |
| 9,469,329 B1 | 10/2016 | Leanza |
| D772,755 S | 11/2016 | Tandrup et al. |
| 9,499,044 B2 | 11/2016 | Osaki |
| 9,512,809 B2 | 12/2016 | Tsumiyama et al. |
| 9,566,858 B2 | 2/2017 | Hicke et al. |
| 9,592,713 B2 | 3/2017 | Kinsman et al. |
| D784,199 S | 4/2017 | Dunshee et al. |
| D785,502 S | 5/2017 | Dunshee et al. |
| 9,638,070 B2 | 5/2017 | Kaeser |
| 9,650,078 B2 | 5/2017 | Kinsman et al. |
| 9,713,976 B2 | 7/2017 | Miller et al. |
| 9,718,351 B2 | 8/2017 | Ripley et al. |
| 9,719,463 B2 | 8/2017 | Oltmans et al. |
| 9,725,023 B2 | 8/2017 | Miller et al. |
| 9,752,489 B2 | 9/2017 | Chu |
| 9,776,481 B2 | 10/2017 | Deckard et al. |
| D804,993 S | 12/2017 | Eck et al. |
| D805,009 S | 12/2017 | Eck et al. |
| D805,015 S | 12/2017 | Eck et al. |
| 9,856,817 B2 | 1/2018 | Nicosia et al. |
| 9,884,647 B2 | 2/2018 | Peterson et al. |
| 9,895,946 B2 | 2/2018 | Schlangen et al. |
| 9,908,577 B2 | 3/2018 | Novak et al. |
| 10,017,090 B2 | 7/2018 | Franker et al. |
| 10,036,311 B2 | 7/2018 | Kaeser et al. |
| 10,099,547 B2 | 10/2018 | Bessho et al. |
| 10,124,709 B2 | 11/2018 | Bohnsack et al. |
| D835,545 S | 12/2018 | Hanten et al. |
| 10,183,605 B2 | 1/2019 | Weber et al. |
| 10,189,524 B2 | 1/2019 | Schafer et al. |
| 10,207,555 B2 | 2/2019 | Mailhot et al. |
| 10,221,727 B1 | 3/2019 | Walter et al. |
| 10,239,571 B2 | 3/2019 | Kennedy et al. |
| 10,246,153 B2 | 4/2019 | Deckard et al. |
| 10,300,786 B2 | 5/2019 | Nugteren et al. |
| 10,323,568 B2 | 6/2019 | Kaeser et al. |
| D852,674 S | 7/2019 | Wilcox et al. |
| 10,369,861 B2 | 8/2019 | Deckard et al. |
| 10,371,249 B1 | 8/2019 | Bluhm et al. |
| 10,399,401 B2 | 9/2019 | Schlangen et al. |
| 10,479,422 B2 | 11/2019 | Hollman et al. |
| 10,486,748 B2 | 11/2019 | Deckard et al. |
| 10,495,120 B2 * | 12/2019 | Fisher ................. F16H 61/0025 |
| 10,589,621 B1 | 3/2020 | McKoskey et al. |
| 10,655,536 B1 | 5/2020 | Mueller et al. |
| 10,718,238 B2 | 7/2020 | Wenger et al. |
| 10,723,190 B2 | 7/2020 | Hu et al. |
| D896,125 S | 9/2020 | Hashimoto et al. |
| D896,702 S | 9/2020 | Dunshee et al. |
| D896,703 S | 9/2020 | Dunshee et al. |
| 10,766,533 B2 | 9/2020 | Houkom et al. |
| 10,800,250 B2 | 10/2020 | Nugteren et al. |
| 10,837,329 B2 * | 11/2020 | Parrish ............... F01M 11/0004 |
| 10,876,462 B1 | 12/2020 | Draisey et al. |
| 10,926,799 B2 | 2/2021 | Houkom et al. |
| D913,847 S | 3/2021 | Hashimoto et al. |
| 10,933,932 B2 | 3/2021 | Spindler et al. |
| 10,946,736 B2 | 3/2021 | Fischer et al. |
| 11,104,194 B2 | 8/2021 | Schlangen et al. |
| 11,173,808 B2 | 11/2021 | Swain et al. |
| 11,220,147 B2 | 1/2022 | Hu et al. |
| 11,235,814 B2 | 2/2022 | Schlangen et al. |
| 11,285,807 B2 | 3/2022 | Galsworthy et al. |
| 11,293,540 B2 | 4/2022 | Leclair et al. |
| 11,370,266 B2 | 6/2022 | Borud et al. |
| 11,607,920 B2 | 3/2023 | Schlangen et al. |
| 11,691,674 B2 | 7/2023 | Schleif et al. |
| 11,780,326 B2 | 10/2023 | Schlangen et al. |
| 11,787,251 B2 | 10/2023 | Schlangen et al. |
| 11,884,148 B2 | 1/2024 | Nelson et al. |
| 11,926,190 B2 | 3/2024 | Schlangen et al. |
| 2001/0005803 A1 | 6/2001 | Cochofel et al. |
| 2001/0007396 A1 | 7/2001 | Mizuta |
| 2001/0013433 A1 | 8/2001 | Szymkowiak |
| 2001/0020554 A1 | 9/2001 | Yanase et al. |
| 2001/0021887 A1 | 9/2001 | Obradovich et al. |
| 2001/0031185 A1 | 10/2001 | Swensen |
| 2001/0035642 A1 | 11/2001 | Gotz et al. |
| 2001/0043808 A1 | 11/2001 | Matsunaga et al. |
| 2002/0023792 A1 | 2/2002 | Bouffard et al. |
| 2002/0033295 A1 | 3/2002 | Korenjak et al. |
| 2002/0056969 A1 | 5/2002 | Sawai et al. |
| 2002/0063440 A1 | 5/2002 | Spurr et al. |
| 2002/0074760 A1 | 6/2002 | Eshelman |
| 2002/0082752 A1 | 6/2002 | Obradovich |
| 2002/0088661 A1 | 7/2002 | Gagnon et al. |
| 2002/0147072 A1 | 10/2002 | Goodell et al. |
| 2002/0178968 A1 | 12/2002 | Christensen |
| 2002/0179354 A1 | 12/2002 | White |
| 2003/0001409 A1 | 1/2003 | Semple et al. |
| 2003/0029413 A1 | 2/2003 | Sachdev et al. |
| 2003/0034187 A1 | 2/2003 | Hisada et al. |
| 2003/0066696 A1 | 4/2003 | Nakamura |
| 2003/0070849 A1 | 4/2003 | Whittaker |
| 2003/0104900 A1 | 6/2003 | Takahashi et al. |
| 2003/0125857 A1 | 7/2003 | Madau et al. |
| 2003/0132075 A1 | 7/2003 | Drivers |
| 2003/0168267 A1 | 9/2003 | Borroni-Bird et al. |
| 2003/0173754 A1 | 9/2003 | Bryant |
| 2003/0200016 A1 | 10/2003 | Spillane et al. |
| 2003/0205867 A1 | 11/2003 | Coelingh et al. |
| 2003/0213628 A1 | 11/2003 | Rioux et al. |
| 2004/0010383 A1 | 1/2004 | Lu et al. |
| 2004/0031451 A1 | 2/2004 | Atschreiter et al. |
| 2004/0041358 A1 | 3/2004 | Hrovat et al. |

(56) References Cited

U.S. PATENT DOCUMENTS

| | | |
|---|---|---|
| 2004/0063535 A1 | 4/2004 | Ibaraki |
| 2004/0079561 A1 | 4/2004 | Ozawa et al. |
| 2004/0083730 A1 | 5/2004 | Wizgall et al. |
| 2004/0090020 A1 | 5/2004 | Braswell |
| 2004/0094912 A1 | 5/2004 | Niwa et al. |
| 2004/0107591 A1 | 6/2004 | Cuddy |
| 2004/0108159 A1 | 6/2004 | Rondeau et al. |
| 2004/0129489 A1 | 7/2004 | Brasseal et al. |
| 2004/0130224 A1 | 7/2004 | Mogi et al. |
| 2004/0153782 A1 | 8/2004 | Fukui et al. |
| 2004/0168455 A1 | 9/2004 | Nakamura |
| 2004/0169347 A1 | 9/2004 | Seki |
| 2004/0177827 A1 | 9/2004 | Hoyte et al. |
| 2004/0188159 A1 | 9/2004 | Yatagai et al. |
| 2004/0195018 A1 | 10/2004 | Inui et al. |
| 2004/0195019 A1 | 10/2004 | Kato et al. |
| 2004/0195034 A1 | 10/2004 | Kato et al. |
| 2004/0195797 A1 | 10/2004 | Nash et al. |
| 2004/0206567 A1 | 10/2004 | Kato et al. |
| 2004/0207190 A1 | 10/2004 | Nakagawa et al. |
| 2004/0221669 A1 | 11/2004 | Shimizu et al. |
| 2004/0224806 A1 | 11/2004 | Chonan |
| 2004/0226384 A1 | 11/2004 | Shimizu et al. |
| 2004/0226761 A1 | 11/2004 | Takenaka et al. |
| 2004/0231630 A1 | 11/2004 | Liebert |
| 2004/0231900 A1 | 11/2004 | Tanaka et al. |
| 2005/0012421 A1 | 1/2005 | Fukuda et al. |
| 2005/0045414 A1 | 3/2005 | Takagi et al. |
| 2005/0052080 A1 | 3/2005 | Maslov et al. |
| 2005/0055140 A1 | 3/2005 | Brigham et al. |
| 2005/0077098 A1 | 4/2005 | Takayanagi et al. |
| 2005/0098964 A1 | 5/2005 | Brown |
| 2005/0103558 A1 | 5/2005 | Davis et al. |
| 2005/0131604 A1 | 6/2005 | Lu |
| 2005/0173177 A1 | 8/2005 | Smith et al. |
| 2005/0173180 A1 | 8/2005 | Hypes et al. |
| 2005/0205319 A1 | 9/2005 | Yatagai et al. |
| 2005/0231145 A1 | 10/2005 | Mukai et al. |
| 2005/0235767 A1 | 10/2005 | Shimizu et al. |
| 2005/0235768 A1 | 10/2005 | Shimizu et al. |
| 2005/0242677 A1 | 11/2005 | Akutsu et al. |
| 2005/0246052 A1 | 11/2005 | Coleman et al. |
| 2005/0248116 A1 | 11/2005 | Fanson |
| 2005/0257989 A1 | 11/2005 | Iwami et al. |
| 2005/0257990 A1 | 11/2005 | Shimizu |
| 2005/0267660 A1 | 12/2005 | Fujiwara et al. |
| 2005/0269141 A1 | 12/2005 | Davis et al. |
| 2005/0279244 A1 | 12/2005 | Bose |
| 2005/0279330 A1 | 12/2005 | Okazaki et al. |
| 2005/0280219 A1 | 12/2005 | Brown |
| 2006/0006010 A1 | 1/2006 | Nakamura et al. |
| 2006/0006623 A1 | 1/2006 | Leclair |
| 2006/0006696 A1 | 1/2006 | Umemoto et al. |
| 2006/0017240 A1 | 1/2006 | Laurent et al. |
| 2006/0022619 A1 | 2/2006 | Koike et al. |
| 2006/0042862 A1 | 3/2006 | Saito et al. |
| 2006/0055139 A1 | 3/2006 | Furumi et al. |
| 2006/0065472 A1 | 3/2006 | Ogawa et al. |
| 2006/0075840 A1 | 4/2006 | Saito et al. |
| 2006/0076180 A1 | 4/2006 | Saito et al. |
| 2006/0108174 A1 | 5/2006 | Saito et al. |
| 2006/0112695 A1 | 6/2006 | Neubauer et al. |
| 2006/0130888 A1 | 6/2006 | Yamaguchi et al. |
| 2006/0131088 A1 | 6/2006 | Pawusch et al. |
| 2006/0151970 A1 | 7/2006 | Kaminski et al. |
| 2006/0162990 A1 | 7/2006 | Saito et al. |
| 2006/0169525 A1 | 8/2006 | Saito et al. |
| 2006/0175124 A1 | 8/2006 | Saito et al. |
| 2006/0180383 A1 | 8/2006 | Bataille et al. |
| 2006/0180385 A1 | 8/2006 | Yanai et al. |
| 2006/0185741 A1 | 8/2006 | McKee |
| 2006/0185927 A1 | 8/2006 | Sakamoto et al. |
| 2006/0191734 A1 | 8/2006 | Kobayashi |
| 2006/0191735 A1 | 8/2006 | Kobayashi |
| 2006/0191737 A1 | 8/2006 | Kobayashi |
| 2006/0191739 A1 | 8/2006 | Koga |
| 2006/0196721 A1 | 9/2006 | Saito et al. |
| 2006/0196722 A1 | 9/2006 | Makabe et al. |
| 2006/0197331 A1 | 9/2006 | Davis et al. |
| 2006/0201270 A1 | 9/2006 | Kobayashi |
| 2006/0207823 A1 | 9/2006 | Okada et al. |
| 2006/0207824 A1 | 9/2006 | Saito et al. |
| 2006/0207825 A1 | 9/2006 | Okada et al. |
| 2006/0208564 A1 | 9/2006 | Yuda et al. |
| 2006/0212200 A1 | 9/2006 | Yanai et al. |
| 2006/0219452 A1 | 10/2006 | Okada et al. |
| 2006/0219469 A1 | 10/2006 | Okada et al. |
| 2006/0219470 A1 | 10/2006 | Imagawa et al. |
| 2006/0220330 A1 | 10/2006 | Urquidi et al. |
| 2006/0220341 A1 | 10/2006 | Seki et al. |
| 2006/0270503 A1 | 11/2006 | Suzuki et al. |
| 2006/0278197 A1 | 12/2006 | Takamatsu et al. |
| 2006/0278451 A1 | 12/2006 | Takahashi et al. |
| 2006/0288800 A1 | 12/2006 | Mukai et al. |
| 2007/0000715 A1 | 1/2007 | Denney |
| 2007/0013181 A1 | 1/2007 | Heck |
| 2007/0018419 A1 | 1/2007 | Kinouchi et al. |
| 2007/0023566 A1 | 2/2007 | Howard |
| 2007/0068726 A1 | 3/2007 | Shimizu |
| 2007/0073461 A1 | 3/2007 | Fielder |
| 2007/0074588 A1 | 4/2007 | Harata et al. |
| 2007/0074589 A1 | 4/2007 | Harata et al. |
| 2007/0074927 A1 | 4/2007 | Okada et al. |
| 2007/0074928 A1 | 4/2007 | Okada et al. |
| 2007/0080006 A1 | 4/2007 | Yamaguchi |
| 2007/0095601 A1 | 5/2007 | Okada et al. |
| 2007/0096449 A1 | 5/2007 | Okada et al. |
| 2007/0120332 A1 | 5/2007 | Bushko et al. |
| 2007/0144800 A1 | 6/2007 | Stone |
| 2007/0158920 A1 | 7/2007 | Delaney |
| 2007/0169989 A1 | 7/2007 | Eavenson et al. |
| 2007/0175696 A1 | 8/2007 | Saito et al. |
| 2007/0209613 A1 | 9/2007 | Pantow |
| 2007/0214818 A1 | 9/2007 | Nakamura |
| 2007/0215404 A1 | 9/2007 | Lan et al. |
| 2007/0227793 A1 | 10/2007 | Nozaki et al. |
| 2007/0242398 A1 | 10/2007 | Ogawa |
| 2007/0251744 A1 | 11/2007 | Matsuzawa |
| 2007/0255466 A1 | 11/2007 | Chiao |
| 2007/0257479 A1 | 11/2007 | Davis et al. |
| 2007/0261904 A1 | 11/2007 | Fecteau et al. |
| 2008/0022981 A1 | 1/2008 | Keyaki et al. |
| 2008/0023240 A1 | 1/2008 | Sunsdahl et al. |
| 2008/0023249 A1 | 1/2008 | Sunsdahl et al. |
| 2008/0028603 A1 | 2/2008 | Takegawa et al. |
| 2008/0041335 A1 | 2/2008 | Buchwitz et al. |
| 2008/0048423 A1 | 2/2008 | Eriksson et al. |
| 2008/0053738 A1 | 3/2008 | Kosuge et al. |
| 2008/0053743 A1 | 3/2008 | Tomita |
| 2008/0059034 A1 | 3/2008 | Lu |
| 2008/0083392 A1 | 4/2008 | Kurihara et al. |
| 2008/0084091 A1 | 4/2008 | Nakamura et al. |
| 2008/0093883 A1 | 4/2008 | Shibata et al. |
| 2008/0143505 A1 | 6/2008 | Maruyama et al. |
| 2008/0157592 A1 | 7/2008 | Bax et al. |
| 2008/0172155 A1 | 7/2008 | Takamatsu et al. |
| 2008/0178830 A1 | 7/2008 | Sposato |
| 2008/0183353 A1 | 7/2008 | Post et al. |
| 2008/0199253 A1 | 8/2008 | Okada et al. |
| 2008/0202483 A1 | 8/2008 | Procknow |
| 2008/0240847 A1 | 10/2008 | Crouse |
| 2008/0243336 A1 | 10/2008 | Fitzgibbons |
| 2008/0256738 A1 | 10/2008 | Malone |
| 2008/0257625 A1 | 10/2008 | Stranges |
| 2008/0257630 A1 | 10/2008 | Takeshima et al. |
| 2008/0271937 A1 | 11/2008 | King et al. |
| 2008/0275606 A1 | 11/2008 | Tarasinski et al. |
| 2008/0284124 A1 | 11/2008 | Brady et al. |
| 2008/0289796 A1 | 11/2008 | Sasano et al. |
| 2008/0289896 A1 | 11/2008 | Kosuge et al. |
| 2008/0299448 A1 | 12/2008 | Buck et al. |
| 2008/0303234 A1 | 12/2008 | McCann |
| 2008/0308334 A1 | 12/2008 | Leonard et al. |
| 2008/0308337 A1 | 12/2008 | Ishida |

(56) References Cited

U.S. PATENT DOCUMENTS

| | | |
|---|---|---|
| 2009/0000849 A1 | 1/2009 | Leonard et al. |
| 2009/0014246 A1 | 1/2009 | Lin |
| 2009/0014977 A1 | 1/2009 | Molenaar |
| 2009/0015023 A1 | 1/2009 | Fleckner |
| 2009/0037051 A1 | 2/2009 | Shimizu et al. |
| 2009/0064642 A1 | 3/2009 | Sato et al. |
| 2009/0065285 A1 | 3/2009 | Maeda et al. |
| 2009/0071737 A1 | 3/2009 | Leonard et al. |
| 2009/0071739 A1 | 3/2009 | Leonard et al. |
| 2009/0078082 A1 | 3/2009 | Poskie et al. |
| 2009/0078491 A1 | 3/2009 | Tsutsumikoshi et al. |
| 2009/0091101 A1 | 4/2009 | Leonard et al. |
| 2009/0091137 A1 | 4/2009 | Nishida et al. |
| 2009/0093928 A1 | 4/2009 | Getman et al. |
| 2009/0108546 A1 | 4/2009 | Ohletz et al. |
| 2009/0108617 A1 | 4/2009 | Songwe, Jr. |
| 2009/0121518 A1 | 5/2009 | Leonard et al. |
| 2009/0146119 A1 | 6/2009 | Bailey et al. |
| 2009/0152035 A1 | 6/2009 | Okada et al. |
| 2009/0152036 A1 | 6/2009 | Okada et al. |
| 2009/0177345 A1 | 7/2009 | Severinsky et al. |
| 2009/0179509 A1 | 7/2009 | Gerundt et al. |
| 2009/0183939 A1 | 7/2009 | Smith et al. |
| 2009/0189373 A1 | 7/2009 | Schramm et al. |
| 2009/0240427 A1 | 9/2009 | Siereveld et al. |
| 2009/0261542 A1 | 10/2009 | McIntyre |
| 2009/0286643 A1 | 11/2009 | Brown |
| 2009/0301830 A1 | 12/2009 | Kinsman et al. |
| 2009/0302590 A1 | 12/2009 | Van et al. |
| 2009/0314462 A1 | 12/2009 | Yahia et al. |
| 2010/0012412 A1 | 1/2010 | Deckard et al. |
| 2010/0017059 A1 | 1/2010 | Lu et al. |
| 2010/0019539 A1 | 1/2010 | Nakamura et al. |
| 2010/0019722 A1 | 1/2010 | Sanchez |
| 2010/0019729 A1 | 1/2010 | Kaita et al. |
| 2010/0031935 A1 | 2/2010 | Vandyne et al. |
| 2010/0057297 A1 | 3/2010 | Tagaki et al. |
| 2010/0120565 A1 | 5/2010 | Kochidomari et al. |
| 2010/0121512 A1 | 5/2010 | Takahashi et al. |
| 2010/0121529 A1 | 5/2010 | Savaresi et al. |
| 2010/0152969 A1 | 6/2010 | Li et al. |
| 2010/0155170 A1 | 6/2010 | Melvin et al. |
| 2010/0162989 A1 | 7/2010 | Aamand et al. |
| 2010/0163324 A1 | 7/2010 | Jyoutaki et al. |
| 2010/0181134 A1 | 7/2010 | Sugiura |
| 2010/0187032 A1 | 7/2010 | Yamamura et al. |
| 2010/0194086 A1 | 8/2010 | Yamamura et al. |
| 2010/0211242 A1 | 8/2010 | Kelty et al. |
| 2010/0211261 A1 | 8/2010 | Sasaki et al. |
| 2010/0230876 A1 | 9/2010 | Inoue et al. |
| 2010/0252972 A1 | 10/2010 | Cox et al. |
| 2010/0253018 A1 | 10/2010 | Peterson |
| 2010/0301571 A1 | 12/2010 | Van et al. |
| 2010/0314184 A1 | 12/2010 | Stenberg et al. |
| 2011/0012334 A1 | 1/2011 | Malmberg |
| 2011/0035089 A1 | 2/2011 | Hirao et al. |
| 2011/0035105 A1 | 2/2011 | Jolly |
| 2011/0062748 A1 | 3/2011 | Kaita et al. |
| 2011/0074123 A1 | 3/2011 | Fought et al. |
| 2011/0094225 A1 | 4/2011 | Kistner et al. |
| 2011/0094813 A1 | 4/2011 | Suzuki et al. |
| 2011/0094816 A1 | 4/2011 | Suzuki et al. |
| 2011/0147106 A1 | 6/2011 | Wenger et al. |
| 2011/0153158 A1 | 6/2011 | Acocella |
| 2011/0155082 A1 | 6/2011 | Takano |
| 2011/0155087 A1 | 6/2011 | Wenger et al. |
| 2011/0168126 A1 | 7/2011 | Fujikawa |
| 2011/0240393 A1 | 10/2011 | Hurd et al. |
| 2011/0298189 A1 | 12/2011 | Schneider et al. |
| 2012/0029770 A1 | 2/2012 | Hirao et al. |
| 2012/0031688 A1 | 2/2012 | Safranski et al. |
| 2012/0031693 A1 | 2/2012 | Deckard et al. |
| 2012/0031694 A1 | 2/2012 | Deckard et al. |
| 2012/0053790 A1 | 3/2012 | Oikawa |
| 2012/0053791 A1 | 3/2012 | Harada |
| 2012/0055728 A1 | 3/2012 | Bessho et al. |
| 2012/0055729 A1 | 3/2012 | Bessho et al. |
| 2012/0073527 A1 | 3/2012 | Oltmans et al. |
| 2012/0073537 A1* | 3/2012 | Oltmans ............... F01M 9/102 123/195 R |
| 2012/0078470 A1 | 3/2012 | Hirao et al. |
| 2012/0085588 A1 | 4/2012 | Kinsman et al. |
| 2012/0119454 A1 | 5/2012 | Di Maria |
| 2012/0125022 A1 | 5/2012 | Maybury et al. |
| 2012/0152632 A1 | 6/2012 | Azuma |
| 2012/0161468 A1 | 6/2012 | Tsumiyama et al. |
| 2012/0168268 A1 | 7/2012 | Bruno et al. |
| 2012/0193163 A1 | 8/2012 | Wimpfheimer et al. |
| 2012/0212013 A1 | 8/2012 | Ripley et al. |
| 2012/0217078 A1 | 8/2012 | Kinsman et al. |
| 2012/0217116 A1 | 8/2012 | Nishimoto |
| 2012/0223500 A1 | 9/2012 | Kinsman et al. |
| 2012/0247888 A1 | 10/2012 | Chikuma et al. |
| 2012/0265402 A1 | 10/2012 | Post et al. |
| 2012/0277953 A1 | 11/2012 | Savaresi et al. |
| 2012/0283930 A1 | 11/2012 | Venton-Walters et al. |
| 2012/0297765 A1 | 11/2012 | Vigild et al. |
| 2013/0009350 A1 | 1/2013 | Wolf-Monheim |
| 2013/0018559 A1 | 1/2013 | Epple et al. |
| 2013/0030650 A1 | 1/2013 | Norris et al. |
| 2013/0033070 A1 | 2/2013 | Kinsman et al. |
| 2013/0041545 A1 | 2/2013 | Baer et al. |
| 2013/0060423 A1 | 3/2013 | Jolly |
| 2013/0060444 A1 | 3/2013 | Matsunaga et al. |
| 2013/0074487 A1 | 3/2013 | Herold et al. |
| 2013/0075183 A1 | 3/2013 | Kochidomari et al. |
| 2013/0079988 A1 | 3/2013 | Hirao et al. |
| 2013/0087396 A1 | 4/2013 | Itoo et al. |
| 2013/0103259 A1 | 4/2013 | Eng et al. |
| 2013/0158799 A1 | 6/2013 | Kamimura |
| 2013/0161921 A1 | 6/2013 | Cheng et al. |
| 2013/0190980 A1 | 7/2013 | Ramirez Ruiz |
| 2013/0197732 A1 | 8/2013 | Pearlman et al. |
| 2013/0197756 A1 | 8/2013 | Ramirez Ruiz |
| 2013/0218414 A1 | 8/2013 | Meitinger et al. |
| 2013/0226405 A1 | 8/2013 | Koumura et al. |
| 2013/0261893 A1 | 10/2013 | Yang |
| 2013/0304319 A1 | 11/2013 | Daniels |
| 2013/0307243 A1 | 11/2013 | Ham |
| 2013/0319784 A1 | 12/2013 | Kennedy et al. |
| 2013/0319785 A1 | 12/2013 | Spindler et al. |
| 2013/0328277 A1 | 12/2013 | Ryan et al. |
| 2013/0334394 A1 | 12/2013 | Parison et al. |
| 2013/0338869 A1 | 12/2013 | Tsumano |
| 2013/0341143 A1 | 12/2013 | Brown |
| 2013/0345933 A1 | 12/2013 | Norton et al. |
| 2014/0001717 A1 | 1/2014 | Giovanardi et al. |
| 2014/0005888 A1 | 1/2014 | Bose et al. |
| 2014/0008136 A1 | 1/2014 | Bennett |
| 2014/0012467 A1 | 1/2014 | Knox et al. |
| 2014/0046539 A1 | 2/2014 | Wijffels et al. |
| 2014/0058606 A1 | 2/2014 | Hilton |
| 2014/0060954 A1 | 3/2014 | Smith et al. |
| 2014/0062048 A1 | 3/2014 | Schlangen et al. |
| 2014/0065936 A1 | 3/2014 | Smith et al. |
| 2014/0067215 A1 | 3/2014 | Wetterlund et al. |
| 2014/0090935 A1 | 4/2014 | Pongo et al. |
| 2014/0095022 A1 | 4/2014 | Cashman et al. |
| 2014/0102820 A1 | 4/2014 | Deckard et al. |
| 2014/0103627 A1 | 4/2014 | Deckard et al. |
| 2014/0109627 A1 | 4/2014 | Lee et al. |
| 2014/0113766 A1 | 4/2014 | Yagyu et al. |
| 2014/0124279 A1 | 5/2014 | Schlangen et al. |
| 2014/0125018 A1 | 5/2014 | Brady et al. |
| 2014/0129083 A1 | 5/2014 | O'Connor et al. |
| 2014/0131971 A1 | 5/2014 | Hou |
| 2014/0136048 A1 | 5/2014 | Ummethala et al. |
| 2014/0156143 A1 | 6/2014 | Evangelou et al. |
| 2014/0167372 A1 | 6/2014 | Kim et al. |
| 2014/0203533 A1 | 7/2014 | Safranski et al. |
| 2014/0217774 A1 | 8/2014 | Peterson et al. |
| 2014/0224561 A1 | 8/2014 | Shinbori et al. |
| 2014/0230797 A1 | 8/2014 | Meshenky et al. |
| 2014/0288763 A1 | 9/2014 | Bennett et al. |

(56) References Cited

U.S. PATENT DOCUMENTS

| | | |
|---|---|---|
| 2014/0311143 A1 | 10/2014 | Speidel et al. |
| 2014/0353956 A1 | 12/2014 | Bjerketvedt et al. |
| 2014/0358373 A1 | 12/2014 | Kikuchi et al. |
| 2014/0360794 A1 | 12/2014 | Tallman |
| 2015/0002404 A1 | 1/2015 | Hooton |
| 2015/0029018 A1 | 1/2015 | Bowden et al. |
| 2015/0039199 A1 | 2/2015 | Kikuchi |
| 2015/0041237 A1 | 2/2015 | Nadeau et al. |
| 2015/0047917 A1 | 2/2015 | Burt et al. |
| 2015/0057885 A1 | 2/2015 | Brady et al. |
| 2015/0061275 A1 | 3/2015 | Deckard et al. |
| 2015/0071759 A1 | 3/2015 | Bidner et al. |
| 2015/0210137 A1 | 7/2015 | Kinsman et al. |
| 2015/0210319 A1 | 7/2015 | Tiramani |
| 2015/0259011 A1 | 9/2015 | Deckard et al. |
| 2015/0260123 A1 | 9/2015 | Knollmayr |
| 2015/0275742 A1 | 10/2015 | Chekaiban et al. |
| 2015/0375614 A1 | 12/2015 | Osaki |
| 2015/0377341 A1 | 12/2015 | Renner et al. |
| 2016/0059660 A1 | 3/2016 | Brady et al. |
| 2016/0061314 A1 | 3/2016 | Kuhl et al. |
| 2016/0108866 A1 | 4/2016 | Dewit et al. |
| 2016/0167715 A1 | 6/2016 | Kosuge et al. |
| 2016/0176283 A1 | 6/2016 | Hicke et al. |
| 2016/0176284 A1 | 6/2016 | Nugteren et al. |
| 2016/0341148 A1 | 11/2016 | Maki et al. |
| 2017/0029036 A1 | 2/2017 | Proulx et al. |
| 2017/0120946 A1 | 5/2017 | Gong et al. |
| 2017/0131095 A1 | 5/2017 | Kim |
| 2017/0152810 A1 | 6/2017 | Wicks |
| 2017/0166255 A1 | 6/2017 | Peterson et al. |
| 2017/0175621 A1 | 6/2017 | Schenkel |
| 2017/0199094 A1 | 7/2017 | Duff et al. |
| 2017/0233022 A1 | 8/2017 | Marko |
| 2017/0248087 A1 | 8/2017 | Reisenberger et al. |
| 2017/0268200 A1 | 9/2017 | Todokoro |
| 2018/0065465 A1 | 3/2018 | Ward et al. |
| 2018/0118053 A1 | 5/2018 | Sunsdahl et al. |
| 2018/0142609 A1 | 5/2018 | Seo et al. |
| 2018/0178677 A1 | 6/2018 | Swain et al. |
| 2018/0312025 A1 | 11/2018 | Danielson et al. |
| 2018/0326843 A1 | 11/2018 | Danielson et al. |
| 2019/0078679 A1 | 3/2019 | Leclair et al. |
| 2019/0118883 A1 | 4/2019 | Spindler et al. |
| 2019/0118884 A1 | 4/2019 | Spindler et al. |
| 2019/0143871 A1 | 5/2019 | Weber et al. |
| 2019/0210457 A1 | 7/2019 | Galsworthy et al. |
| 2019/0210668 A1 | 7/2019 | Endrizzi et al. |
| 2019/0248227 A1 | 8/2019 | Nugteren et al. |
| 2019/0264635 A1 | 8/2019 | Oltmans et al. |
| 2020/0010125 A1 | 1/2020 | Peterson et al. |
| 2020/0070709 A1 | 3/2020 | Weber et al. |
| 2020/0346542 A1 | 11/2020 | Rasa et al. |
| 2021/0023936 A1 | 1/2021 | Marietta |
| 2021/0024007 A1 | 1/2021 | Fredrickson et al. |
| 2021/0088138 A1 | 3/2021 | Yoshino |
| 2021/0206219 A1 | 7/2021 | Stieglitz et al. |
| 2021/0213822 A1 | 7/2021 | Ripley et al. |
| 2021/0300472 A1 | 9/2021 | Thomas et al. |
| 2021/0331543 A1 | 10/2021 | Zock et al. |
| 2021/0354542 A1 | 11/2021 | Schleif et al. |
| 2021/0354760 A1 | 11/2021 | Schleif et al. |
| 2021/0370737 A1 | 12/2021 | Zock et al. |
| 2022/0105795 A1 | 4/2022 | Nelson et al. |
| 2022/0120340 A1 | 4/2022 | Nichols et al. |
| 2022/0266645 A1 | 8/2022 | Badino et al. |
| 2022/0339984 A1 | 10/2022 | Starik et al. |
| 2023/0399975 A1 | 12/2023 | Tittl et al. |
| 2023/0415558 A1 | 12/2023 | Schleif et al. |

FOREIGN PATENT DOCUMENTS

| | | | |
|---|---|---|---|
| CA | 1283836 C * | 5/1991 | ........... B60K 17/356 |
| CA | 2746655 A1 | 7/2010 | |
| CH | 317335 | 11/1956 | |
| CN | 2255379 Y | 6/1997 | |
| CN | 1268997 | 10/2000 | |
| CN | 2544987 Y | 4/2003 | |
| CN | 1660615 A | 8/2005 | |
| CN | 1746803 A | 3/2006 | |
| CN | 1749048 A | 3/2006 | |
| CN | 1792661 A | 6/2006 | |
| CN | 1810530 A | 8/2006 | |
| CN | 1982110 A | 6/2007 | |
| CN | 101424200 A | 5/2009 | |
| CN | 101511664 A | 8/2009 | |
| CN | 101549626 A | 10/2009 | |
| CN | 101701547 A | 5/2010 | |
| CN | 101708694 A | 5/2010 | |
| CN | 201723635 U | 1/2011 | |
| CN | 102069813 A | 5/2011 | |
| CN | 102121415 A | 7/2011 | |
| CN | 102168732 A | 8/2011 | |
| CN | 201914049 U | 8/2011 | |
| CN | 102226464 A | 10/2011 | |
| CN | 202040257 U | 11/2011 | |
| CN | 102616104 A | 8/2012 | |
| CN | 102627063 A | 8/2012 | |
| CN | 102678808 A | 9/2012 | |
| CN | 102729760 A | 10/2012 | |
| CN | 202468817 U | 10/2012 | |
| CN | 102840265 A | 12/2012 | |
| CN | 103075278 A | 5/2013 | |
| CN | 202986930 U | 6/2013 | |
| CN | 203702310 U | 7/2014 | |
| CN | 212690200 U | 3/2021 | |
| CN | 215292711 U | 12/2021 | |
| DE | 0037435 | 10/1886 | |
| DE | 0116605 | 2/1900 | |
| DE | 1755101 | 4/1971 | |
| DE | 2210070 | 9/1973 | |
| DE | 2701939 A1 * | 7/1978 | |
| DE | 3033707 | 4/1982 | |
| DE | 3825349 A1 | 2/1989 | |
| DE | 4427322 A1 | 2/1996 | |
| DE | 19508302 A1 | 9/1996 | |
| DE | 4447138 | 12/1997 | |
| DE | 19735021 A1 | 2/1999 | |
| DE | 19949787 A1 | 4/2000 | |
| DE | 19922745 A1 | 12/2000 | |
| DE | 202005017990 U1 | 3/2006 | |
| DE | 102005003077 A1 | 8/2006 | |
| DE | 202005005999 U1 | 8/2006 | |
| DE | 102007024126 | 12/2008 | |
| DE | 102010020544 A1 | 1/2011 | |
| DE | 102014000450 A1 | 8/2014 | |
| DE | 102016012781 A1 | 4/2017 | |
| EP | 0047128 | 3/1982 | |
| EP | 0237085 | 9/1987 | |
| EP | 0238077 A2 | 9/1987 | |
| EP | 0398804 A1 | 11/1990 | |
| EP | 0403803 A1 | 12/1990 | |
| EP | 0471128 A1 | 2/1992 | |
| EP | 0511654 A2 | 11/1992 | |
| EP | 0544108 A1 | 6/1993 | |
| EP | 0546295 A1 | 6/1993 | |
| EP | 0405123 | 10/1993 | |
| EP | 0568251 A1 | 11/1993 | |
| EP | 0575962 A1 | 12/1993 | |
| EP | 0473766 | 2/1994 | |
| EP | 0691226 A1 | 1/1996 | |
| EP | 0709247 A2 | 5/1996 | |
| EP | 0794096 A2 | 9/1997 | |
| EP | 0856427 A1 | 8/1998 | |
| EP | 0893618 A2 | 1/1999 | |
| EP | 0898352 A1 | 2/1999 | |
| EP | 1013310 A1 | 6/2000 | |
| EP | 1172239 A2 | 1/2002 | |
| EP | 1215107 A1 | 6/2002 | |
| EP | 1219475 A1 | 7/2002 | |
| EP | 1382475 A1 | 1/2004 | |
| EP | 1433645 A2 | 6/2004 | |
| EP | 1449688 A2 | 8/2004 | |
| EP | 1481834 A2 | 12/2004 | |

(56) References Cited

FOREIGN PATENT DOCUMENTS

| | | |
|---|---|---|
| EP | 1493624 A1 | 1/2005 |
| EP | 1164897 | 2/2005 |
| EP | 1557345 A2 | 7/2005 |
| EP | 1564123 A2 | 8/2005 |
| EP | 1697646 | 9/2006 |
| EP | 2033878 A1 | 3/2009 |
| EP | 2055520 A2 | 5/2009 |
| EP | 2057060 A2 | 5/2009 |
| EP | 2123933 A2 | 11/2009 |
| EP | 2145808 A1 | 1/2010 |
| EP | 1520978 B1 | 4/2010 |
| EP | 2236395 A1 | 10/2010 |
| EP | 1980741 B1 | 9/2011 |
| EP | 2517904 A1 | 10/2012 |
| EP | 2589785 A1 | 5/2013 |
| EP | 2923926 A2 | 9/2015 |
| FR | 2460797 A1 | 1/1981 |
| FR | 2914597 A1 | 10/2008 |
| FR | 2935642 | 3/2010 |
| FR | 2936028 A1 | 3/2010 |
| FR | 2941424 A1 | 7/2010 |
| GB | 2036659 A | 7/1980 |
| GB | 2081191 A | 2/1982 |
| GB | 2316923 A | 3/1998 |
| GB | 2349483 A | 11/2000 |
| GB | 2423066 A | 8/2006 |
| GB | 2431704 A | 5/2007 |
| GB | 2454349 A | 5/2009 |
| JP | 58-126434 | 7/1983 |
| JP | 59-039933 | 3/1984 |
| JP | 60-209616 A | 10/1985 |
| JP | 61-135910 | 6/1986 |
| JP | 62-007925 A | 1/1987 |
| JP | 02-155815 A | 6/1990 |
| JP | 04-368211 A | 12/1992 |
| JP | 05-149443 A | 6/1993 |
| JP | 05-178055 A | 7/1993 |
| JP | 06-156036 A | 6/1994 |
| JP | 06-325977 A | 11/1994 |
| JP | 07-040783 | 2/1995 |
| JP | 07-117433 | 5/1995 |
| JP | 2898949 B2 | 6/1999 |
| JP | 11-334447 A | 12/1999 |
| JP | 2000-177434 A | 6/2000 |
| JP | 2001-018623 A | 1/2001 |
| JP | 3137209 B2 | 2/2001 |
| JP | 2001-121939 A | 5/2001 |
| JP | 2001-130304 A | 5/2001 |
| JP | 2002-219921 A | 8/2002 |
| JP | 2003-237530 A | 8/2003 |
| JP | 2004-243992 A | 9/2004 |
| JP | 2004-308453 A | 11/2004 |
| JP | 2005-130629 A | 5/2005 |
| JP | 2005-186911 A | 7/2005 |
| JP | 2005-193788 A | 7/2005 |
| JP | 2005-299469 A | 10/2005 |
| JP | 3769675 B2 * | 4/2006 |
| JP | 2006-232058 A | 9/2006 |
| JP | 2006-232061 A | 9/2006 |
| JP | 2006-256579 A | 9/2006 |
| JP | 2006-256580 A | 9/2006 |
| JP | 2006-281839 A | 10/2006 |
| JP | 2007-064080 A | 3/2007 |
| JP | 2007-083864 A | 4/2007 |
| JP | 2007-106319 A | 4/2007 |
| JP | 3928436 B2 * | 6/2007 |
| JP | 2007-278228 A | 10/2007 |
| JP | 2007-532814 | 11/2007 |
| JP | 2008-013149 A | 1/2008 |
| JP | 2009-035220 A | 2/2009 |
| JP | 2009-160964 A | 7/2009 |
| JP | 2009-173147 A | 8/2009 |
| JP | 2009-220765 A | 10/2009 |
| JP | 2009-241872 A | 10/2009 |
| JP | 2009-281330 A | 12/2009 |
| JP | 2010-064744 A | 3/2010 |
| JP | 2010-095106 A | 4/2010 |
| JP | 2011-126405 A | 6/2011 |
| JP | 2016161028 A * | 9/2016 |
| JP | 2017-043130 A | 3/2017 |
| KR | 10-2008-0028174 A | 3/2008 |
| SU | 646076 A1 * | 2/1979 |
| WO | 92/10693 A1 | 6/1992 |
| WO | 98/30430 A1 | 7/1998 |
| WO | 00/53057 A1 | 9/2000 |
| WO | 2004/085194 A1 | 10/2004 |
| WO | 2005/059382 A1 | 6/2005 |
| WO | 2007/103197 A2 | 9/2007 |
| WO | 2008/013564 A1 | 1/2008 |
| WO | 2008/016377 A2 | 2/2008 |
| WO | 2008/115459 A1 | 9/2008 |
| WO | 2009/059407 A1 | 5/2009 |
| WO | 2009/096998 A1 | 8/2009 |
| WO | 2010/081979 A1 | 7/2010 |
| WO | 2010/148014 A1 | 12/2010 |
| WO | 2012/018896 A2 | 2/2012 |
| WO | 2012/040553 A2 | 3/2012 |
| WO | 2012/109546 A1 | 8/2012 |
| WO | 2012/174793 A1 | 12/2012 |
| WO | 2013/166310 A1 | 11/2013 |
| WO | 2013/174662 A1 | 11/2013 |
| WO | 2014/039432 A2 | 3/2014 |
| WO | 2014/039433 A2 | 3/2014 |
| WO | 2014/047488 A1 | 3/2014 |
| WO | 2014/059258 A1 | 4/2014 |
| WO | 2014/143953 A2 | 9/2014 |
| WO | 2014/193975 A1 | 12/2014 |
| WO | 2015/036984 A1 | 3/2015 |
| WO | 2015/036985 A1 | 3/2015 |
| WO | 2015/159571 A1 | 10/2015 |
| WO | 2016/038591 A1 | 3/2016 |
| WO | 2016/099770 A2 | 6/2016 |
| WO | 2016/186942 A1 | 11/2016 |
| WO | 2018/118176 A1 | 6/2018 |
| WO | 2018/118508 A2 | 6/2018 |
| WO | 2019/140026 A1 | 7/2019 |
| WO | 2020/223379 A1 | 11/2020 |

OTHER PUBLICATIONS

CA—1232167-A English Translation (Year: 1988).*
CA—1283836-C English Translation (Year: 1991).*
JP—3928436-B2 English Translation (Year: 2007).*
JP—2016161028-A English Translation (Year: 2016).*
SU—646076-A1 English Translation (Year: 1979).*
Polaris Ranger Brochure 2009, copyright 2008; 32 pages.
Polaris Ranger Brochure ATVs and Side .times. Sides Brochure 2010, .Copyrgt. 2009, 26 pages.
Polaris Ranger Off-Road Utility Vehicles Brochure 2004, .Copyrgt. 2003; 20 pages.
Polaris Ranger RZR Brochure 2011, .Copyrgt. 2010; 16 pages.
Polaris Ranger Welcome to Ranger Country Brochure 2006, .Copyrgt. 2005, 24 pages.
Polaris Ranger Work/Play Only Brochure 2008, .Copyrgt. 2007, 28 pages.
Polaris RZR XP 1000 Radiator Relocation Kit, https://abffabrication.com/shop/polaris-rzr-xp-1000-radiator-relocation-kit/.
Polaris RZR XP 900 Review, retrieved from www.world-of-atvs.com/polaris-rzr-xp-900.html on Jan. 10, 2019, Internet Wayback Machine capture dated Mar. 12, 2012 (Year: 2012).
Radiator Relocation Kit for Polaris Scrambler, High Lifter, http://www.highlifter.com/p-4598-radiator-relocation-kit-for-polaris-scra- mbler-8501000-see-apps.aspx, last accessed Nov. 4, 2015, 1 page.
Radiator Relocation Kit-Polaris Sportsman 550/850, High Lifter, http://www.highlifter.com/p-2686-radiator-relocation-kit-polaris-sportsma- n-550850-see-apps.aspx, last accessed Nov. 4, 2015, 2 pages.
Ranger XP 900 High Lifter Ground Clearance Demo-Polaris Ranger, Youtube.com, https://www.youtube.com/watch?v=jfGho4ESvyY, published Jul. 27, 2015; 1 page.

(56) References Cited

OTHER PUBLICATIONS

Ray Sedorchuk, New for 2004, Yamaha Rhino 660 4 × 4, ATV Connection Magazine, (Copyrights) 2006; 3 pages.
Redline Specs, copyright 2008, available at www.RedlinePerforms.com., 2 pages.
Renegade X MR 1000R, Can-Am, http://can-am.brp.com/off-road/atv/renegade/renegade-x-mr-1000R.html, copyright 2003-2015, 12 pages.
Response to Office Action filed with the U.S. Patent and Trademark Office, filed Dec. 19, 2018, for U.S. Appl. No. 15/751,403; 9 pages.
Ridenow Powersports. 2017 Can-Am Maverick X3 Walk Around. YouTube. Sep. 14, 2016 (Sep. 14, 2016). [retrieved on Jul. 6, 2021]. Retrieved from internet: <URL: https://www.youtube.com/watch?v=5lOslScF-y4> entire video. See pp. 6-8 of the ISA/237.
RZR Pro XP Sport, Published date unavailable [online], [retrieved on Jul. 25, 2021], Retrieved from the Internet: https://rzr.polaris.com/en-us/rzr-pro-xp-sport-rockford-fosgate-le/build-color/ (Year: 2021), 1 page.
RZR XP (Registered) 1000 High Lifter Edition Stealth Black, https://rzr.polaris.com/en-us/2015/high-performance/rzr-xp-1000-eps-high-lifter-edition-stealth-black-2015-rzr/; 4 pages.
RZR XP 100 EPS, High Lifter Velocity Blue, http://www.polaris.com/en-us/rzr-side-by-side/rzr-xp-1000-eps-high-lifter-edition.
RZR XP 1000 High Lifter Edition—Polaris RZR Sport Side by Side ATV, Youtube.com, https://www.youtube.com/watch?-RKRVulGlzuo, published Jul. 27, 2014; 1 page.
Sal & Barbara at S&B's, Particle Separator for 2014-16 Polaris RZR 100, http://www.sbfilters.com/particle-separator-2014-17-polaris-rzr-1000.
Second Office Action issued by the China National Intellectual Property Administration, dated Jul. 3, 2020, for Chinese Patent Application No. 201680028024.5; 7 pages.
Select Increments 2007-2018 Compatible With Jeep Wrangler JK and Unlimited With Infinity or Alpine Premium Factory Systems Pillar Pods with Kicker speakers PP0718-IA-K (Select), Dec. 14, 2018; 6 pages.
Shock Owner's Manual: Float ATV Front Applications—Fox Racing Shox, 2004, 21 pgs.
Shock Owner's Manual: Float ATV+Snowmobile—Fox Racing Shox, 2006, 18 pgs.
Shock Owner's Manual: Float MXR—Fox Racing Shox, 2006, 16 pgs.
Shock Owner's Manual: Float X Evol—Snowmobile Applications, 2006, 32 pgs.
Suzuki; 1991 Suzuki GSX1100G Cylinder OEM Parts Diagram; retrieved Mar. 17, 2022; https://www.revzilla.com/oem/suzuki/1991-suzuki-gsx1100g/cylinder?submodel=gsx1100gp (Year: 2017).
The International Bureau of WIPO, International Preliminary Report on Patentability for PCT/US2009/042985, Nov. 9, 2010, 11 pgs.
Troy Merrifield, Redline's Rockin' Riot, UTV Off-Road Magazine, published in vol. 4, Issue 1, Feb./Mar. 2009, available at http://www.1redline.com/news.sub.-events/PDF/Redline.sub.-Riot.sub.-Ar-ticle.sub.-01.sub.-2009.pdf., last accessed on Feb. 15, 2012, pp. 16-19.
Welcome to Ranger Country brochure, .Copyrgt. 2005, Polaris Industries Inc., 24 pgs.
Wild Boar ATV Parts, Airaid Intake XP 900 Polaris, Snorkel Kit, https://www.wildboaratvparts.com/airaid-intake-xp-900-polaris-snorkel-kit-free-shipping-529-00/.
Work/Play Only Ranger brochure, .Copyrgt. 2007, Polaris Industries Inc., 28 pgs.
Written Opinion of the International Searching Authority, dated Feb. 3, 2013, for related International Patent Application No. PCT/US2011/046395; 7 pages.
XR Bull Spaider 500 MOD 2011, anuncios ya, https://mexicali.anunciosya.com.mx/xr-bull-spaider-500-mod-2011-en-mexicali-SWqi, May 24, 2011; 4 pages.
XR Bull Spider 500CC 4×4 360° .AVI, youtube.com, https://www.youtube.com/watch?v=-jSzDvute8Q, posted Feb. 8, 2010; 1 page.
Yamaha, Company Website, 2006 Rhino 450 Auto 4 .times. 4, .Copyrgt. 2005, 3 pages.
Yamaha, Company Website, 2006 Rhino 660 Auto 4 × 4, (Copyrights) 2006; 4 pages.
Yamaha, company website, 2006 Rhino 660 Auto 4.times.4 Special Edition, Copyright 2006, 4 pgs.
http://revistamoto.com/inicio/rm/prueba-xrbull-xr500-spider.html.
https://drive.google.com/file/d/0B851Fdu_42hLaE5MdDBLWHFReU9zQjhlWIB1bkU1QQ/view (service manual).
Photobucket "https://photobucket.com/p/error?type=404&path=/gallery/er/ben8225/media/cGF0aDovRFNDRjE0ODkuanBn/", Retrived on Apr. 1, 2024, 2 pages.
2017 Can-Am Maverick X3 Walk Around https://youtu.be/5l0slScF-y4?si=xBV9LzjGUNORi9A9 (Year: 2016).
"2012 Arctic Cat Wildcat 1000i H.O. Preview," ATV.Com, https://www.atv.com/manufacturers/arctic-cat/2012-arctic-cat-wildcat-1000i-ho-preview-2014.html, dated Jul. 26, 2011; 10 pages.
"Arctic Cat Unleashes a Wild Cat at Recent Dealer Show", UTVGuide.net, https://www.utvguide.net/arctic-cat-unleashes-a-wild-cat-at-recent-dealer-show/, posted Mar. 29, 2011; 5 pages.
"Arctic Cat Unleashes a Wildcat at Recent Dealer Show", Dirt Toys, https://www.dirttoysmag.com/2011/05/arctic-cat-unleashes-a-wildcat, May 2011 Issue; 4 pages.
"Artie Cat Breaks Silence on New Side-by-Side," Lucas Cooney, https://www.atv.com/blogi2011/03/arctic-cat-breaks-silence-on-new-side-by-side.html, dated Mar. 24, 2011; 5 pages.
"Commander Performance Modifications: Radiator Relocate for Mud", commanderforums.org, https://www.commanderforums.org/forums/commander-performance-modifications/7059-radiator-relocate-mud-3.html, Aug. 28, 2012; 7 pages.
"Custom Weber Intercooler Bed Mount with Dual 5.2" Spal Fans", RZRForums.net, https://www.rzrforums.net/forced-induction/19182-custom-weber-intercooler-bed-mount-w-dual-5-2-spal-fans.html, Oct. 30, 2009; 10 pages.
"Engine firing change '13 850", PolarisATVForums.com internet forum discussion thread dated Nov. 21, 2012.
"Honda develps a powerful, fuel-efficient 700cc engine for midsize motorcycle", Honda news release from www.world.honda.com; dated Sep. 26, 2011.
"Modified RedLine Revolt," RDC Race-deZert.com, https://www.race-dezert.com/forum/threads/modified-redline-revolt.92038/, dated Mar. 10, 2011; 5 pages.
"National Guard/Coastal Racing Polaris RZR XP 900 UTV Race Test," JeffM. Vanasdal, ATVriders.com, http://www.atvriders.com/atvreviews/polaris-2012-coastal-racing-rzr-xp-900-sxs-utv-worcs-race-review-p4.html; Feb. 25, 2012; 8 pages.
"Rad Relocation Kit", RZRFarums.net, https://www.rzrforums.net/engine-drivetrain/93153-rad-relocation-kit.html, Nov. 9, 2012; 8 pages.
"Radiator in the back", RZRForums.net, https://www.rzrforums.net/rzr-xp-900/63047-radiator-back.html, Nov. 14, 2011; 4 pages.
"Radiator Relocate", RZRForums.net, https://www.rzrforums.net/muddin/14716-radiator-relocate.html, Jul. 23, 2009; 7 pages.
"Radiator relocation", RZRForums.net, https://www.rzrforums.net/general-rzr-discussion/8440-radiator-relocation.html, Feb. 4, 2009; 7 pages.
"Relocated Radiator?", RZRForums.net, https://www.rzrforums.net/muddin/75562-relocated-radiator.html, Apr. 6, 2012; 7 pages.
"Rhino Radiator Relocation", HighLifter Forum, http://forum.highlifter.com/Rhino-Radiator-Relocation-m2180231.aspx, Aug. 30, 2007; 5 pages.
"RZR Radiator Relocation?", RZRForums.net, https://www.rzrforums.net/general-rzr-discussion/13963-rzr-radiator-relocation.html, Jul. 3, 2009; 5 pages.
"Sporty New Artie Cat Side-by-Side," Lucas Cooney, https://www.atv.com/blog/2011/03/sporty-new-arctic-cat-side-by-side-video.html, dated Mar. 10, 2011; 4 pages.
"Straight-twin engine", Wikipedia.org internet encyclopedia entry.
"Who makes the best turbo kit for the Polarsis RZR??", RZRforums.net internet forum discussion thread dated Jun. 25, 2010.

(56) References Cited

OTHER PUBLICATIONS

1989 Honda Pilot f1400, Powersports Log, http://powersportslog.com/asp/Item.asp?soldid=29871&makeHonda&theday=4%2F16%2F2011, posted Apr. 16, 2011; 2 page.
2009 Honda Big Red, ATV Illustrated at http://www.atvillustrated.com/?q=node/6615/20/2008, 6 pgs.
2012 Arctic Cat Wildcat with 95-hp & 16-in. Travel, ArcticInsider.com, http://www.arcticinsider.com/Article/2012-Arctic-Cat-Wildcat-with-95-hp-16-in-Travel; 4 pages.
2012 Coastal Racing Polaris XP 900 UTV, photograph, http://www.atvriders.com/images/polaris/2012-coastal-racing-polaris-xp-900-utv-race-review/2012-polaris-rzr-xp-900-utv-sxs-jeff-vanasdal.jpg; 1 page.
2015 Polaris Owner's Manual for Maintenance and Safety, RZR (Registered) XP 1000 EPS High Lifter Edition, (Copyright) 2015; 151 pages.
2016 Mudpro 700 Limited, Artic Cat, http://www.articcat.com/dirt/atvs/model/2016-en-mudpro700-limited/, copyright 2015, 23 pages.
53 Series Aerocharger RZR XP 900 Turbocharger kit, retrieved from www.sidebysidesports.com/53seaerzxp9.html on Jan. 10, 2019, Internet Wayback Machine capture dated Apr. 26, 2011 (Year: 2011).
Arctic Cat, company website, Prowler XT 650 H1, undated, 9 pgs.
Boss Plow System for Ranger, at http:www.purepolaris.com/Detail.aspx?ItemID=2876870(PolarisPGACatalog), May 14, 2008, 2 pgs.
Boss Smarthitch 2 at http:www.bossplow.com/smarthitch.html, May 14, 2008, 13 pgs.
BRP Can-Am Commander photo, undated; 1 page.
Buyer's Guide Supplement, 2006 Kart Guide, Powersports Business Magazine; 6 pages.
Can-Am Maverick Sport 60 (front deflector panel for hot radiator air, 2019.
Club Car, Company Website, product pages for XRT 1500 SE, undated; 2 pages.
Diver Down Snorkel for Polaris Scrambler 850/1000, High Lifter, last accessed Nov. 4, 2015, http://www.highlifter.com/p-4687-diver-down-snorkel-for-polaris-scrambler--8501000-see-apps.aspx; 1 page.
DuneGuide.com, "Product Review 2009 Honda Big Red MUV," retrieved from http:www.duneguide.com/ProductReview.sub.--Honda.sub.--BigRed.htm, May 20, 2008, 3 pgs.
Eulenbach, Dr.Ing. Dieter, Nivomat: The Automatic Level Control System with Spring Function and Damping Function, Lecture given as part of the course "Springing and damping systems for road and rail vehicles" at the Technical Academy of Esslingen, Oct. 11, 2000, 18 pgs.
Excerpts from Honda Service Manual 89 FL400R Pilot, Honda Motor Co., Ltd., copyright 1988; 24 pages.
Fang et al., Research on Generator Set Control of Ranger Extender Pure Electric Vehicles, Power and Energy Conference (APPEEC), 2010 Asia-Pacific, Mar. 31, 2010.
Heitner, Range extender hybrid vehicle, Intersociety Energy Conversion Engineering Conference Proceedings, vol. 4, pp. 323-338, 1991.
High-Performance "Truck Steering" Automotive Engineering, Society of Automotive Engineers. Warrendale, Us, vol. 98. No. 4, Apr. 1, 1990, pp. 56-60.
Honda Hippo 1800 New Competition for Yamaha's Rhino, Dirt Wheels Magazine, Apr. 2006, pp. 91-92.
Images for rear radiator, https://www.google.com/search?q=rear+radiator+site%3Arzrforums.net&lr=&hl=en&as_qdr=all&source_Int&tbs=cdr%3A1%2Ccd_min%3A%2Ccd_max%3A2012&tbm; available before Dec. 31, 2012; 2 page.
Improved Fox Shox, Motocross Action, Mar. 1977 issue, 1 pg.
International Preliminary Report on Patentability issued by the European Patent Office, dated Aug. 31, 2010, for International Patent Application No. PCT/US2009/042986; 14 pages.
International Preliminary Report on Patentability issued by the European Patent Office, dated Mar. 8, 2013, for International PCT Application No. PCT/US2012/024664; 24 pages.
International Preliminary Report on Patentability issued by the European Patent Office, dated May 11, 2009, in related International Patent Application No. PCT/US2008/003483; 21 pages.
International Preliminary Report on Patentability issued by The International Bureau of WIPO, dated Apr. 14, 2015, for International Patent Application No. PCT/US2013/064516; 18 pages.
International Preliminary Report on Patentability issued by The International Bureau of WIPO, dated Jul. 14, 2020, for International Patent Application No. PCT/US2019/012958; 19 pages.
International Preliminary Report on Patentability issued by the International Bureau of WIPO, dated May 12, 2015, for International Application No. PCT/US2013/068937; 7 pages.
International Preliminary Report on Patentability received for PCT Patent Application No. PCT/US2021/031804, mailed on Nov. 24, 2022, 6 pages.
Office Action issued by the Canadian Intellectual Property Office, dated May 2, 2023, for Canadian Patent Application No. 3152773; 5 pages.
International Preliminary Report on Patentability issued by The International Bureau of WIPO, dated Nov. 9, 2010, for International Patent Application No. PCT/US2009/042985; 13 pages.
International Preliminary Report on Patentability issued by the International Searching Authority, dated May 6, 2021, for International Patent Application No. PCT/US2020/030518; 27 pages.
International Preliminary Report on Patentability issued by the International Searching Authority, dated Nov. 15, 2022, for International Patent Application No. PCT/US2021/031782; 9 pages.
International Preliminary Report on Patentability received for PCT Patent Application No. PCT/US10/49167, mailed on Oct. 18, 2012, 30 pages.
International Preliminary Report on Patentability received for PCT Patent Application No. PCT/US2015/061272, mailed on May 12, 2017, 22 pages.
International Preliminary Report on Patentability received for PCT Patent Application No. PCT/US2016/031992, mailed on Nov. 30, 2017, 15 pages.
International Preliminary Report on Patentability received for PCT Patent Application No. PCT/US2017/065724, mailed on Jan. 7, 2019, 16 pages.
International Preliminary Report on Patentability, dated May 28, 2013, for related International Patent Application No. PCT/US2011/046395, 31 pages.
International Search Report and Written Opinion issued by the European Patent Office, dated Aug. 27, 2008, in related International Patent Application No. PCT/US2008/003485; 15 pages.
International Search Report and Written Opinion issued by the European Patent Office, dated Feb. 18, 2014, for International Application No. PCT/US2013/068937; 11 pages.
International Search Report and Written Opinion issued by the European Patent Office, dated Jan. 14, 2014, for International Patent Application No. PCT/US2013/064516; 24 pages.
International Search Report and Written Opinion issued by the European Patent Office, dated Jul. 31, 2013, for International Patent Application No. PCT/US2013/039304; 11 pages.
International Search Report and Written Opinion issued by the European Patent Office, dated Jun. 28, 2012, for International PCT Application No. PCT/US2012/024664; 19 pages.
International Search Report and Written Opinion issued by the European Patent Office, dated Oct. 2, 2008, in related International Patent Application No. PCT/US2008/003483; 18 pages.
International Search Report and Written Opinion issued by the European Patent Office, dated Oct. 9, 2014, for International Patent Application No. PCT/US2014/028152; 20 pages.
International Search Report and Written Opinion issued by the European Patent Office, mailed Dec. 18, 2009, for International Patent Application No. PCT/US2009/042986; 15 pages.
International Search Report and Written Opinion issued by the European Patent Office, mailed Sep. 4, 2009, for International Patent Application No. PCT/US2009/042985; 18 pages.
International Search Report and Written Opinion issued by the International Searching Authority, dated Oct. 21, 2020, for International Patent Application No. PCT/US2020/42787; 18 pages.

(56) References Cited

OTHER PUBLICATIONS

International Search Report and Written Opinion received for PCT Patent Application No. PCT/US10/49167, mailed on Jul. 6, 2011, 9 pages.
International Search Report and Written Opinion received for PCT Patent Application No. PCT/US14/39824, mailed on Sep. 19, 2014, 9 pages.
International Search Report and Written Opinion received for PCT Patent Application No. PCT/US2015/061272, mailed on Aug. 12, 2016, 13 pages.
International Search Report and Written Opinion received for PCT Patent Application No. PCT/US2016/031992, mailed on Sep. 19, 2016, 20 pages.
International Search Report and Written Opinion received for PCT Patent Application No. PCT/US2017/065724, mailed on Jun. 18, 2018, 14 pages.
International Search Report and Written Opinion received for PCT Patent Application No. PCT/US2019/012958, mailed on Jul. 3, 2019, 27 pages.
International Search Report and Written Opinion received for PCT Patent Application No. PCT/US2020/030518, mailed on Sep. 11, 2020, 14 pages.
International Search Report and Written Opinion received for PCT Patent Application No. PCT/US21/31782, mailed on Aug. 5, 2021, 11 pages.
International Search Report and Written Opinion received for PCT Patent Application No. PCT/US21/31804, mailed on Aug. 9, 2021, 6 pages.
International Search Report issued by the European Patent Office, dated Jun. 3, 2008, in related International Patent Application No. PCT/US2008/003480; 5 pages.
International Search Report issued by the International Searching Authority, dated Jun. 18, 2018, for related International Patent Application No. PCT/US2017/065724; 7 pages.
International Search Report of the International Searching Authority, dated Sep. 4, 2012, for related International Patent Application No. PCT/US2011/046395; 6 pages.
Invitation to Pay Additional Fees received for PCT Patent Application No. PCT/US2017/065724, mailed on Apr. 10, 2018, 10 pages.
Kawasaki Mule The Off-Road Capable 610 4 .times. 4 XC Brochure 2011, .Copyrgt. 2010, 6 pages.
Kawasaki Mule Utility Vehicle Brochure 2009, .Copyrgt. 2008; 10 pages.
Kawasaki Teryx 750 F1 4 × 4 Sport Brochure 2011, (Copyrights) 2010; 6 pages.
Kawasaki Teryx Recreation Utility Vehicle Brochure 2009, .Copyrgt. 2008; 8 pages.
Letter Exam Report issued by the State Intellectual Property Office (SIPO), dated Mar. 18, 2015, for related Chinese Application No. 201080046628.5; 20 pages.
MTX (IMTX Audio Thunder Sports RZRPod65-owners-manual, 2016); 8 pages.
New Arctic Cat Side by Side, youtube.com, https://www.youtube.com/watch?-gQGAYSz1bME&fs=1&hl=en_US, posted Mar. 9, 2011; 1 page.
Office Action issued by the Canadian Intellectual Property Office, dated Apr. 1, 2021, for Canadian Patent Application to. 2,985,632; 4 pages.
Office Action issued by the Canadian Intellectual Property Office, dated Oct. 27, 2020, for Canadian Patent Application No. 3,044,002; 4 pages.
Office Action issued by the U.S. Patent and Trademark Office, dated Oct. 1, 2018, for U.S. Appl. No. 15/751,403; 7 pages.
Outlander X mr 850, available at https://can-am.brp.com/off-road/atv/outlander/outlander-x-mr-850.html; .Copyrgt. 2003-2017; 3 pages.
Patent Examination Report issued by the Australian Government IP Australia, dated Apr. 7, 2016, for Australian Patent Application No. 2013329090; 3 pages.
Photo, Facebook.com, Jake Brattain, https://www.facebook.com/photo.php?fbid=412473845198&set=pb.512920198.-2207520000.1541691407.&type=3&theater, post dated Mar. 30, 2010;1 page.
Photo, Facebook.com, Jake Brattain, https://www.facebook.com/photo.php?fbid=412473865198&set=pb.512920198.-2207520000.1541691407.&type=3&theater, post dated Mar. 30, 2010;1 page.
Photo, Facebook.com, Jake Brattain, https://www.facebook.com/photo.php?fbid=412474325198&set=pb.512920198.-2207520000.1541691407.&type=3&theater, post dated Mar. 30, 2010; 1 page.
Photo, Facebook.com, Jake Brattain, https://www.facebook.com/photo.php?fbid=412474575198&set=pb.512920198.-2207520000.1541691407.&type=3&theater, post dated Mar. 30, 2010; 1 page.
Photo, Facebook.com, Jake Brattain, https://www.facebook.com/photo.php?fbid=412474695198&set=pb.512920198.-2207520000.1541691407.&type=3&theater, post dated Mar. 30, 2010; 1 page.
Photo, Facebook.com, Jake Brattain, https://www.facebook.com/photo.php?fbid=412474765198&set=pb.512920198.-2207520000.1541691407.&type=3&theater, post dated Mar. 30, 2010; 1 page.
Photo, Facebook.com, Jake Brattain, https://www.facebook.com/photo.php?fbid=412475960198&set=pb.512920198.-2207520000.1541691407.&tye=3&theater, post dated Mar. 30, 2010; 1 page.

\* cited by examiner

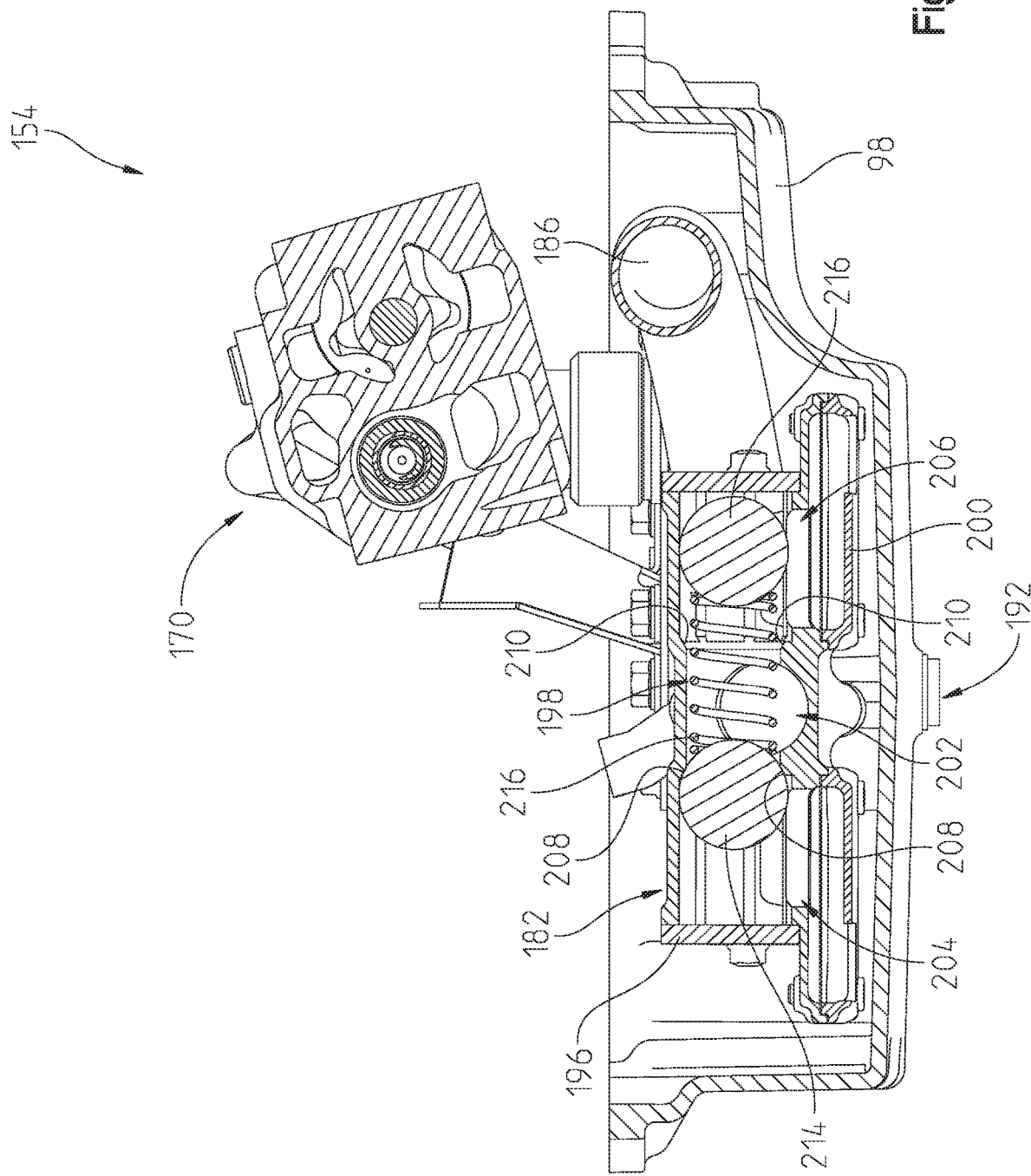

OFF-ROAD VEHICLE

CROSS-REFERENCE TO RELATED APPLICATION

The present application is a continuation of U.S. patent application Ser. No. 16/875,494, filed May 15, 2020, the enclosure of which is disclosed herein by reference.

FIELD OF THE INVENTION

The present invention relates to off-road vehicles including all-terrain vehicles ("ATVs") or utility vehicles ("UTVs").

BACKGROUND OF THE INVENTION

Generally, UTVs or ATVs are used to carry one or more passengers and a small amount of cargo over a variety of terrains. Current ATVs and UTVs are typically provided with engines having a unitary engine block housing a plurality of cylinders and a portion of a crankcase. However, for engine modularity purposes, a need exists for an engine in a UTV or ATV that has a cylinder block separate from but sealingly engaged with the portion of the crankcase.

SUMMARY OF THE INVENTION

In one embodiment of the disclosure, a utility vehicle comprises a frame, a body supported by the frame, a seating area supported by the frame, front and rear ground engaging members supporting the frame and the body, and a powertrain drivingly coupled to the front and rear ground engaging members. The powertrain includes an engine having a cylinder block having a plurality of cylinders, a cylinder head removably coupled to the cylinder block, and a crankcase having a first portion and a second portion. The first portion of the crankcase is removably coupled to the cylinder block, and at least one gasket is positioned between the cylinder block and the first portion of the crankcase. The at least one gasket is configured to individually seal each of the plurality of cylinders relative to the first portion of the crankcase.

In another embodiment of the disclosure, an engine for a utility vehicle comprises a cylinder block having a plurality of cylinders, a cylinder head removably coupled to the cylinder block, and a crankcase having a first portion and a second portion. The first portion of the crankcase is removably coupled to the cylinder block. Each of the plurality of cylinders is individually sealed with the first portion of the crankcase via at least one sealing member.

BRIEF DESCRIPTION OF THE DRAWINGS

FIG. 22 shows a cross-sectional view of lubrication system of FIG. 20 taken along line 22-22 of FIG. 20.

DETAILED DESCRIPTION OF THE DRAWINGS

Figure 1:
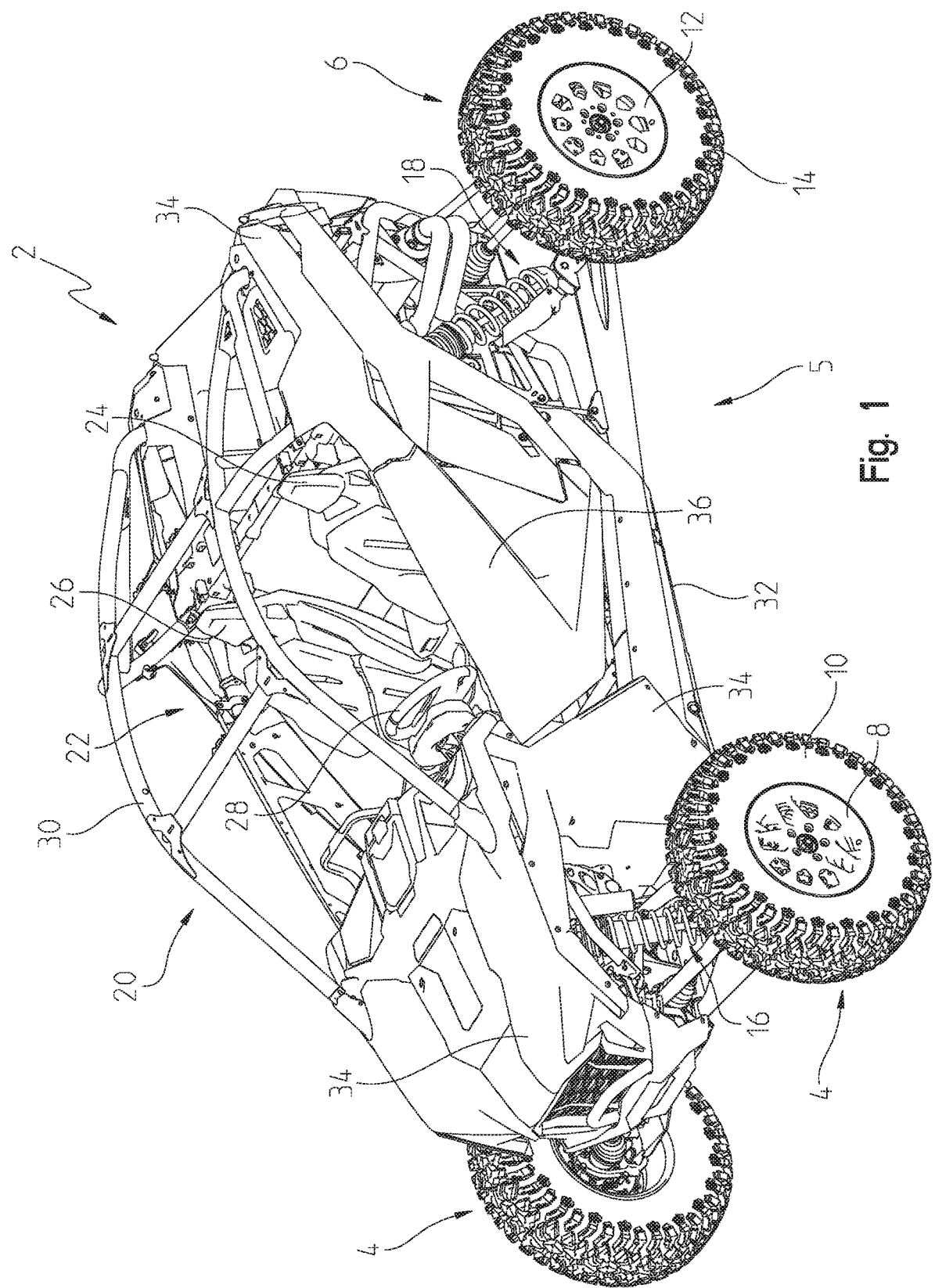
FIG. 1 shows a front left perspective view of a vehicle of the present disclosure.
Figure 2:
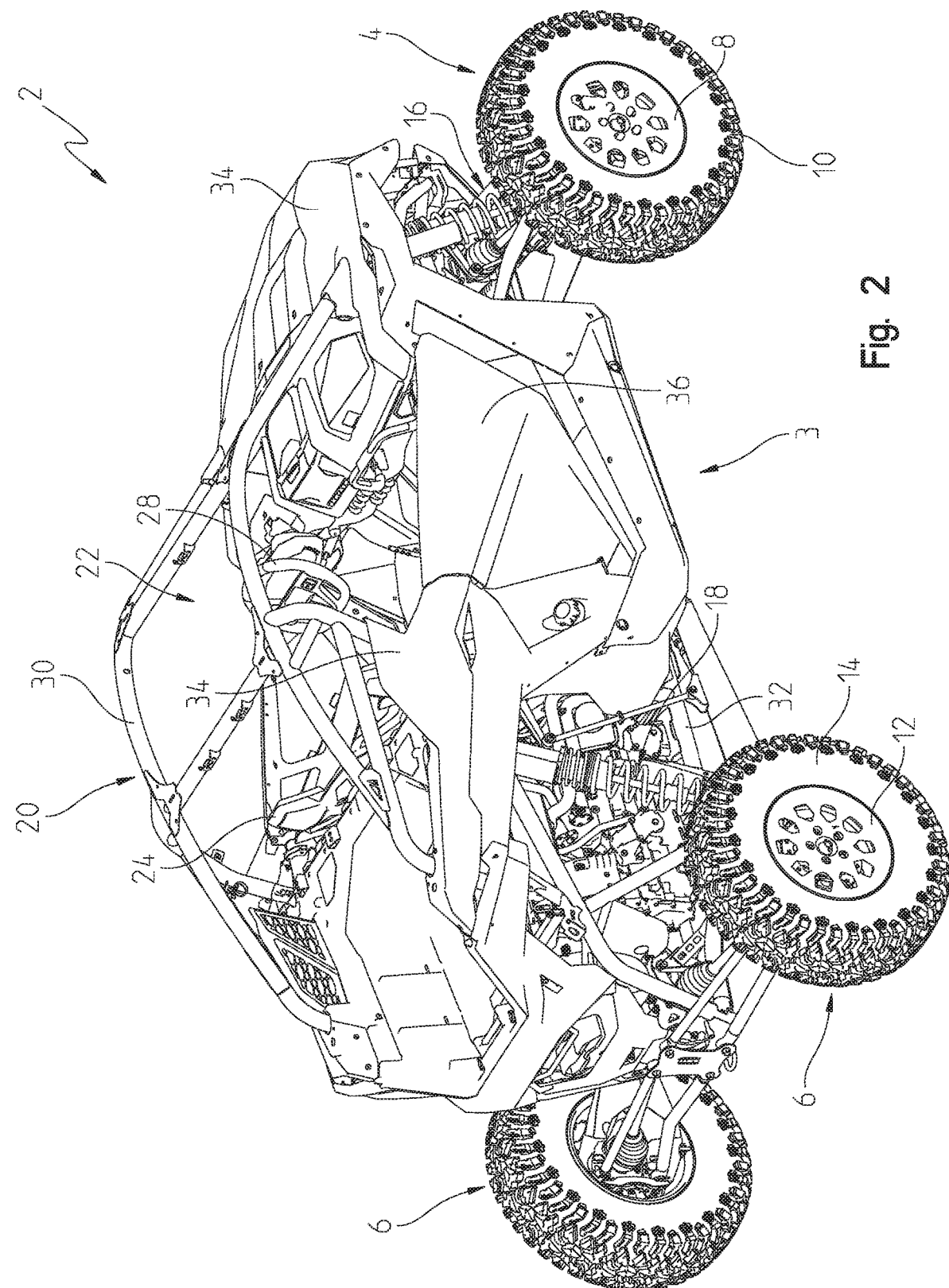
FIG. 2 shows a right rear perspective view of the vehicle of FIG. 1.
Figure 3:
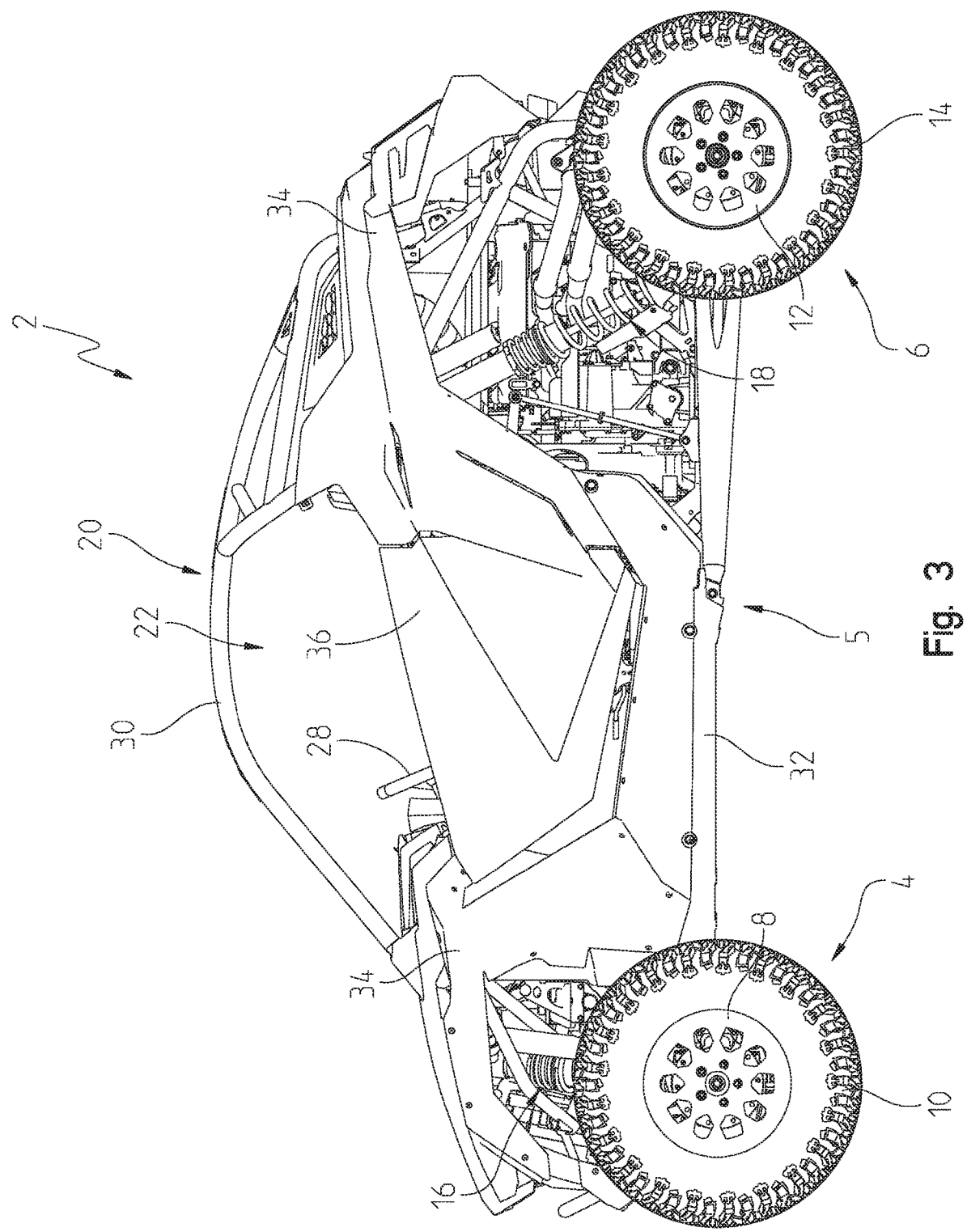
FIG. 3 shows a left elevational side view of the vehicle of FIG. 1.
Figure 4:
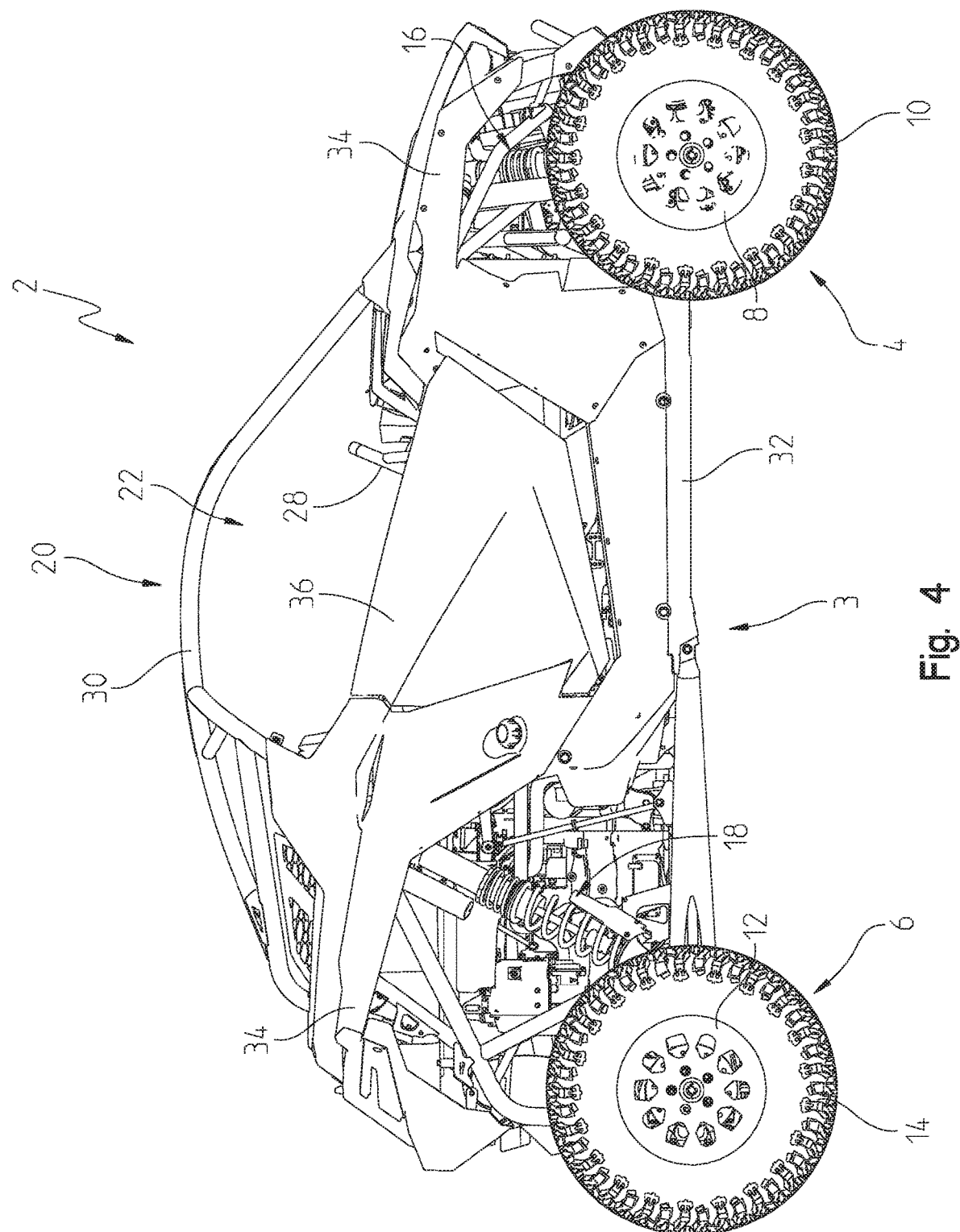
FIG. 4 shows a right elevational side view of the vehicle of FIG. 1.
Figure 5:
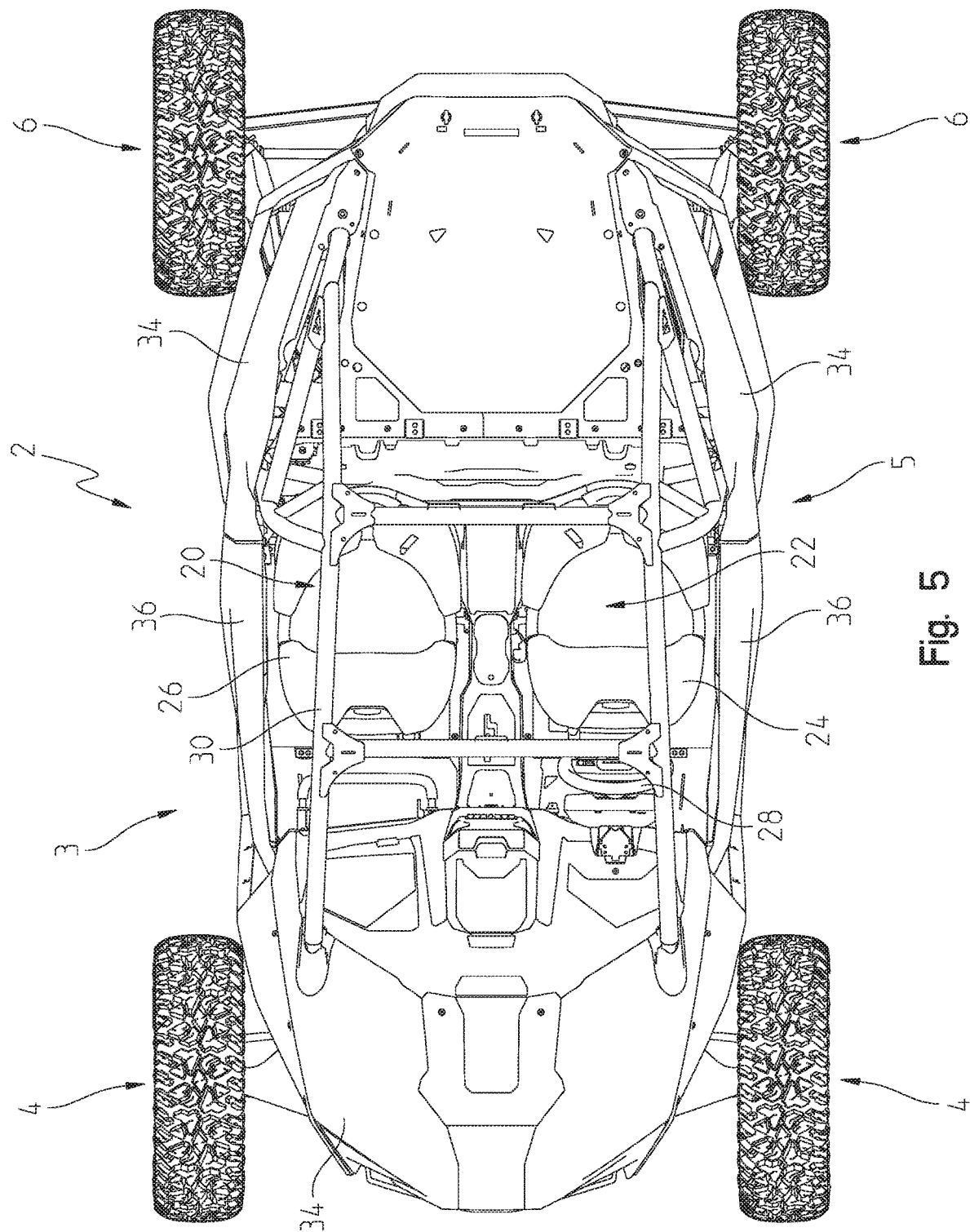
FIG. 5 shows a top plan view of the vehicle of FIG. 1.
Figure 6:
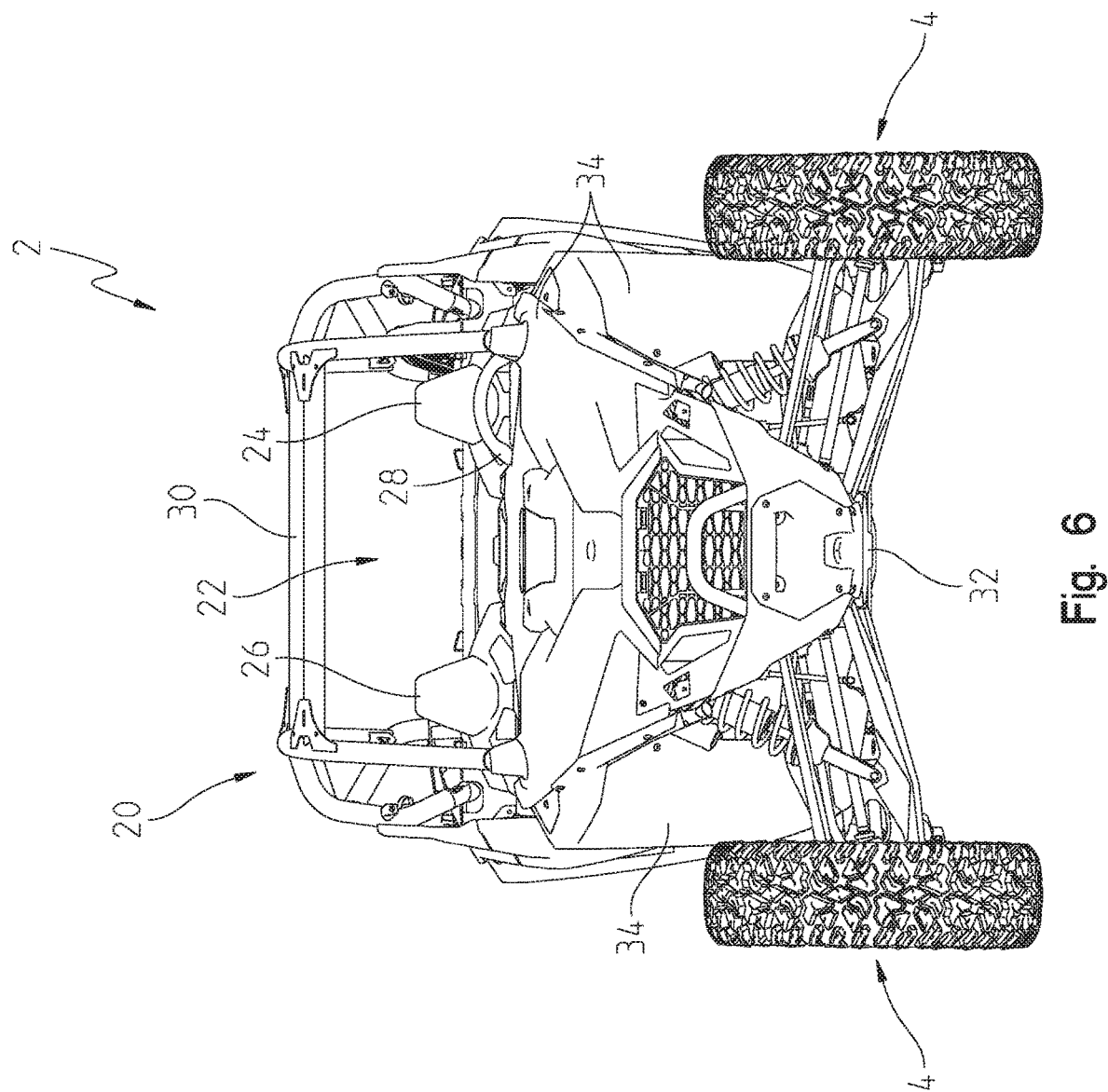
FIG. 6 shows a front elevational view of the vehicle of FIG. 1.
Figure 7:
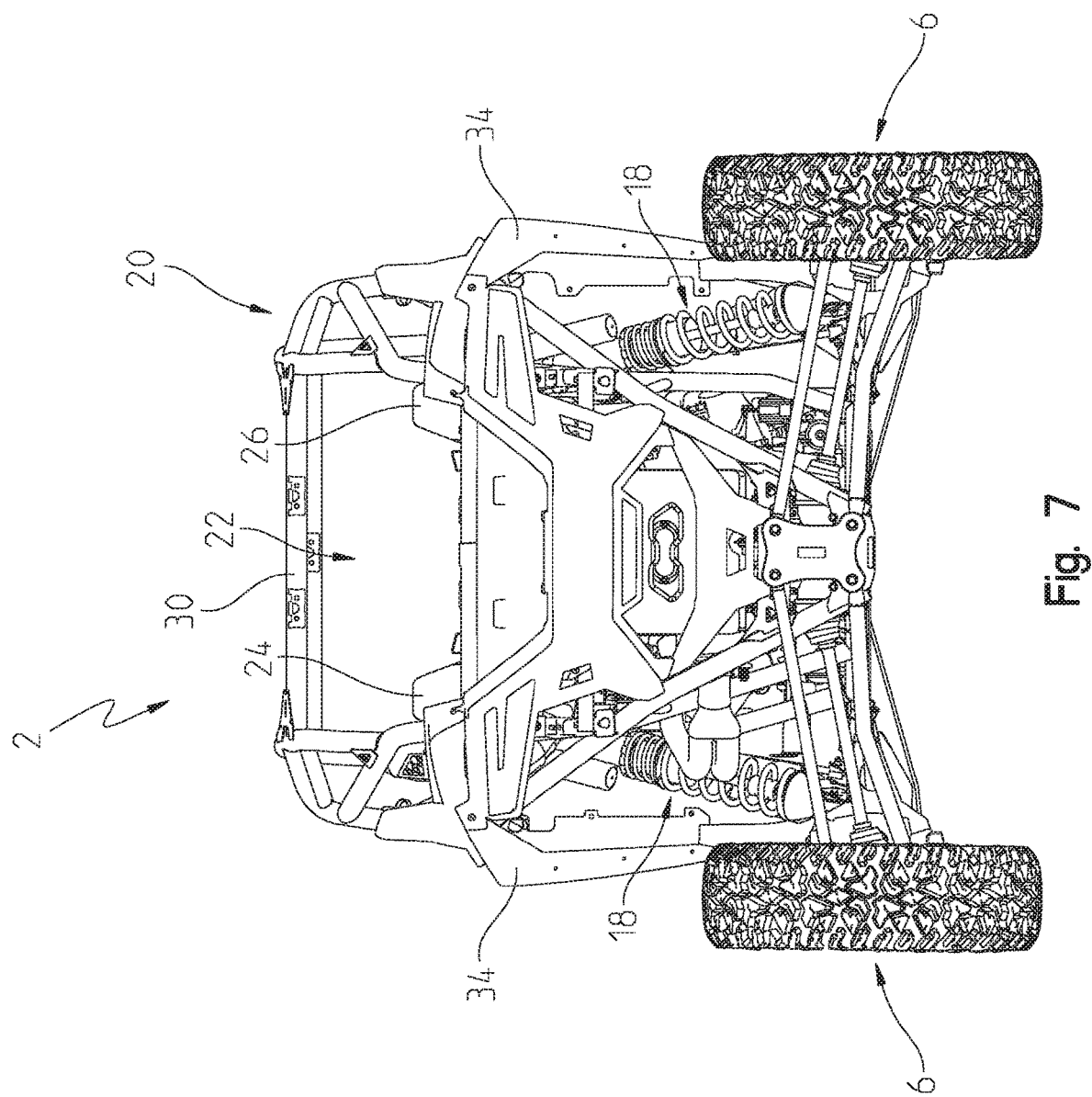
FIG. 7 shows a rear elevational view of the vehicle of FIG. 1.

With reference to FIGS. 1-7, the vehicle of the present invention will be described. As shown, the vehicle is generally depicted as reference number 2 which includes front ground engaging members 4 and rear ground engaging members 6. Front ground engaging members 4 are comprised of wheels 8 and tires 10, and rear ground engaging members 6 are comprised of wheels 12 and tires 14. Ground engaging members 4 and 6 support a vehicle frame, which is shown generally at 20, through front and rear suspension assemblies 16 and 18.

Vehicle frame 20 supports a seating area 22 comprised of a driver's seat 24 and a passenger seat 26. Vehicle 2 further includes a steering assembly for steering front ground engaging members 4 whereby the steering assembly includes a steering wheel 28. Frame 20 of vehicle 2 is comprised of a cab frame 30 that generally extends over the seating area 22, and a lower frame portion 32 positioned below and supporting cab frame 30. Frame 20 is configured to support a plurality of body panels 34 and/or doors 36.

Figure 8:
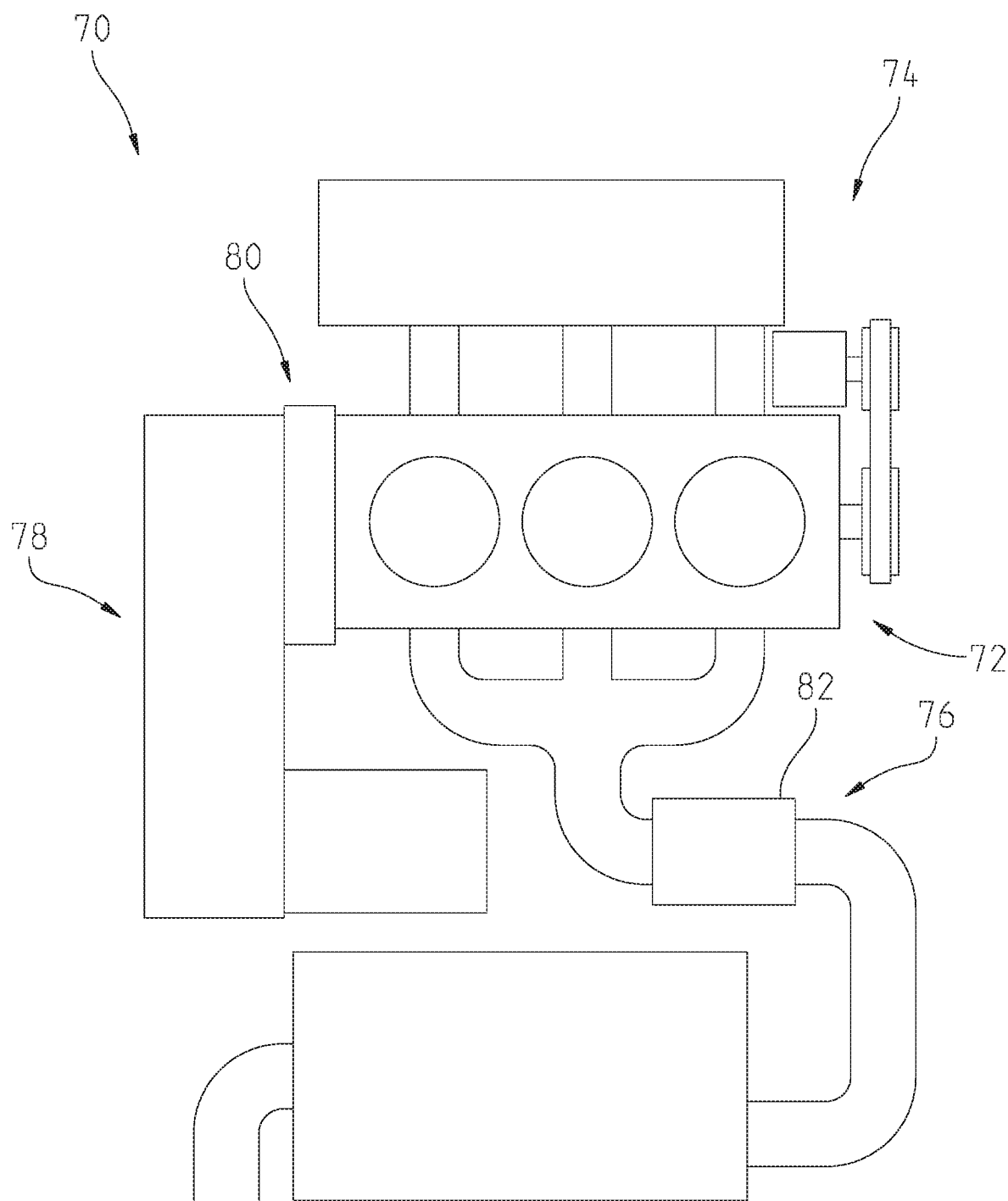
FIG. 8 shows a schematic view of a powertrain of the vehicle of FIG. 1.

With reference now to FIG. 8, vehicle 2 further includes a powertrain assembly 70 for providing power to ground engaging members 4 and 6 of vehicle 2. Powertrain assembly 70 generally comprises an engine 72, an air intake assembly 74 providing air to engine 72, an exhaust assembly 76 routing exhaust from engine 72 out of vehicle 2, a transmission 78 coupled to engine 72, and a drivetrain (not shown) coupled to transmission 78. Additional details relating to vehicle 2 including powertrain 70 may be found in U.S. patent application Ser. No. 16/875,448 (now U.S. Pat. No.12,187,127) the subject matter of which is incorporated herein by reference.

Still referring to FIG. 8, in various embodiments, powertrain assembly 70 may further include a starter clutch 80 removably coupled between engine 72 and transmission 78 to allow a starter motor, which may be in constant meshed engagement with starter clutch 80, to crank or start engine 72. Starter clutch 80 is generally sealingly coupled to engine 72 such that starter clutch 80 may receive lubricant from engine 72. Decoupling starter clutch 80 from engine 72 and transmission 78 allows for a more modular engine in that various components of powertrain assembly 70 may be used in different embodiments and orientations due to ability to couple and decouple components from each other, depending on the application on vehicle 2 and the requirements of powertrain assembly 70. Furthermore, in various embodiments, powertrain assembly 70 may include a turbocharger 82 at least fluidly coupled with exhaust assembly 76.

Referring now to FIGS. 9-15, engine 72 of powertrain assembly 70 generally includes a cylinder block 90, a cylinder head which includes an intake port 92 and is coupled to cylinder block 90, a first crankcase portion 94 coupled to cylinder block 90, a second crankcase portion 96 coupled to first crankcase portion 94, an oil pan 98 coupled to second crankcase portion 96, a valve or cam cover 100 depending on the location of valves and cams within engine 72 coupled over intake port 92, and a coolant assembly 102. Coolant assembly 102 may be configured to extend along a side of engine 72 from intake port 92 to second crankcase portion 94. In various embodiments, intake port 92 is positioned above cylinder block 90 and cylinder block 90 itself is positioned above first crankcase portion 94. First crankcase portion 94 is positioned above second crankcase portion 96 and second crankcase portion 96 is positioned above oil pan 98.

Figure 9:
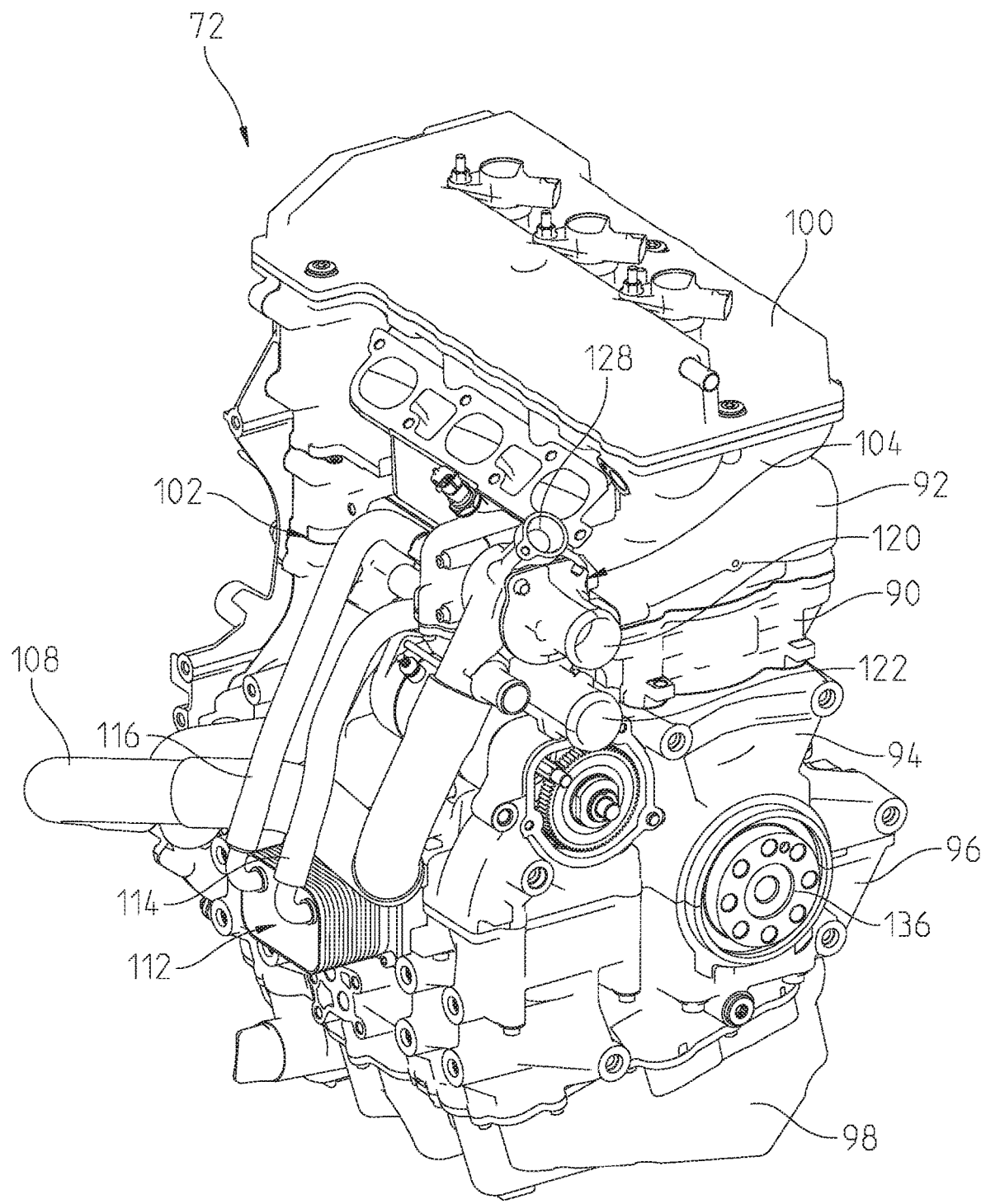
FIG. 9 shows a first perspective view of an engine of the vehicle of FIG. 1.
Figure 10:
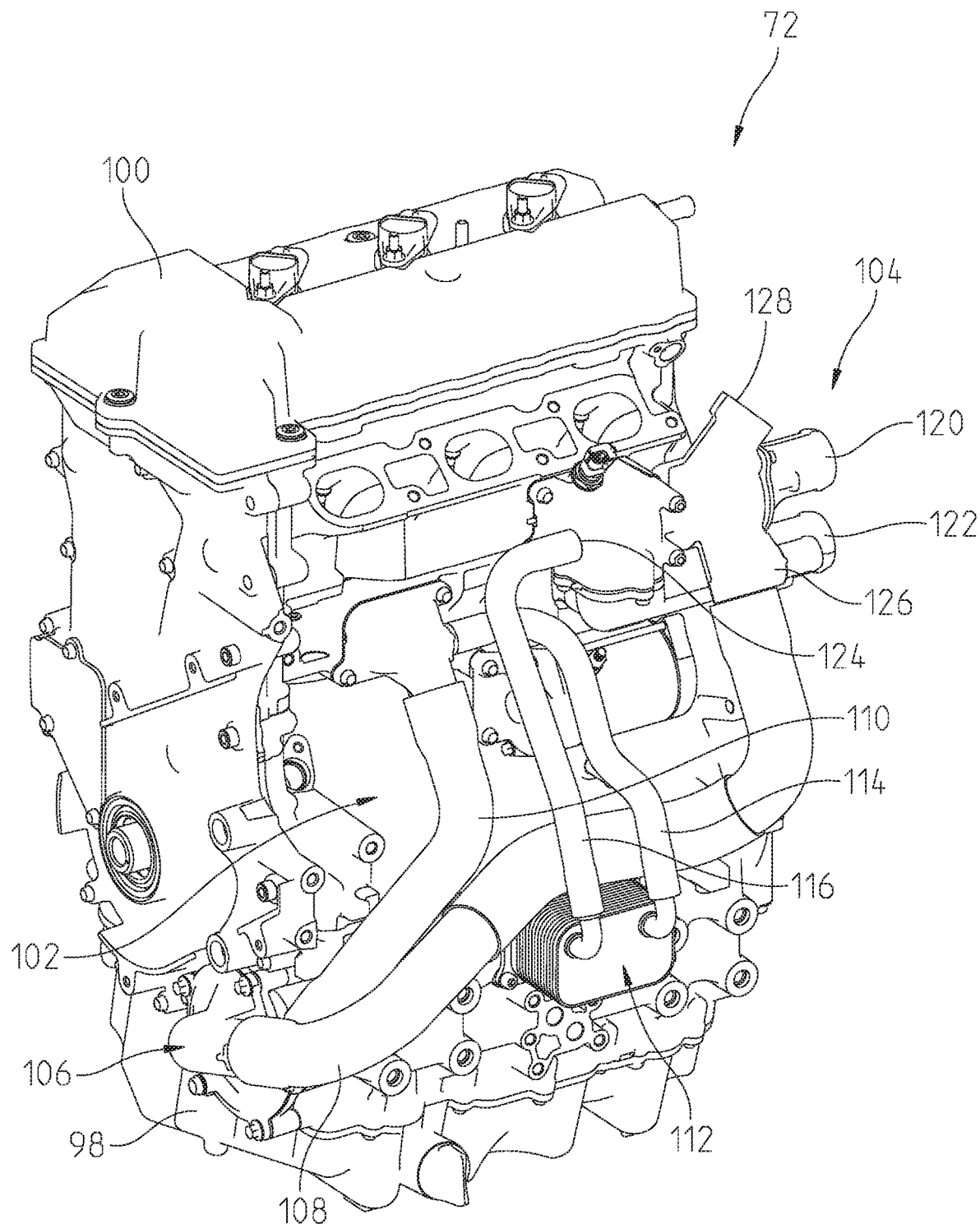
FIG. 10 shows a second perspective view of the engine of FIG. 9.

With reference to FIGS. 9 and 10, coolant assembly 102 generally includes a coolant manifold 104, a water pump 106 (FIG. 10), a water pump inlet conduit 108 coupling coolant manifold 104 to water pump 106, a water pump outlet conduit 110 (FIG. 10) coupling water pump 106 to engine 72, an oil cooler 112, an oil cooler outlet conduit 114 coupling oil cooler 112 to coolant manifold 104, and an oil cooler inlet conduit 116 coupling engine 72 to oil cooler 112. Coolant manifold 104 generally includes a first inlet 120 configured to receive coolant from a radiator (not shown), a first outlet 122 configured to provide heated coolant to the radiator, a second inlet 124 configured to receive heated coolant from oil cooler 112, a second outlet 126 configured to provide coolant to water pump 106, and a bleed outlet 128. In various embodiments, a thermostat (not shown) may be controlled with return, heated coolant from the radiator.

Figure 11:
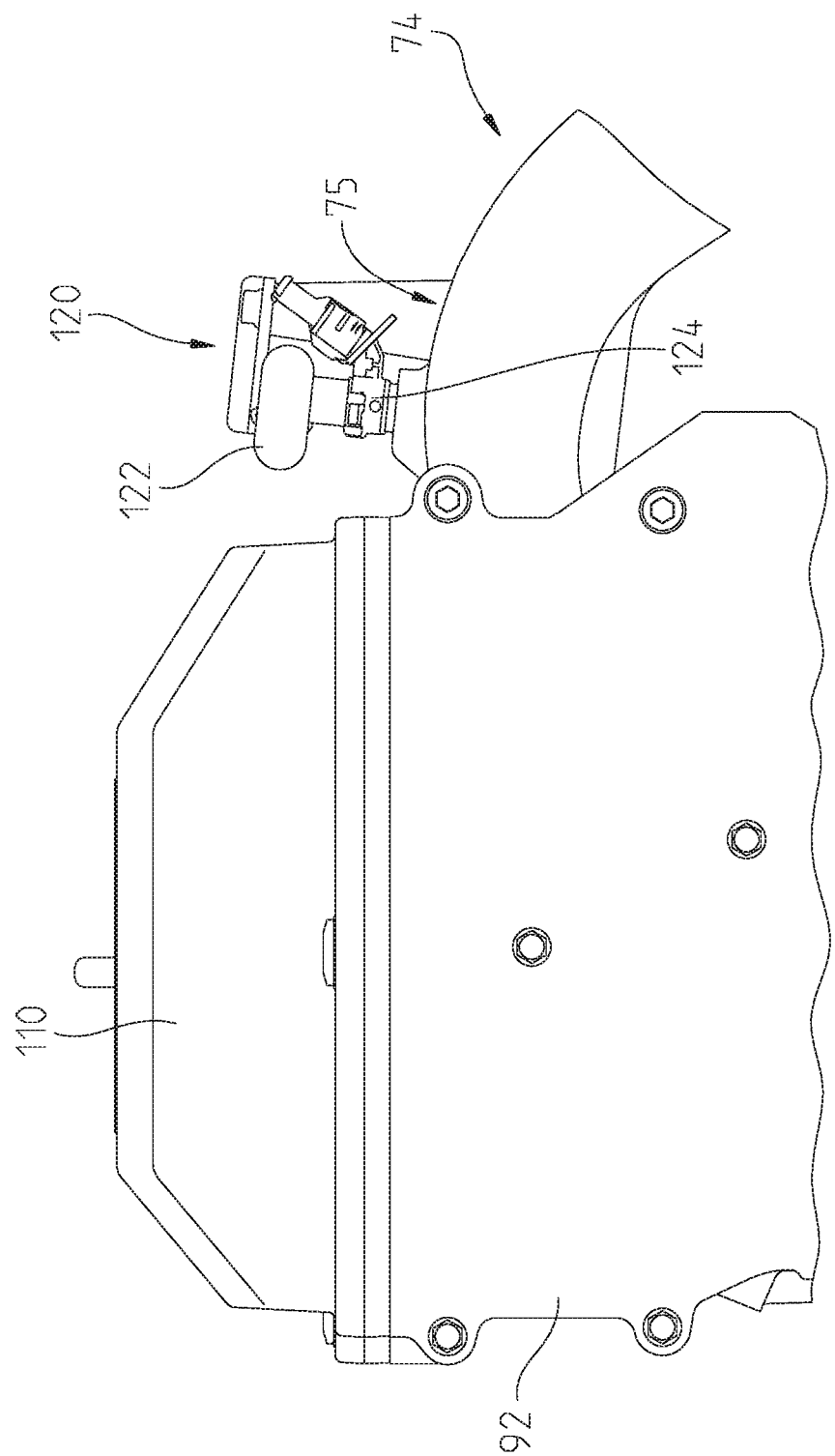
FIG. 11 shows a side plan view of a fuel injection assembly of the vehicle of FIG. 1 coupled to an air intake and an engine of a powertrain of the vehicle of FIG. 1.
Figure 12:
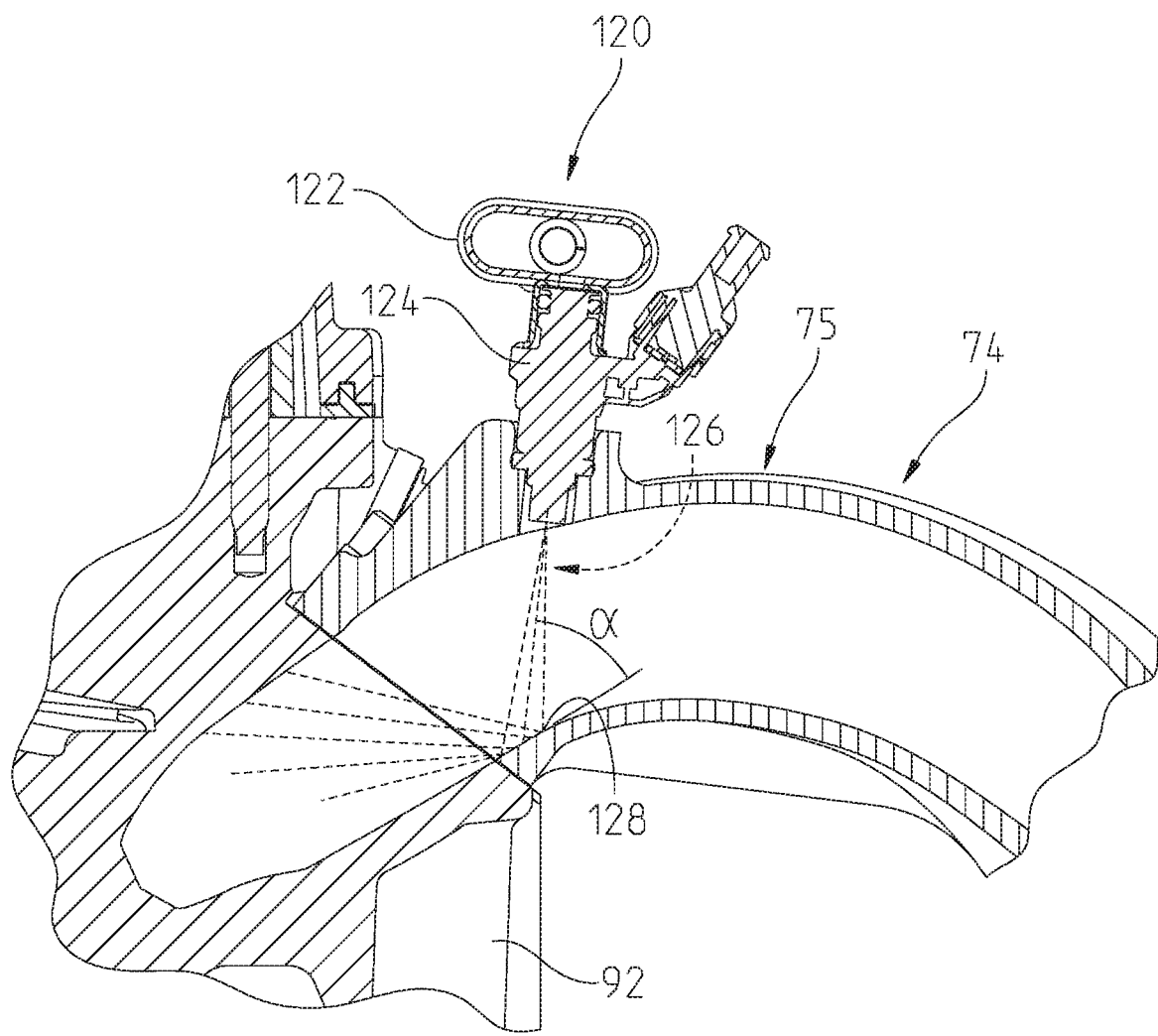
FIG. 12 shows a cross-sectional view of the fuel injection assembly, air intake, and engine of FIG. 11 taken along line 12-12 of FIG. 11.

Referring now to FIGS. 11 and 12, powertrain assembly 70 further includes a fuel injection assembly 120. Fuel injection assembly 120 generally includes a fuel rail 122 and at least one fuel injector 124. In general, fuel injector assembly 120 includes one fuel injector 124 for each cylinder 130 (FIG. 13) of engine 72. Fuel injector(s) 124 are positioned along intake assembly 74 to direct a fuel stream 126 downward such that fuel stream 126 contacts an opposing interior wall 128 of intake assembly 74 and bounces at an angle α into intake port 92. More particularly, opposing interior wall 128 is generally opposite the location of fuel injector 124 such that fuel injector 124 is positioned at one portion of an intake manifold 75 of intake assembly 74 and opposing interior wall 128 is positioned approximately 180° from the location of fuel injector 124. In various embodiments, angle α may be between 30 degrees and 70 degrees. In the illustrative embodiment, angle α is approximately 45 degrees. By hitting wall 128 substantially straight on such that fuel stream 126 defines a linear stream that first contacts wall 128 before contacting any other portion of intake manifold 75, fuel stream 126 hits wall 128 and increases the atomization of fuel stream 126. Fuel stream 126 atomizes better since the entire fuel stream 126 hits wall 128 ensuring full stream 126 atomizes rather than only a portion of fuel stream 126. In general, fuel injector assembly 120 is positioned below a top of engine 72 for protection.

Figure 13:
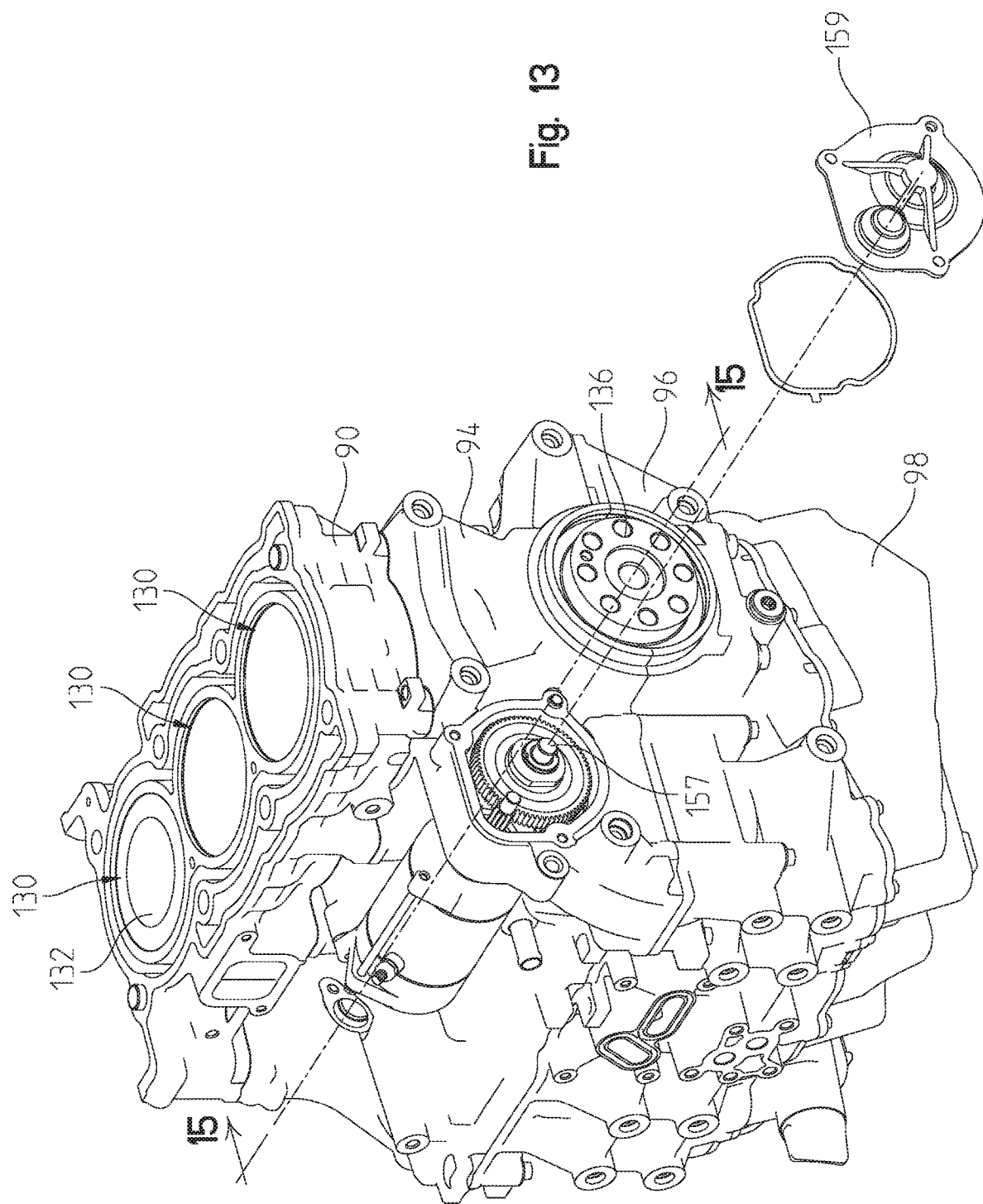
FIG. 13 shows a perspective view of the engine of FIG. 9 with a cam cover, a cylinder head, and a coolant assembly of the engine removed.
Figure 14:
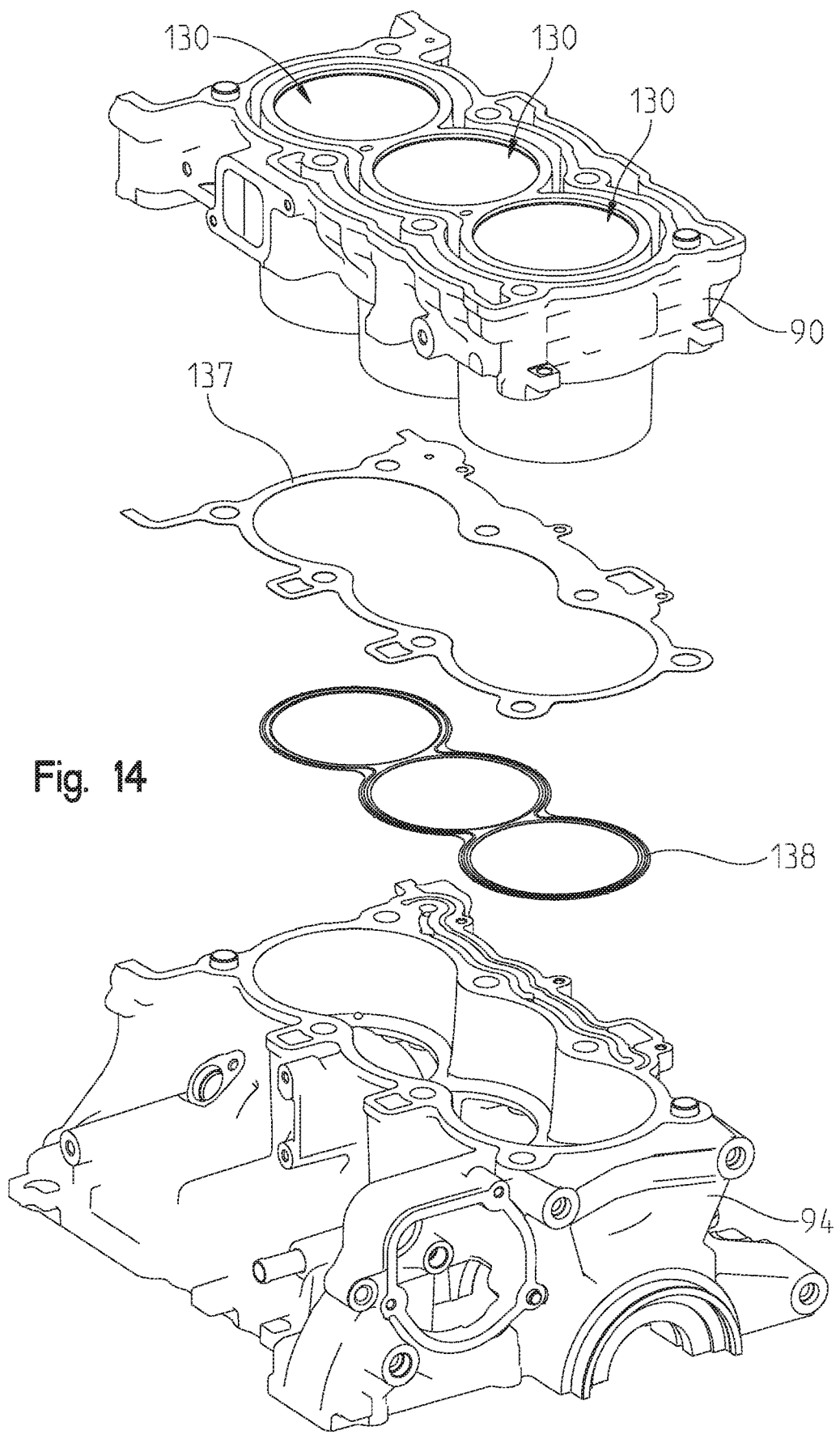
FIG. 14 shows an exploded view of a portion of the engine of FIG. 13.
Figure 15:
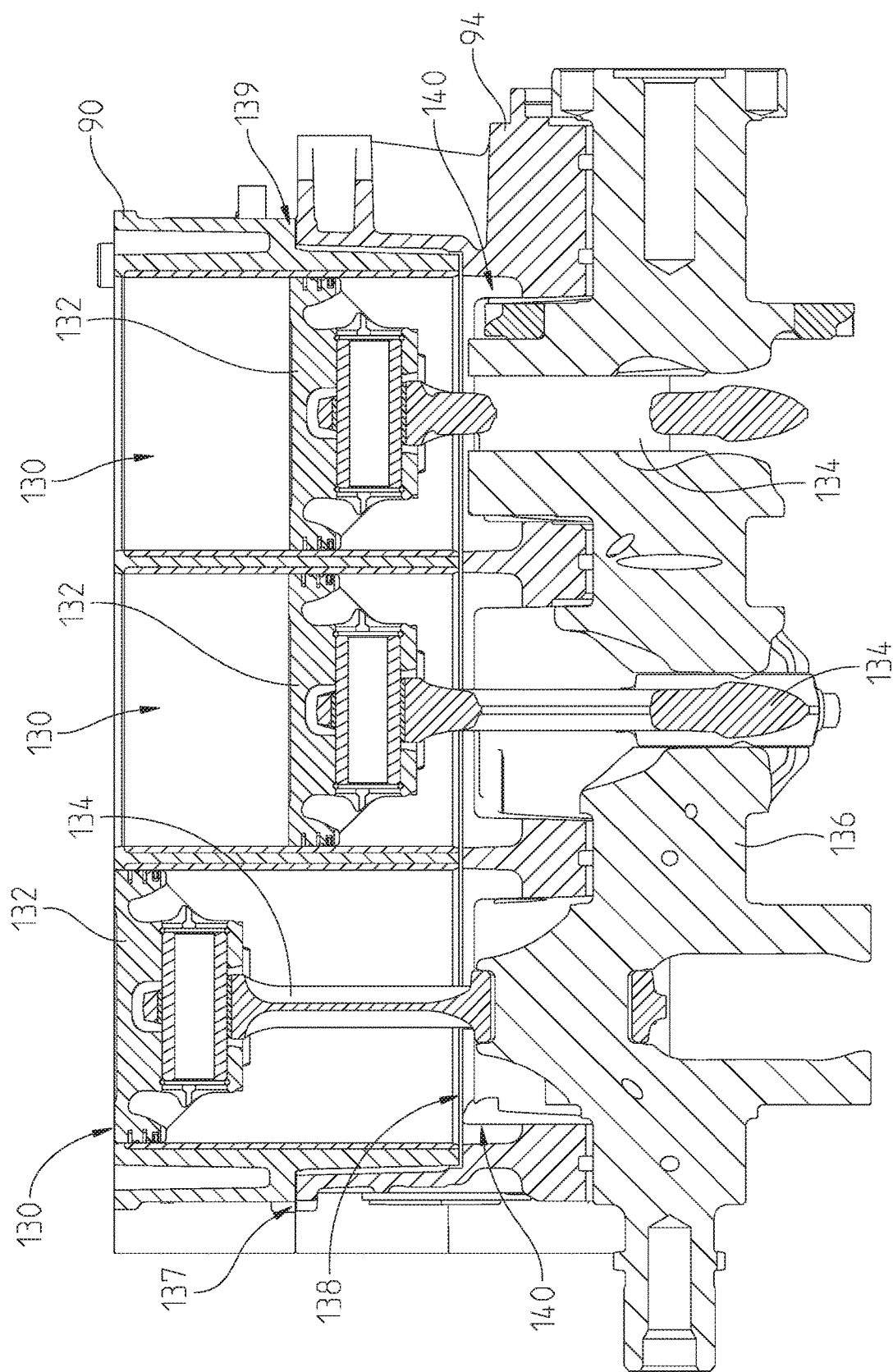
FIG. 15 shows a cross-sectional view of a portion of the engine of FIG. 13 taken along line 15-15 of FIG. 13.

With reference now to FIGS. 13-15, engine 72 generally includes a plurality of cylinders 130, illustratively three but any number of cylinders 130 may be provided, a piston 132 positioned within each cylinder 130, and a connecting rod 134 coupling each piston 132 to a crankshaft 136. Cylinders 130 are generally positioned within cylinder block 90 which is sealingly coupled to and positioned above first crankcase portion 94 with a gasket 138. In various embodiments, gasket 138 is configured such that each cylinder 130 is individually sealed with first crankcase portion 94 at a lowermost end of cylinder block 90. In various embodiments, cylinder block 90 may be sealingly coupled above first crankcase portion 94 with an additional gasket 137 positioned above gasket 138 and between an uppermost end of first crankcase portion 94 and a lip 139 of cylinder block 90. In this way, each cylinder 130 is sealed from each other such that fluid does not flow between cylinders 130.

Crankshaft 136 is generally positioned within first and second crankcase portions 94 and 96, and connecting rods 134 reciprocate within crank bays 140 within first and second crankcase portions 94 and 96 and cylinders 130. Gasket 138 seals individual crank bays 140 to prevent windage created by the reciprocation of connecting rods 134 within crank bays 140 from passing between crank bays 140.

Referring now to FIGS. 16-19, engine 72 may further include a balance shaft 150 and a starter motor 152 for cranking or starting engine 72. In various embodiments, starter motor 152 and balance shaft 150 are coupled to crankshaft 136 such that crankshaft 136 is started by balance shaft 150. For example, and as shown in FIGS. 16-19, crankshaft 136 may be started by balance shaft 150 via a gear assembly 153. Gear assembly 153 generally includes a starter gear 156 coupled to a first end 151 of starter motor 152 which is meshed with a first transfer gear 158 coupled to a shaft 157, which extends between first crankcase portion 94 and a cover 159 (FIG. 13) coupled to first crankcase portion 94. First transfer gear 158 in turn is fixedly coupled to a second transfer gear 160 (FIGS. 18 and 19) which may also be coupled to shaft 157 and positioned between first crankcase portion 94 and cover 159. In this way, gears 158, 160 may rotate together on shaft 157 such that when starter motor 152 drives gear 158, gear 160 drives rotation of a gear 162, as disclosed further herein. In various embodiments, first transfer gear 150 is a torque limiting gear that limits any backfire torque engine 72 sees. Second transfer gear 160 in turn is meshed with an outer gear 162 of balance shaft 150 which is coupled to an inner gear 164 of balance shaft 150 via a one-way or sprag clutch such that outer gear 162 is fixedly coupled to inner gear 164 in a first direction and rotatably coupled to inner gear 164 in a second direction. Inner gear 164 of balance shaft 150, which is fixedly coupled to balance shaft 150, in turn is meshed with a gear 166 of crankshaft 136. In this way, crankshaft 136 may be started by balance shaft 150 via gear assembly 153.

Figure 16:
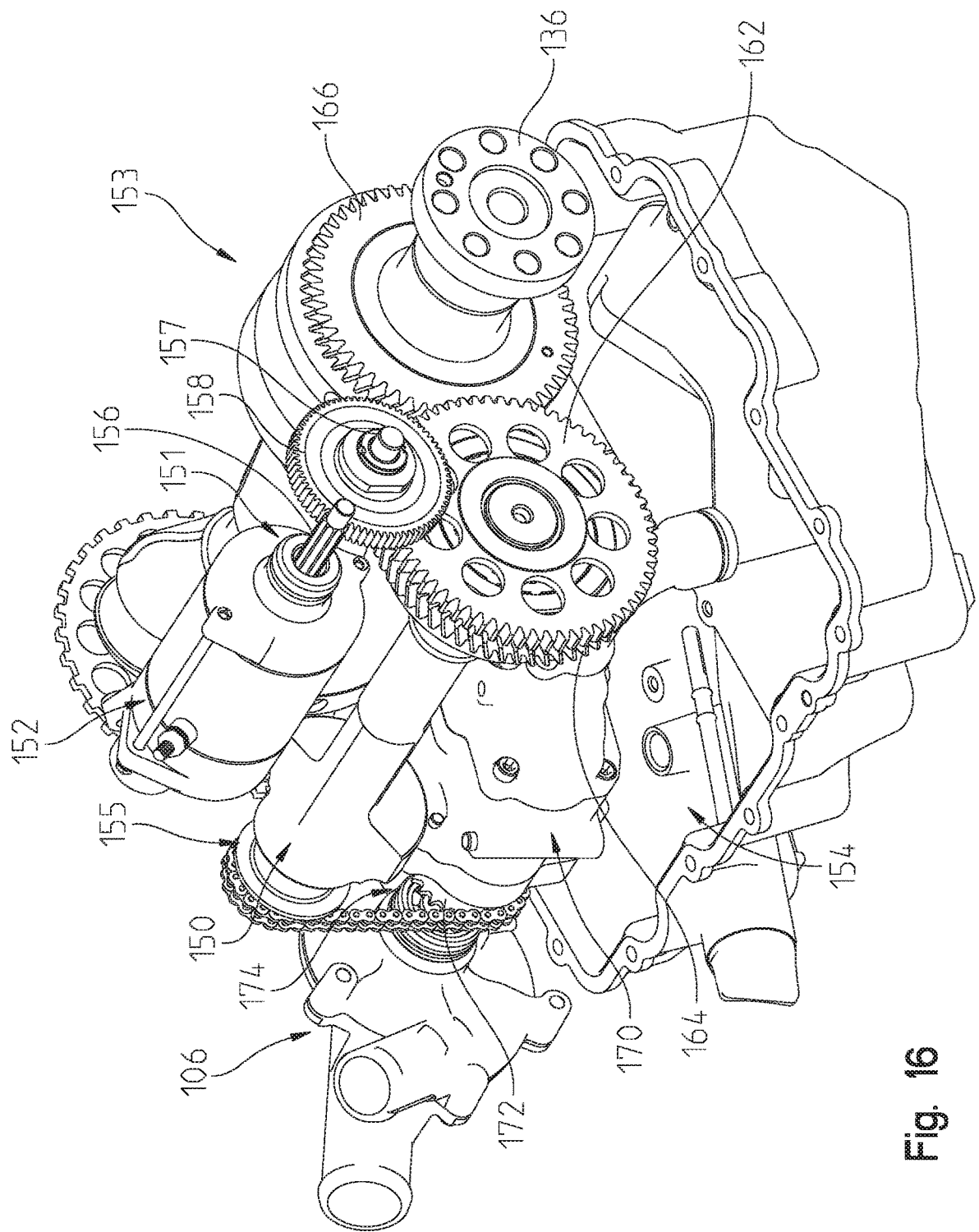
FIG. 16 shows a perspective view of a starter motor, a balance shaft, an oil pump, a water pump, a crankshaft and an oil pan of the engine of FIG. 9.
Figure 17:
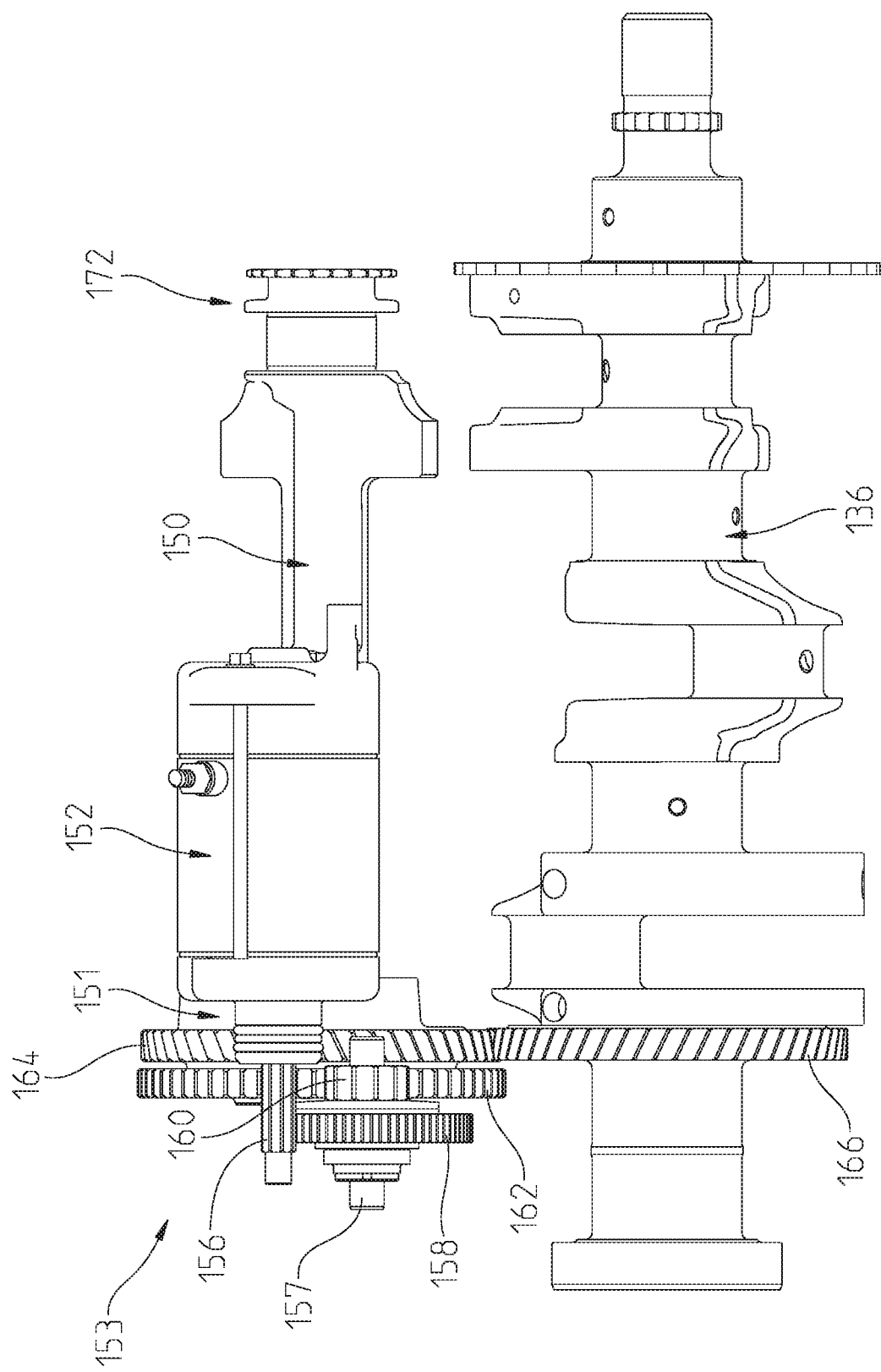
FIG. 17 shows a side plan view of the starter motor, the balance shaft, and the crankshaft of FIG. 16.
Figure 18:
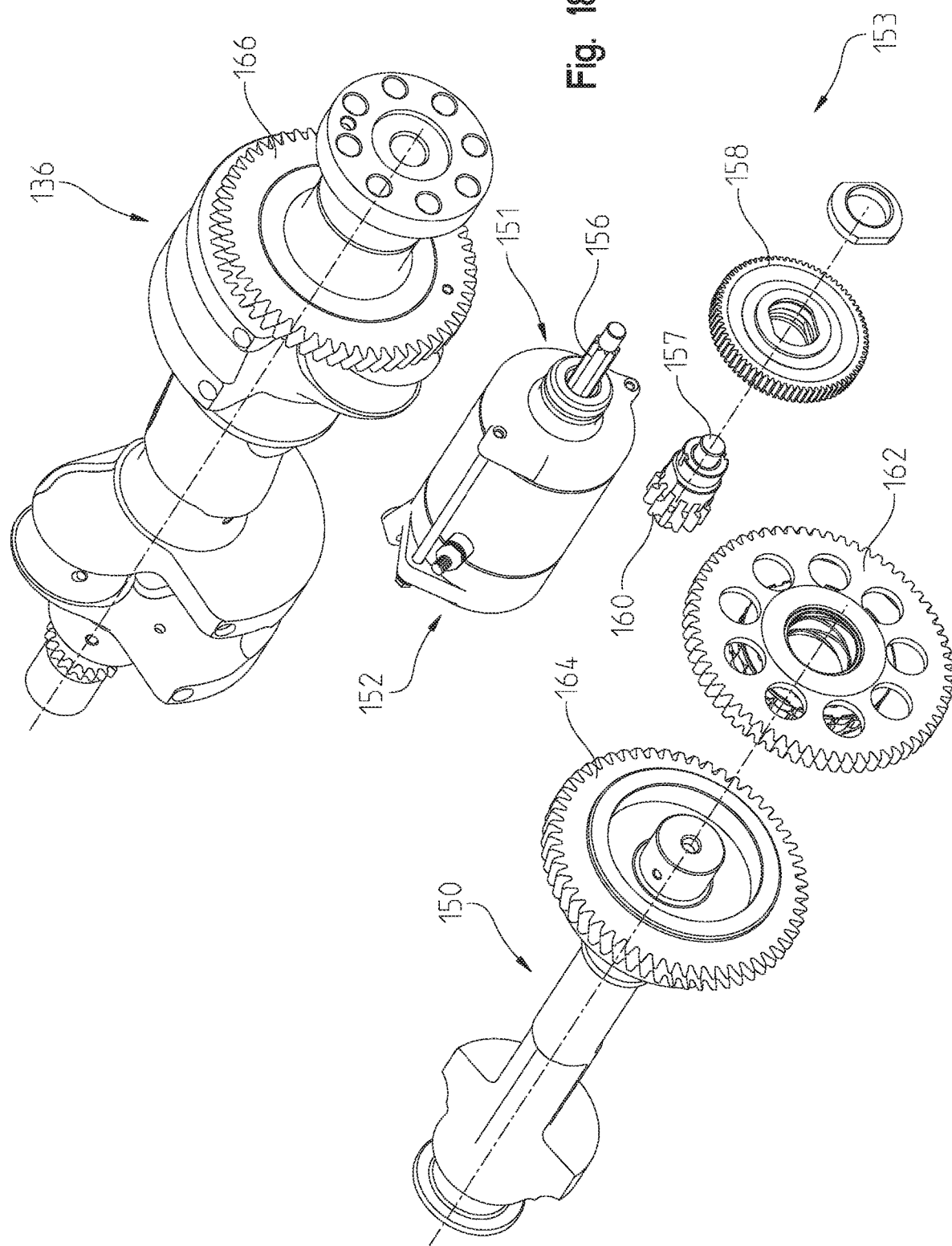
FIG. 18 shows an exploded view of the starter motor, the balance shaft, and the crankshaft of FIG. 17.
Figure 19:
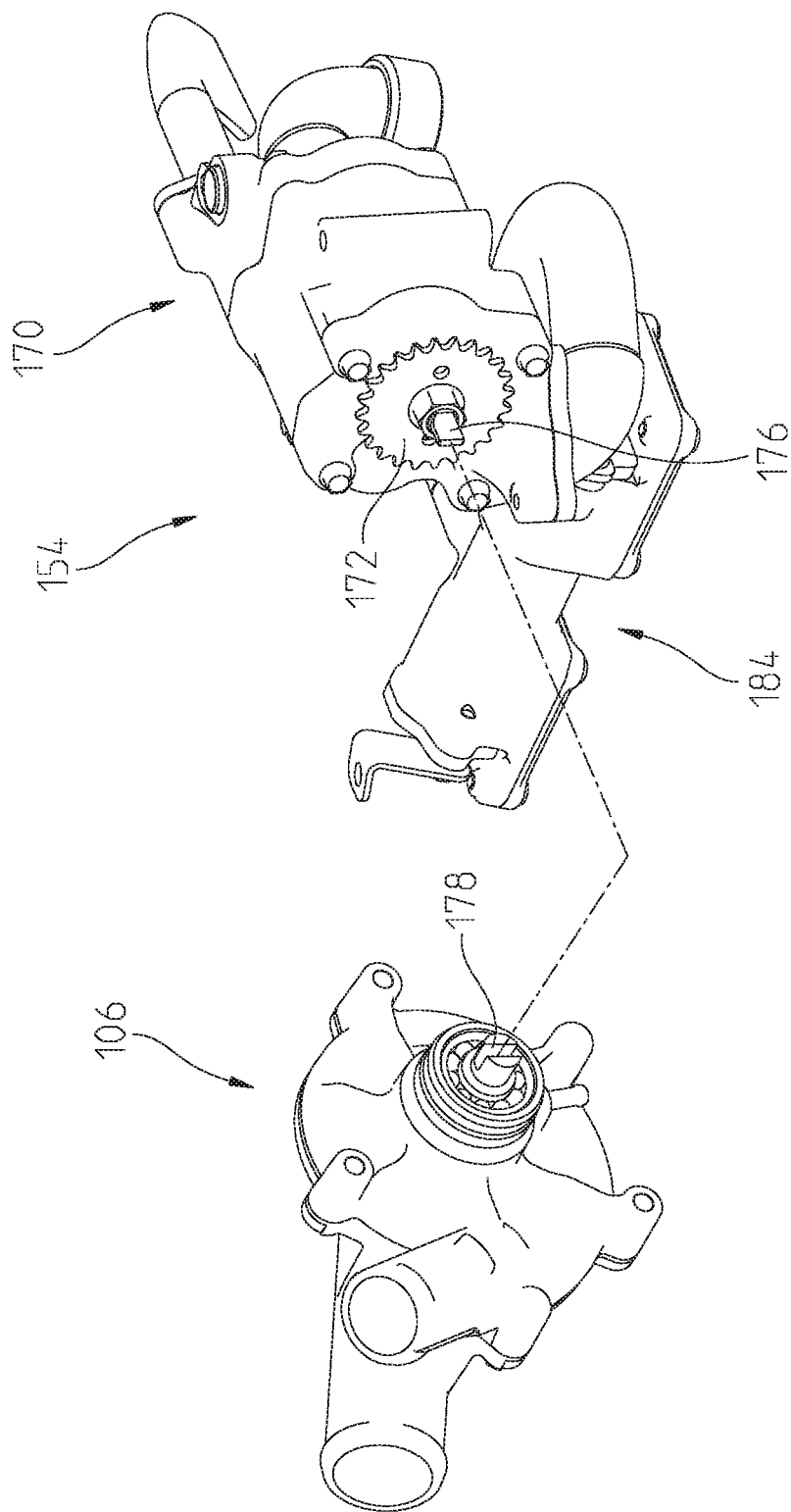
FIG. 19 shows an exploded view of the water pump and the oil pump of FIG. 16.
Figure 20:
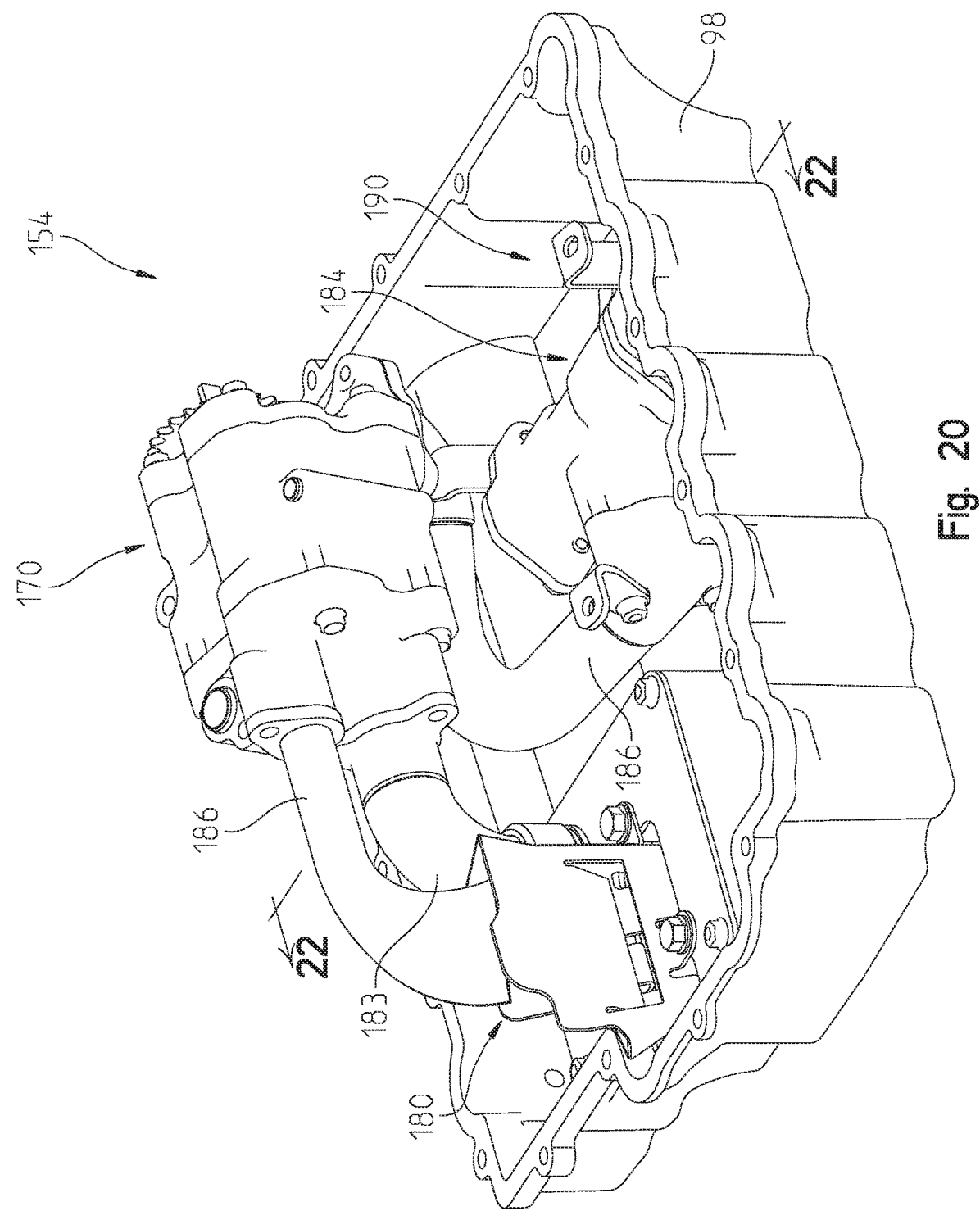
FIG. 20 shows a perspective view of a lubrication system of the engine of FIG. 9.
Figure 21:
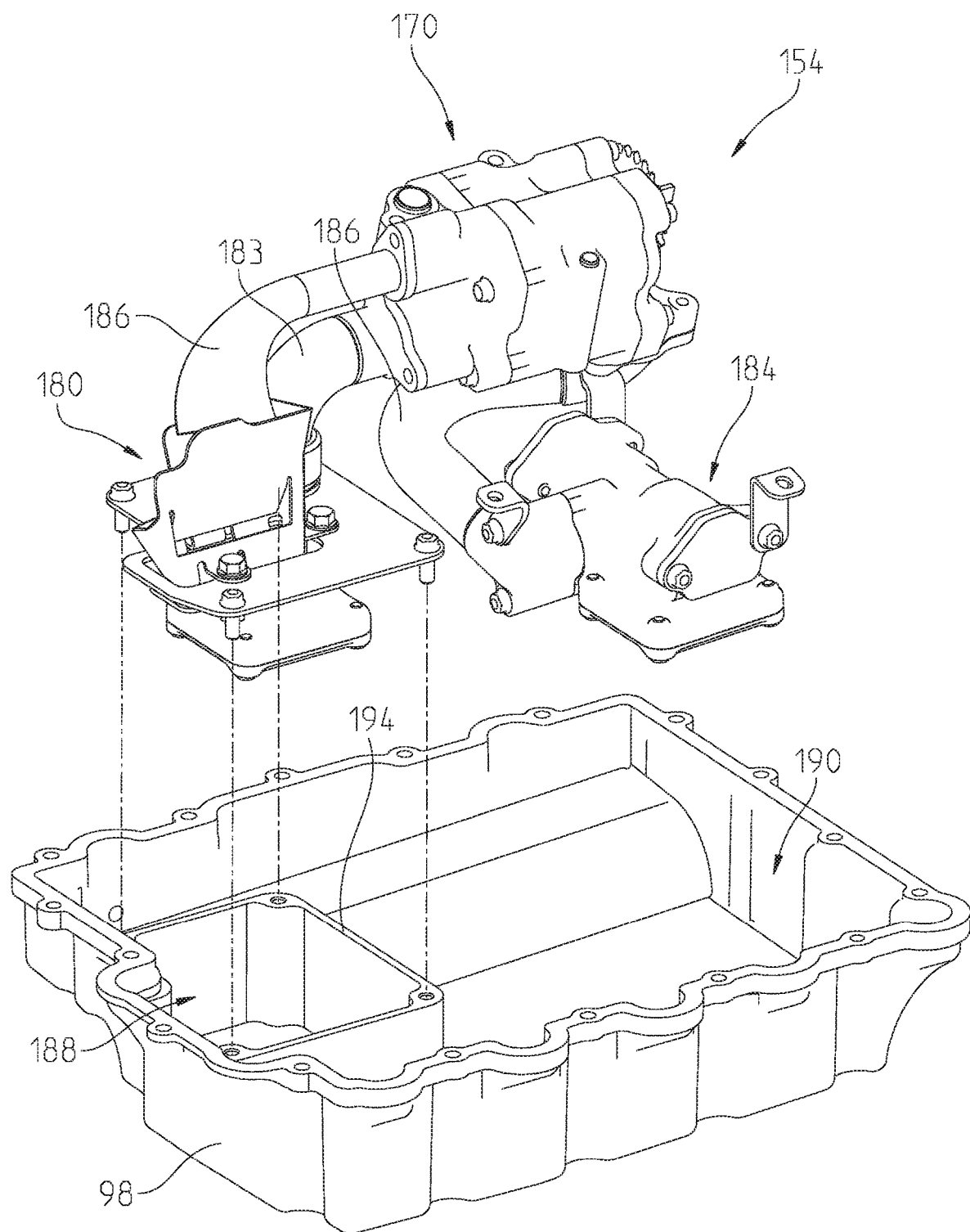
FIG. 21 shows an exploded view of the lubrication system of FIG. 20.

With reference to FIGS. 16 and 19, engine 72 generally further includes a lubrication assembly 154 coupled to balance shaft 150 such that balance shaft 150 drives an oil pump 170 of lubrication assembly 154. For example, and as shown in FIG. 16, a second end 155 of balance shaft 150 may be coupled to a gear 172 of oil pump 170 via a chain 174 such that rotation of balance shaft 150 drives oil pump 170. In various embodiments, oil pump 170 is coupled directly to water pump 106 such that rotation of gear 172 of oil pump 170 drives water pump 106. For example, and as shown in FIG. 19, oil pump 170 may include a protrusion or key 176 fixedly coupled to gear 172 which is received within an indentation or opening 178 in water pump 106 such that rotation of protrusion 176 is transferred to water pump 106 through indentation 178.

Referring to FIGS. 19-23B, lubrication system 154 generally further includes a pressure pick-up 180 fluidly coupled to oil pump 170 via a transfer conduit 182, and a scavenge pump 184 fluidly coupled to oil pump 170 via a pickup conduit 186, where pressure pick-up 180 and scavenge pump 184 are positioned within oil pan 98. Oil pan 98 generally includes a pressure pick-up volume 188 (FIG. 21) within which pressure pick-up 180 is positioned and into which oil from oil pump 170 may be released through oil pump outlet conduit 183, a scavenge pump volume 190 within which scavenge pump 184 is positioned, and an outlet 192 through which oil within oil pan 98 may be drained. In various embodiments, outlet 192 may be positioned such that oil from pressure pick-up volume 188 and scavenge pump volume 190 may be drained simultaneously. For example, outlet 192 may be positioned below a wall 194 of pressure pick-up volume 188 such that a portion of outlet 192 is in fluid communication with pressure pick-up volume 188 and a portion of outlet 192 is in fluid communication with scavenge pump volume 190.

Figure 23A:
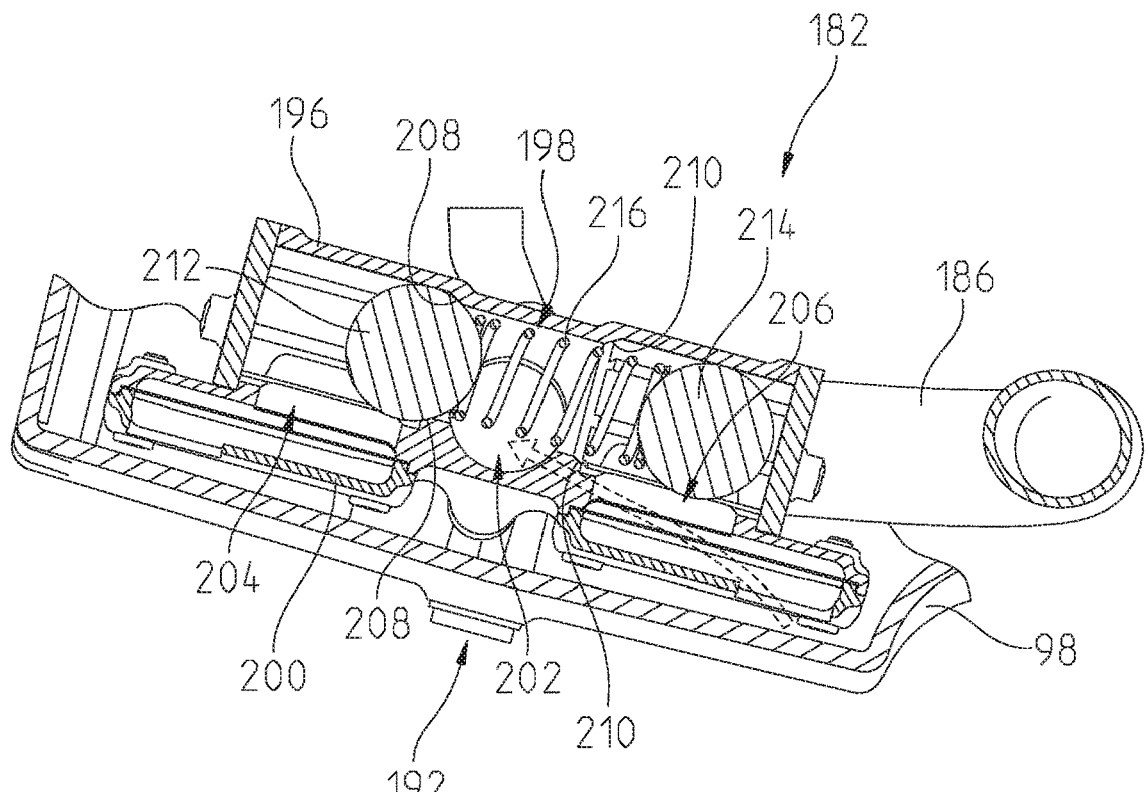
FIG. 23A is a detailed cross-sectional view of a scavenge pump of the lubrication system of FIG. 22 when the vehicle of FIG. 1 is tilted in a first direction.
Figure 23B:
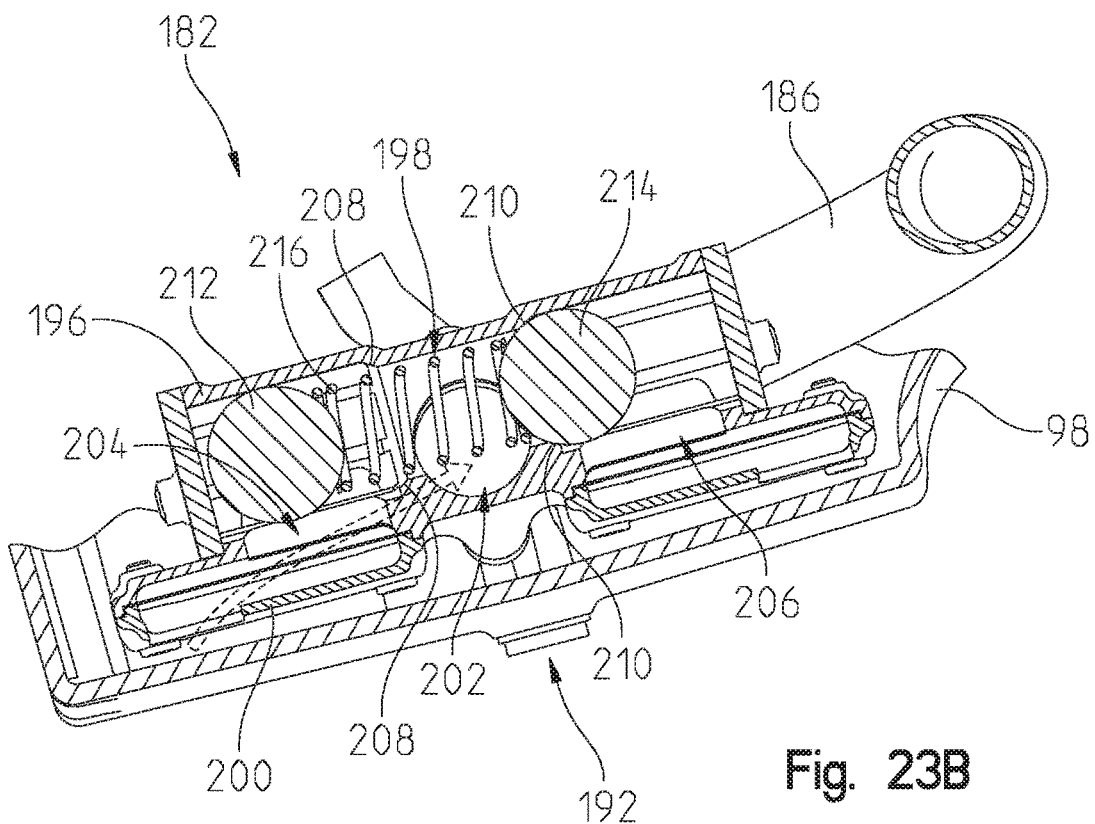
FIG. 23B shows a detailed cross-sectional view of the scavenge pump of the lubrication system of FIG. 22 when the vehicle of FIG. 1 is tilted in a second direction.

Referring to FIGS. 22, 23A, and 23B, in various embodiments, scavenge pump 184 is a shuttle valve scavenge pump 184. Shuttle valve scavenge pump 184 generally includes a housing 196, a shuttle valve assembly 198 positioned with housing 196, and a strainer assembly 200 coupled to housing 196. Housing 196 includes an outlet 202 fluidly coupled to oil pump 170 via pick up conduit 186, a first inlet 204 fluidly coupled to strainer assembly 200, a second inlet 206 fluidly coupled to strainer assembly 200, a first shoulder 208, and a second shoulder 210. Shuttle valve assembly 198 generally includes at least one ball 212 and/or 214 positioned within housing 196. In various embodiments, and as shown in the illustrative embodiments, shuttle valve assembly 198 may include a first ball 212, a second ball 214, and a spring 216 positioned between first ball 212 and second ball 214. Strainer assembly 200 generally includes a first inlet 215 in fluid communication with first inlet 204 of housing 196 and a second inlet 217 in fluid communication with second inlet 206 of housing 196.

Shuttle valve assembly 198 is configured to shift within housing 196 such that when vehicle 2 is tilted in a first direction (e.g., to one side), gravity causes the at least one ball 212 and/or 214 to prevent first inlet 215 of strainer assembly 200 and first inlet 204 of housing 196 from fluidly communicating with outlet 202 and/or oil pump 170 such that oil is received through second inlet 206 of housing 196 and second inlet 217 of strainer assembly 200. Additionally, when vehicle 2 is tilted in a second direction opposite to the first direction (e.g., to the other side), gravity causes the at least one ball 212 and/or 214 to prevent second inlet 206 of housing 196 and second inlet 217 of strainer assembly 200 from fluidly communication with outlet 202 and/or oil pump 170 such that oil is received through first inlet 215 of strainer assembly 200 and first inlet 204 of housing 196. With reference to the illustrative embodiments, when vehicle 2 is tilted in the first direction, gravity causes first ball 212 to abut first shoulder 208 such that first inlet 204 of housing 196 and first inlet 215 of strainer assembly 200 are no longer in fluid communication with outlet 202 and oil pump 170 and oil is received through second inlet 206 of housing 196 and second inlet 217 of strainer assembly 200 (FIG. 23A), while when vehicle 2 is tilted in the second direction opposite to the first direction, gravity causes second ball 214 to abut second shoulder 210 such that second inlet 206 of housing 196 and second inlet 217 of strainer assembly 200 are no longer in fluid communication with outlet 170 and oil pump 170 and oil is received through first inlet 204 of housing 196 and first inlet 215 of strainer assembly 200 (FIG. 23B). When vehicle 2 is not tilted in either direction, the at least one ball, illustratively first ball 212 and second ball 214, may be spaced apart from first and second shoulders 208 and 210 such that oil may be received through both first and second inlets 204 and 206 of housing 196 and first and second inlets 215 and 217 of strainer assembly 200 simultaneously. However, spring 216 prevents first ball 212 and second ball 214 from being simultaneously engaged with first and second shoulder 208 and 210, respectively, such that oil is being received through one of inlets 204 and 215 or inlets 206 and 217 at any given time. As such, shuttle valve assembly 198 prevents air from being received within scavenge pump 184 when vehicle 2 is tilted.

While this invention has been described as having an exemplary design, the present invention may be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains.

The invention claimed is:

1. A vehicle, comprising:
   a plurality of ground engaging members;
   a frame supported by the plurality of ground engaging members;
   an engine supported by the frame, the engine operably coupled to at least one ground engaging member of the plurality of ground engaging members, the engine includes:
      an oil pan; and
      a lubrication system positioned within the oil pan, the lubrication system includes:
         an oil pump;
         a housing statically positioned in the oil pan;
         a shuttle valve having first and second movable shuttles positioned within the housing, wherein the first and second movable shuttles are configured to move interconnectedly relative to the housing according to vehicle tilting; and
         a conduit coupled between the oil pump and the housing.

2. The vehicle of claim 1, wherein the first movable shuttle is coupled with the second movable shuttle.

3. The vehicle of claim 2, wherein the housing comprises a first inlet and a second inlet.

4. The vehicle of claim 3, wherein when the engine is positioned in a first titled orientation, the first movable shuttle is configured to close the first inlet, and when the engine is positioned in a second titled orientation, the second movable shuttle is configured to close the second inlet.

5. The vehicle of claim 4, wherein the first movable shuttle is a first ball and the second movable shuttle is a second ball.

6. The vehicle of claim 5, wherein a spring is positioned between the first ball and the second ball.

7. An engine, comprising:
a cylinder head;
a crankcase coupled to the cylinder head;
a crankshaft positioned within the crankcase;
an oil pan coupled to the crankcase; and
a lubrication system includes:
   an oil pump positioned within the oil pan, the oil pump operably coupled to the crankcase;
   a shuttle valve scavenge pump fluidly coupled with the oil pan, the shuttle valve scavenge pump including:
      a housing having a first inlet and a second inlet,
      a strainer coupled to the housing,
      a first movable shuttle positioned within the housing and a second movable shuttle positioned within the housing, each of the first and second movable shuttles are interconnected and interdependently movable relative to the housing;
   a conduit coupled between the oil pump and the housing; and
wherein the oil pan includes a first tilted configuration and a second tilted configuration:
   in the first tilted configuration the second movable shuttle is moved within the housing to open the second inlet to the conduit and the first movable shuttle is moved within the housing to close the first inlet to the conduit according to tilting of the oil pan in a first direction; and
   in the second tilted configuration the first movable shuttle is moved within the housing to open the first inlet to the conduit and the second movable shuttle is moved within the housing to close the second inlet to the conduit according to tilting of the oil pan in a second direction.

8. The engine of claim 7, wherein the strainer includes a first strainer inlet fluidly coupled to the first inlet and a second strainer inlet fluidly coupled to the second inlet.

9. The engine of claim 8, wherein the strainer is positioned vertically lower than the housing.

10. The engine of claim 7, wherein when the engine is in a first orientation, the first movable shuttle is configured to close the first inlet, and when the engine is in a second orientation, the second movable shuttle is configured to close the second inlet.

11. The engine of claim 10, wherein the first orientation is angled relative to a ground level and the second orientation is angled relative to the second orientation.

12. The engine of claim 11, wherein in a third orientation, each of the first movable shuttle and second movable shuttle are separated from each other to allow access to each of the first inlet and the second inlet.

13. The engine of claim 12, wherein the third orientation is generally parallel to the ground level.

14. The engine of claim 7, wherein the housing includes:
a first shoulder;
a second shoulder, the first and second shoulders between the first and second movable shuttles; wherein
   in the first tilted configuration the second movable shuttle is spaced from the second shoulder and the first movable shuttle is seated against the first shoulder; and
   in the second tilted configuration the first movable shuttle is spaced from the first shoulder and the second movable shuttle is seated against the second shoulder.

15. The engine of claim 7, wherein the housing of the shuttle valve scavenge pump is static relative to the oil pan.

* * * * *